US012709097B2

(12) United States Patent
Kobayashi

(10) Patent No.: US 12,709,097 B2
(45) Date of Patent: Aug. 18, 2026

(54) LIQUID EJECTING HEAD AND LIQUID EJECTING APPARATUS

(71) Applicant: SEIKO EPSON CORPORATION, Tokyo (JP)

(72) Inventor: Haruki Kobayashi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 114 days.

(21) Appl. No.: 18/603,288

(22) Filed: Mar. 13, 2024

(65) Prior Publication Data

US 2024/0308216 A1 Sep. 19, 2024

(30) Foreign Application Priority Data

Mar. 14, 2023 (JP) ................................. 2023-039830

(51) Int. Cl.
*B41J 2/14* (2006.01)
*B41J 2/175* (2006.01)

(52) U.S. Cl.
CPC ........... *B41J 2/14233* (2013.01); *B41J 2/175* (2013.01); *B41J 2002/14306* (2013.01); *B41J 2002/14362* (2013.01)

(58) Field of Classification Search
CPC .................... B41J 2/14233; B41J 2/175; B41J 2002/14306; B41J 2002/14362; B41J 2002/14419; B41J 2/14201; B41J 2/01
See application file for complete search history.

(56) References Cited

FOREIGN PATENT DOCUMENTS

| | | | |
|---|---|---|---|
| JP | 2015039804 A | * | 3/2015 |
| JP | 2022-108819 A | | 7/2022 |

* cited by examiner

*Primary Examiner* — Bradley W Thies
(74) *Attorney, Agent, or Firm* — Harness, Dickey & Pierce, P.L.C.

(57) ABSTRACT

There is provided a liquid ejecting head including a head chip and a flow path structure to which the head chip is joined by a first-adhesive and a second-adhesive, in which the flow path structure has a common flow path, a first-selection-flow-path coupled to the common flow path and liquid-tightly coupled to the chip-side flow path of the head chip by the first-adhesive, and a second-selection-flow-path coupled to the common flow path, an outer surface of the flow path structure includes a closed region surrounding an opening of the second-selection-flow-path at a distance from the opening when viewed in a stacking direction of the head chip and the flow path structure, and the head chip adheres to the flow path structure via the second-adhesive in the closed region so that the second-selection-flow-path is closed.

16 Claims, 25 Drawing Sheets

LIQUID EJECTING HEAD AND LIQUID EJECTING APPARATUS

The present application is based on, and claims priority from JP Application Serial Number 2023-039830, filed Mar. 14, 2023, the disclosure of which is hereby incorporated by reference herein in its entirety.

BACKGROUND

1. Technical Field

The present disclosure relates to a liquid ejecting head and a liquid ejecting apparatus.

2. Related Art

In the related art, a liquid ejecting apparatus typified by an ink jet type printer generally includes a liquid ejecting head that ejects a liquid such as an ink as a droplet.

For example, a liquid ejecting head disclosed in JP-A-2015-39804 includes a head chip that ejects an ink from a nozzle, and a flow path structure that holds the head chip and supplies an ink to the head chip. Here, the head chip is provided with an inlet, and the head chip is fixed to a flow path member by an adhesive provided around the inlet, whereby the inlet is liquid-tightly coupled to an outlet of a flow path of the flow path structure.

For example, when the head chip incorporated into the liquid ejecting head fails, there is a demand to regenerate the liquid ejecting head by replacing only the head chip. In addition, when a portion of the liquid ejecting head other than the head chip fails, there is a demand to reuse the head chip by removing the non-failed head chip from the flow path structure and mounting it on another liquid ejecting head.

However, in the liquid ejecting head disclosed in JP-A-2015-39804, when the head chip and the flow path structure are separated, an adhesive remaining in the head chip interferes with liquid-tight adhesion at the time of reuse of the head chip, and an adhesive remaining in the flow path structure interferes with the liquid-tight adhesion at the time of regeneration of the liquid ejecting head. Therefore, it is difficult to regenerate the liquid ejecting head by replacing the head chip or to reuse the head chip as a portion of another liquid ejecting head.

SUMMARY

According to an aspect of the present disclosure, there is provided a liquid ejecting head including: a head chip that has a plurality of nozzles ejecting a liquid, a common liquid chamber communicating with the plurality of nozzles, and a chip-side flow path communicating with the common liquid chamber; and a flow path structure to which the head chip is joined by a first adhesive and a second adhesive, in which the flow path structure has a common flow path, a first selection flow path coupled to the common flow path and liquid-tightly coupled to the chip-side flow path by the first adhesive, and a second selection flow path coupled to the common flow path, an outer surface of the flow path structure includes a closed region surrounding an opening of the second selection flow path at a distance from the opening when viewed in a first direction, which is a stacking direction of the head chip and the flow path structure, and the head chip adheres to the flow path structure via the second adhesive in the closed region so that the second selection flow path is closed.

According to another aspect of the present disclosure, there is provided a liquid ejecting head including: a head chip that has a plurality of nozzles ejecting a liquid, a common liquid chamber communicating with the plurality of nozzles, and a first chip-side flow path communicating with the common liquid chamber; and a flow path structure to which the head chip is joined by an adhesive, in which the flow path structure has a common flow path, a first selection flow path coupled to the common flow path and liquid-tightly coupled to the first chip-side flow path by the adhesive, and a second selection flow path coupled to the common flow path, and the second selection flow path is closed by a closing member detachably fixed to the flow path structure.

According to still another aspect of the present disclosure, there is provided a liquid ejecting head including: a head chip that has a plurality of nozzles ejecting a liquid and a common liquid chamber communicating with the plurality of nozzles; and a flow path structure that has a coupling flow path communicating with the common liquid chamber and to which the head chip is joined by an adhesive, in which the head chip has a first chip-side flow path coupled to the common liquid chamber and liquid-tightly coupled to the coupling flow path by the adhesive, and a second chip-side flow path coupled to the common liquid chamber, and the second chip-side flow path is closed by a closing member detachably fixed to the head chip.

According to still another aspect of the present disclosure, there is provided a liquid ejecting head including: a head chip that has a plurality of nozzles ejecting a liquid and a common liquid chamber communicating with the plurality of nozzles; and a flow path structure that has a coupling flow path communicating with the common liquid chamber and to which the head chip is joined by a first adhesive and a second adhesive, in which the head chip has a first chip-side flow path coupled to the common liquid chamber and liquid-tightly coupled to the coupling flow path by the first adhesive, and a second chip-side flow path coupled to the common liquid chamber, an outer surface of the head chip includes a closed region surrounding an opening of the second chip-side flow path at a distance from the opening when viewed in a first direction, which is a stacking direction of the head chip and the flow path structure, and the head chip adheres to the flow path structure via the second adhesive in the closed region so that the second chip-side flow path is closed.

According to the still another aspect of the present disclosure, there is provided a liquid ejecting apparatus including: the liquid ejecting head according to the above aspect; and a liquid storage portion that stores a liquid to be supplied to the liquid ejecting head.

DESCRIPTION OF EMBODIMENTS

Figure 1:
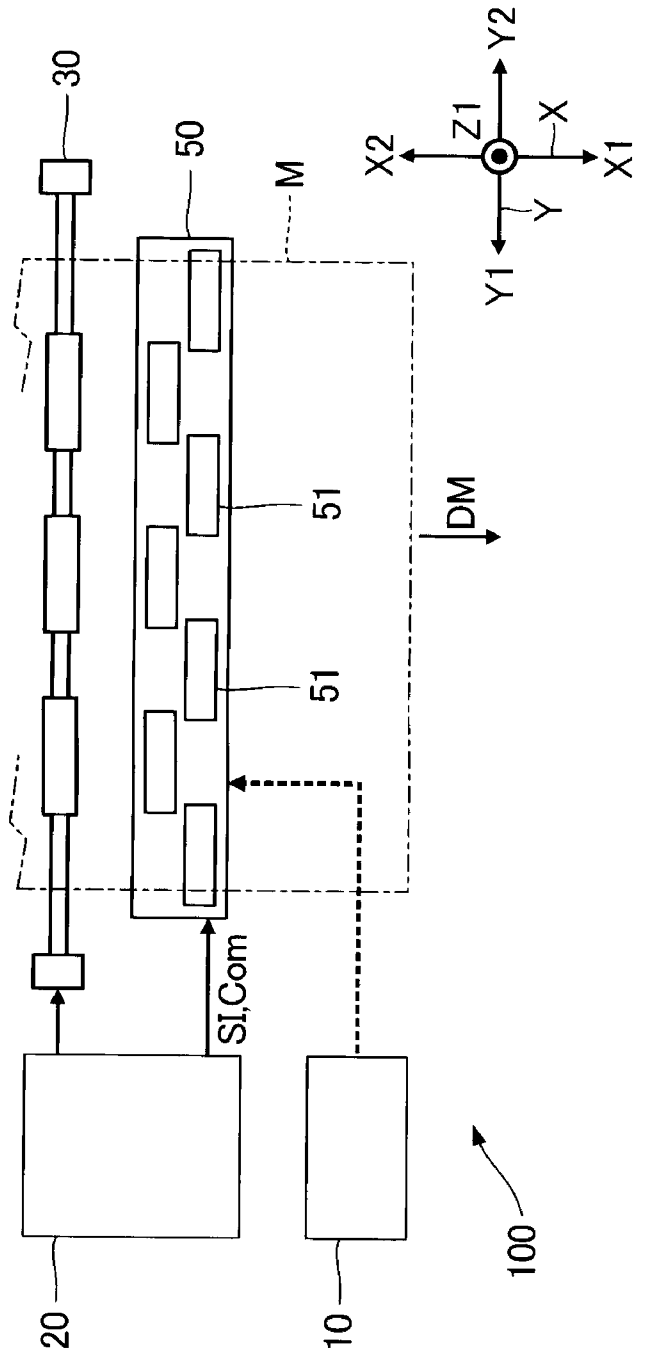
FIG. 1 is a schematic view illustrating a configuration example of a liquid ejecting apparatus according to a first embodiment.

Hereinafter, preferred embodiments according to the present disclosure will be described with reference to the accompanying drawings. In the drawings, dimensions and scales of each portion are appropriately different from actual ones, and some portions are schematically illustrated to facilitate understanding. In addition, the scope of the present disclosure is not limited to the forms unless the present disclosure is particularly limited in the following description.

The following description will be performed by using an X axis, a Y axis, and a Z axis that intersect each other as appropriate. In addition, one direction along the X axis is referred to as an X1 direction, and a direction opposite to the X1 direction is referred to as an X2 direction. Similarly, directions opposite to each other along the Y axis are referred to as a Y1 direction and a Y2 direction. In addition, directions opposite to each other along the Z axis are referred to as a Z1 direction and a Z2 direction. The Z1 direction or the Z2 direction is an example of a "first direction" and corresponds to a "stacking direction of the head chip and the flow path structure" described below. In addition, viewing in the direction along the Z axis is referred to as "plan view".

Here, typically, the Z axis is a vertical axis, and the Z2 direction corresponds to a downward direction in a vertical direction. Note that the Z axis does not have to be the vertical axis. In addition, the X axis, the Y axis, and the Z axis are typically orthogonal to each other. However, without being limited to this, all of these need only intersect each other at an angle within a range of, for example, 80° or more and 100° or less.

1. First Embodiment

1-1. Schematic Configuration of Liquid Ejecting Apparatus

FIG. 1 is a schematic view illustrating a configuration example of a liquid ejecting apparatus 100 according to a first embodiment. The liquid ejecting apparatus 100 is an ink jet type printing apparatus that ejects an ink, which is an example of a liquid, onto a medium M as a droplet. The medium M is typically a printing sheet. The medium M is not limited to the printing sheet, and may be, for example, a printing target having any desired material such as a resin film or a cloth.

As illustrated in FIG. 1, the liquid ejecting apparatus 100 has a liquid storage portion 10, a control unit 20, a transport mechanism 30, and a liquid ejecting head 50.

The liquid storage portion 10 is a container that stores an ink to be supplied to the liquid ejecting head 50. Specific examples of the liquid storage portion 10 include a cartridge that is attachable to and detachable from the liquid ejecting apparatus 100, a bag-like ink pack formed of a flexible film, and an ink tank that can be refilled with an ink. A type of the ink stored in the liquid storage portion 10 is not particularly limited, and is set in any desired way.

The control unit 20 controls an operation of each element of the liquid ejecting apparatus 100. The control unit 20 includes, for example, a processing circuit such as a central processing unit (CPU) or a field programmable gate array (FPGA) and a storage circuit such as a semiconductor memory.

The transport mechanism 30 transports the medium M in a direction DM under the control of the control unit 20. The direction DM of the present embodiment is the X1 direction. In the example illustrated in FIG. 1, the transport mechanism 30 includes a transport roller that is elongated along the Y axis, and a motor that rotates the transport roller. The transport mechanism 30 is not limited to the configuration using the transport roller, and may be configured to use, for example, a drum or an endless belt that transports the medium M in a state of being attracted to an outer peripheral surface by electrostatic force or the like.

Under the control of the control unit 20, the liquid ejecting head 50 ejects the ink supplied from the liquid storage portion 10 onto the medium M in the Z2 direction from each of a plurality of nozzles N. The liquid ejecting head 50 is a line head that has a plurality of head chips 51 disposed such that the plurality of nozzles N are distributed over the entire range of the medium M in the direction along the Y axis, and that is elongated in the direction in which the Y axis extends. When the ejection of the ink from the liquid ejecting head 50 is performed in parallel with the transport of the medium M by the transport mechanism 30, an image is formed at a surface of the medium M by means of the ink.

The number and the disposition of the head chips 51 included in the liquid ejecting head 50 are not limited to the example illustrated in FIG. 1, and are set in any desired way.

Here, the number of head chips 51 included in the liquid ejecting head 50 may be singular. In addition, when the liquid ejecting head 50 is configured to circulate the ink, the liquid ejecting head 50 may be coupled to the liquid storage portion 10 via a circulation mechanism for circulating the ink in the liquid ejecting head 50.

1-2. Configuration Example of Head Chip

Figure 2:
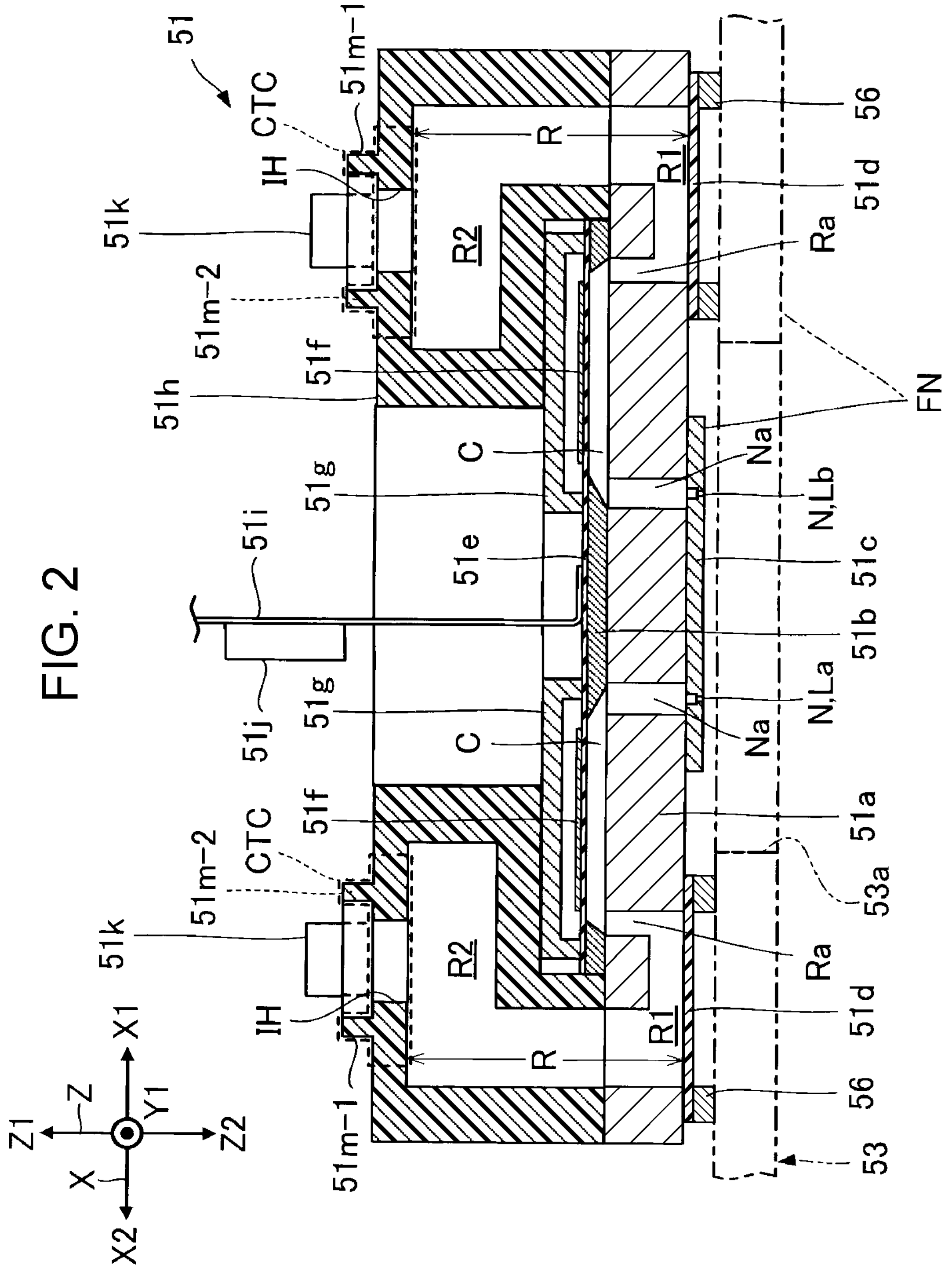
FIG. 2 is a cross-sectional view illustrating an example of a head chip.

FIG. 2 is a cross-sectional view illustrating an example of the head chip 51. The head chip 51 has a substantially symmetrical configuration in the direction along the X axis. Note that positions of a plurality of nozzles N of a nozzle row La and a plurality of nozzles N of a nozzle row Lb in the direction along the Y axis may coincide with or may be different from each other. FIG. 2 illustrates a configuration in which the positions of the plurality of nozzles N of the nozzle row La and the plurality of nozzles N of the nozzle row Lb in the direction along the Y axis coincide with each other.

As illustrated in FIG. 2, the head chip 51 includes a flow path substrate 51*a*, a pressure chamber substrate 51*b*, a nozzle plate 51*c*, a vibration absorbing body 51*d*, a vibration plate 51*e*, a plurality of drive elements 51*f*, a protective plate 51*g*, a case 51*h*, and a wiring substrate 51*i*.

The flow path substrate 51*a* and the pressure chamber substrate 51*b* are stacked in this order in the Z1 direction, and form a flow path for supplying the ink to the plurality of nozzles N. The vibration plate 51*e*, the plurality of drive elements 51*f*, the protective plate 51*g*, the case 51*h*, and the wiring substrate 51*i* are installed in a region located in the Z1 direction with respect to a stacked body formed of the flow path substrate 51*a* and the pressure chamber substrate 51*b*. On the other hand, the nozzle plate 51*c* and the vibration absorbing body 51*d* are installed in a region located in the Z2 direction with respect to the stacked body. Each element of the head chip 51 is schematically a plate-shaped member elongated in the Y direction, and the elements are joined to each other by, for example, using an adhesive. Hereinafter, each element of the head chip 51 will be described in order.

The nozzle plate 51*c* is a plate-shaped member provided with the plurality of nozzles N of each of the nozzle row La and the nozzle row Lb. Each of the plurality of nozzles N is a through-hole through which an ink passes. A surface of the nozzle plate 51*c* facing the Z2 direction constitutes a portion of an ejection surface FN.

A space R1, a plurality of individual flow paths Ra, and a plurality of communication flow paths Na are provided in the flow path substrate 51*a* for each of the nozzle row La and the nozzle row Lb. The space R1 is an elongated opening extending in the direction along the Y axis in plan view in the direction along the Z axis. Each of the individual flow paths Ra and the communication flow paths Na is a through-hole formed for each nozzle N. Each individual flow path Ra communicates with the space R1. In the present specification, the term "communication" includes not only an aspect in which two target spaces are directly coupled to form one space but also an aspect in which two target spaces are coupled via another space to form one space.

The pressure chamber substrate 51*b* is a plate-shaped member provided with a plurality of pressure chambers C for each of the nozzle row La and the nozzle row Lb. The plurality of pressure chambers C are arranged in the direction along the Y axis. Each of the pressure chambers C is formed for each nozzle N, and is an elongated space extending in the direction along the X axis in plan view.

The pressure chamber C is a space located between the flow path substrate 51*a* and the vibration plate 51*e*. The plurality of pressure chambers C are arranged in the direction along the Y axis for each of the nozzle row La and the nozzle row Lb. In addition, the pressure chamber C communicates with each of the communication flow path Na and the individual flow path Ra. Therefore, the pressure chamber C communicates with the nozzle N via the communication flow path Na, and communicates with the space R1 via the individual flow path Ra.

The vibration plate 51*e* is disposed on a surface of the pressure chamber substrate 51*b* facing the Z1 direction. The vibration plate 51*e* is a plate-shaped member that can elastically vibrate. For example, the vibration plate 51*e* has an elastic film made of silicon oxide ($SiO_2$) and an insulating film made of zirconium oxide ($ZrO_2$), and these films are stacked in this order in the Z1 direction. The vibration plate 51*e* is not limited to the above-described configuration in which the elastic film and the insulating film are stacked, and may be, for example, configured of a single layer or three or more layers.

The plurality of drive elements 51*f* mutually corresponding to the nozzles N are disposed on a surface of the vibration plate 51*e* facing the Z1 direction for each of the nozzle row La and the nozzle row Lb. Each of the drive elements 51*f* is a passive element that deforms when supplied with a drive signal. Each drive element 51*f* has an elongated shape extending in the direction along the X axis in plan view. The plurality of drive elements 51*f* are arranged in the direction along the Y axis to correspond to the plurality of pressure chambers C. The drive element 51*f* overlaps the pressure chamber C in plan view.

Each drive element 51*f* is a piezoelectric element, and although not illustrated, the drive element 51*f* has a first electrode, a piezoelectric layer, and a second electrode, which are stacked in this order in the Z1 direction. One of the first electrode and the second electrode is an individual electrode disposed to be separated from another electrode of the same type for each drive element 51*f*, and a drive signal Com is supplied to the one electrode. The other of the first electrode and the second electrode is a band-shaped common electrode extending in the direction along the Y axis to be continuous over the plurality of drive elements 51*f*, and for example, a constant potential is supplied to the other electrode. The piezoelectric layer is made of a piezoelectric material such as lead zirconate titanate ($Pb(Zr, Ti)O_3$), and for example, has a band shape extending in the direction along the Y axis to be continuous over the plurality of drive elements 51*f*. Note that the piezoelectric layer may be integrated over the plurality of drive elements 51*f*. In this case, the piezoelectric layer is provided with a through-hole penetrating the piezoelectric layer to extend in the direction along the X axis in a region corresponding to, in plan view, a gap between the pressure chambers C adjacent to each other. When the vibration plate 51*e* vibrates in conjunction with deformation of the drive element 51*f* due to the supply of the drive signal Com to the individual electrode, the pressure inside the pressure chambers C fluctuates to eject the ink from the nozzle N. The drive element 51*f* is not limited to a piezoelectric element, and may be a heater that heats the ink in the pressure chamber C. The drive element 51*f* is not limited to a piezoelectric element, and may be a heat generating element that ejects the ink from the nozzle N using a bubble generated by generating heat in the ink in the pressure chamber C.

The protective plate 51*g* is a plate-shaped member installed on the surface of the vibration plate 51*e* facing the Z1 direction, protects the plurality of drive elements 51*f*, and reinforces mechanical strength of the vibration plate 51*e*.

Here, the plurality of drive elements 51*f* are accommodated between the protective plate 51*g* and the vibration plate 51*e*.

The case 51*h* is a member for storing the ink to be supplied to the plurality of pressure chambers C. For example, the case 51*h* is made of a resin material. The case 51*h* is provided with a space R2 for each of the nozzle row La and the nozzle row Lb. The space R2 is a space communicating with the above-described space R1, and functions as a common liquid chamber R that stores the ink to be supplied to the plurality of pressure chambers C together with the space R1. The case 51*h* is provided with an inlet IH for supplying the ink to each common liquid chamber R. The inlet IH is open in the Z1 direction, and is coupled to a branch flow path Pa2-1 described below. The ink in each common liquid chamber R is supplied to the pressure chamber C via each individual flow path Ra. In the present specification, for two target spaces, "coupling" means an aspect in which the two target spaces are directly coupled.

In the present embodiment, one inlet IH is provided for one common liquid chamber R, and the head chip 51 has two inlets IH. One inlet IH of the two inlets IH is coupled to an end in the Y1 direction of the common liquid chamber R corresponding to the nozzle row La, and the other inlet IH is coupled to an end in the Y1 direction of the common liquid chamber R corresponding to the nozzle row Lb. The number of the inlets IH provided in one head chip 51 is not limited to two, and may be, for example, two or more for one common liquid chamber R. In addition, the disposition of the inlet IH is not limited to the disposition in which the inlet IH is coupled to the end in the Y1 direction of the common liquid chamber R or an end in the Y2 direction of the common liquid chamber R, and may be, for example, the disposition in which the inlet IH is coupled to a position closer to the center than the end of the common liquid chamber R in the direction along the Y axis. Each inlet IH extends in a stacking direction of the head chip 51 and a flow path structure 52 described below. The stacking direction of the head chip 51 and the flow path structure 52 is a direction along the Z axis in which the head chip 51 and the flow path structure 52 are stacked. Hereinafter, the stacking direction of the head chip 51 and the flow path structure 52 may be simply referred to as a stacking direction.

One inlet IH communicates with at least a portion of the plurality of nozzles N formed at the nozzle plate 51*c*. The nozzle plate 51*c* of the present embodiment has two nozzle rows La and Lb. Therefore, one inlet IH communicates with a portion of the plurality of nozzles N formed at the nozzle plate 51*c*, in other words, the plurality of nozzles N constituting the nozzle row La or the plurality of nozzles N constituting the nozzle row Lb. When the number of the nozzle rows formed at the nozzle plate 51*c* is one, the inlet IH may communicate with all the nozzles N formed at the nozzle plate 51*c*.

As will be described in detail below with reference to FIGS. 6 to 8, two protrusions 51*k*, two protrusions 51*m*-1, and two protrusions 51*m*-2 are provided on a surface of the case 51*h* facing the Z1 direction. Each of the two protrusions 51*k* is a rod-shaped protrusion protruding in the Z1 direction, and is inserted into a branch flow path Pa2-2 which is a preliminary flow path described below. Each of the two protrusions 51*m*-1 is an annular protrusion protruding in the Z1 direction, and the inlet IH is located inside each of the protrusions 51*m*-1 when viewed in the direction along the Z axis. The protrusion 51*m*-1 and the inlet IH form a portion of a chip-side coupling portion CTC. In addition, each of the two protrusions 51*m*-1 liquid-tightly adheres to a first selection coupling portion CTS1 of the flow path structure 52 described below. Thereby, the inlet IH and the branch flow path Pa2-1 described below are liquid-tightly coupled to each other. Each of the two protrusions 51*m*-2 is an annular protrusion protruding in the Z1 direction, and the protrusion 51*k* is located inside each of the protrusions 51*m*-2 when viewed in the direction along the Z axis. In addition, each of the two protrusions 51*m*-2 liquid-tightly adheres to a second selection coupling portion CTS2 of the flow path structure 52 described below. Thereby, the branch flow path Pa2-2 described below is liquid-tightly closed.

The vibration absorbing body 51*d* is also called a compliance substrate, is a flexible resin film forming a wall surface of the common liquid chamber R, and absorbs the pressure fluctuation in the ink in the common liquid chamber R. The vibration absorbing body 51*d* may be a flexible thin plate made of metal. A surface of the vibration absorbing body 51*d* facing the Z1 direction is joined to the flow path substrate 51*a* by using an adhesive or the like. On the other hand, a frame body 56 is joined to a surface of the vibration absorbing body 51*d* facing the Z2 direction by using an adhesive or the like. The frame body 56 is a frame-shaped member along an outer periphery of the vibration absorbing body 51*d*, and is made of, for example, a metal material. As shown by a two-dot chain line in the drawing, a fixed plate 53, which will be described below, is joined to a surface of the frame body 56 facing the Z1 direction by using an adhesive or the like.

The wiring substrate 51*i* is mounted on the surface of the vibration plate 51*e* facing the Z1 direction, and is a mounting component for electrically coupling the head chip 51, a drive circuit 51*j*, and the control unit 20. The wiring substrate 51*i* is, for example, a flexible wiring substrate such as a chip on film (COF), a flexible printed circuit (FPC) or a flexible flat cable (FFC). The drive circuit 51*j* is mounted on the wiring substrate 51*i* of the present embodiment. The drive circuit 51*j* is a circuit including a switching element for switching, based on a control signal SI, whether or not to supply at least a portion of a waveform included in the drive signal Com to the drive element 51*f* as a drive pulse.

In the above-described head chip 51, the drive element 51*f* is driven by the drive signal Com, so that the pressure inside the pressure chamber C fluctuates, and the ink is ejected from the nozzle N in accordance with the fluctuation.

1-3. Liquid Ejecting Head

Figure 3:
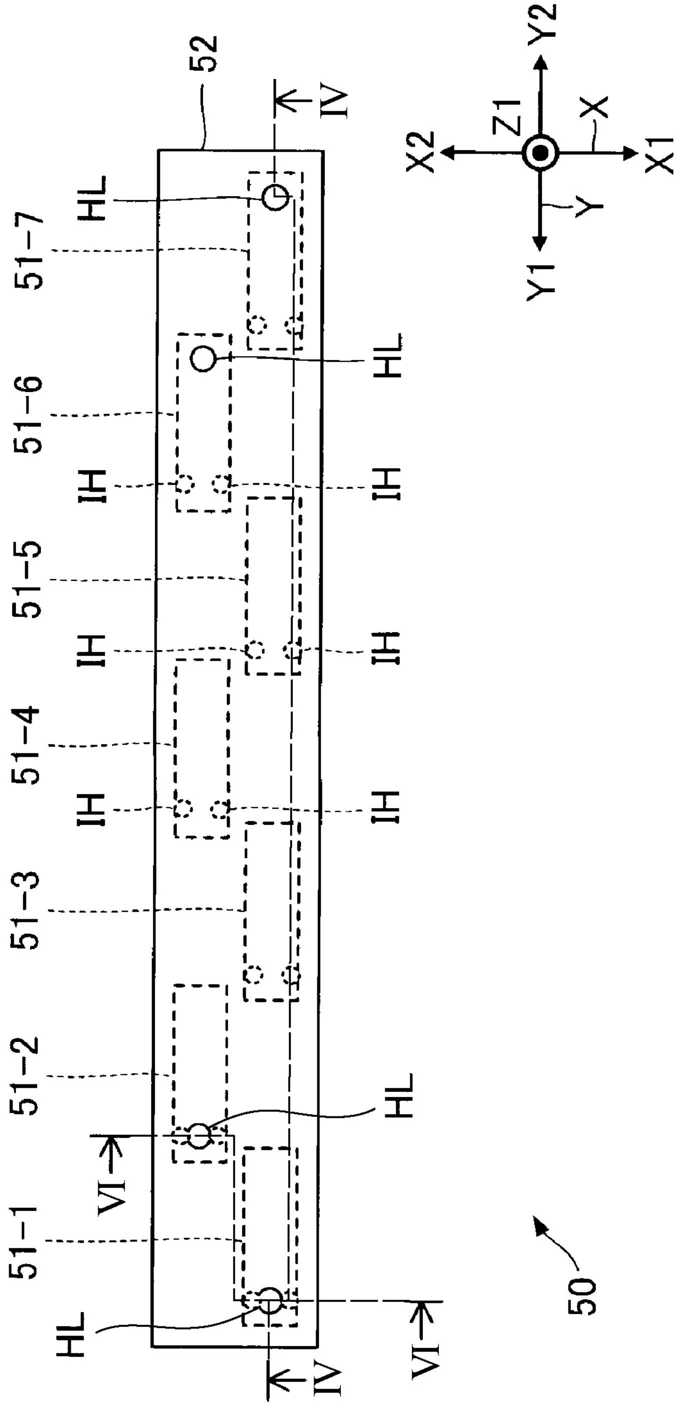
FIG. 3 is a top view of a liquid ejecting head according to the first embodiment.
Figure 4:
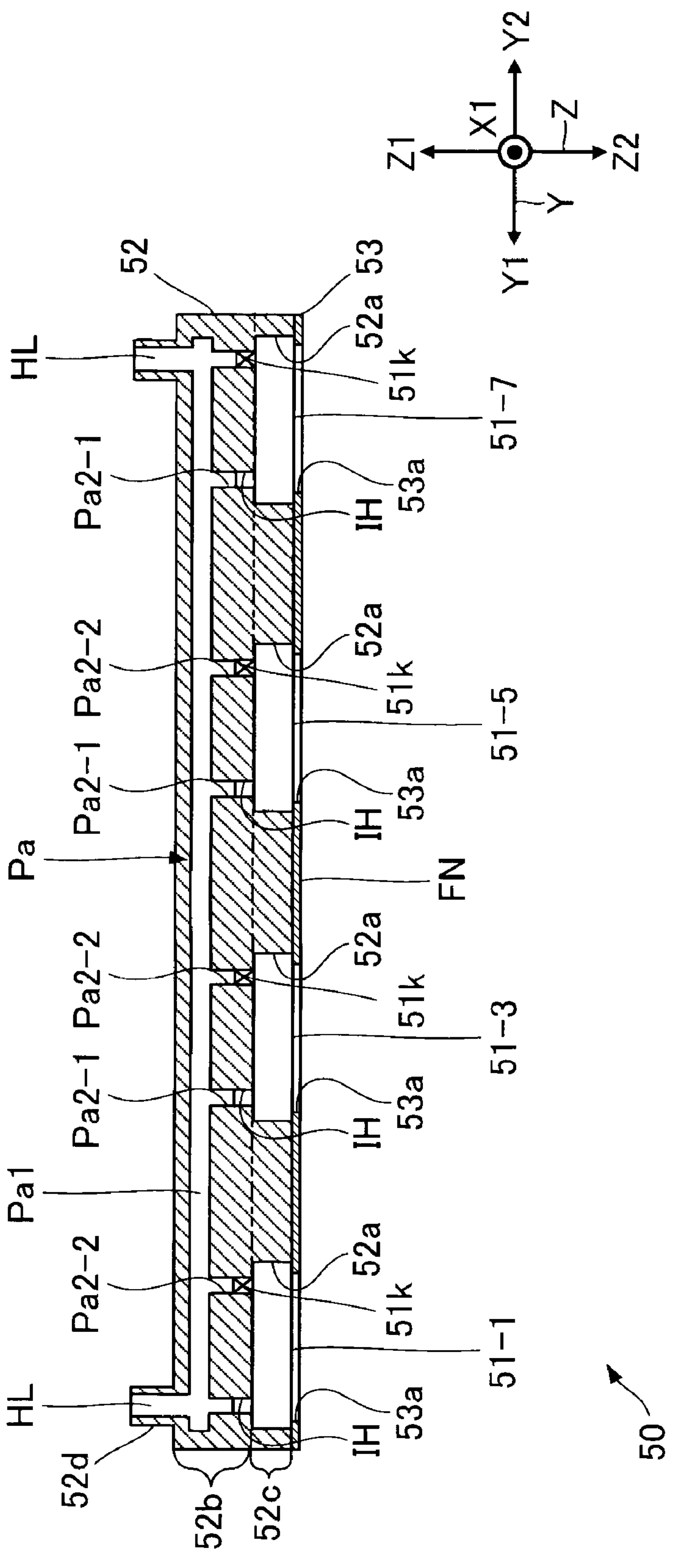
FIG. 4 is a cross-sectional view taken along the line IV-IV in FIG. 3.
Figure 5:
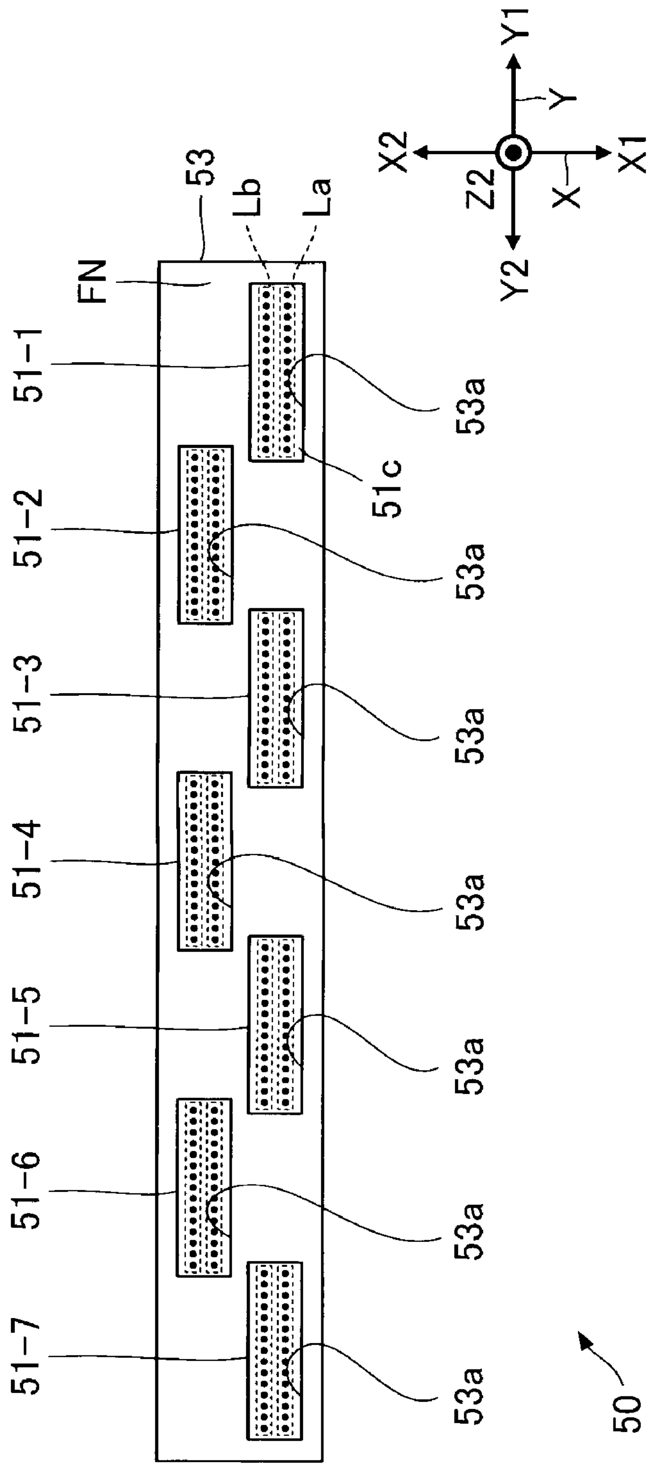
FIG. 5 is a bottom view of the liquid ejecting head according to the first embodiment.

FIG. 3 is a top view of the liquid ejecting head 50 according to the first embodiment. FIG. 4 is a cross-sectional view taken along the line IV-IV in FIG. 3. FIG. 5 is a bottom view of the liquid ejecting head 50 according to the first embodiment. FIGS. 3 to 5 schematically illustrate the liquid ejecting head 50 having head chips 51-1 to 51-7. Each of the head chips 51-1 to 51-7 is the head chip 51 described above. That is, each of the head chips 51-1 to 51-7 of the present embodiment has a common structure. Hereinafter, the head chips 51-1 to 51-7 may be referred to as the head chip 51 without distinguishing between them.

As illustrated in FIGS. 3 to 5, the liquid ejecting head 50 has the head chips 51-1 to 51-7, the flow path structure 52, and the fixed plate 53.

As illustrated in FIGS. 3 and 5, the head chips 51-1 to 51-7 are disposed in a staggered pattern when viewed in the direction along the Z axis. Here, the head chips 51-1 to 51-7 are arranged in this order in the Y2 direction. Note that the head chips 51-1, 51-3, 51-5, and 51-7 are disposed to be aligned with each other in the direction along the X axis. With respect to this, the head chips 51-2, 51-4, and 51-6 are disposed at positions in the X2 direction from the head chips

51-1, 51-3, 51-5, and 51-7 to be aligned with each other in the direction along the X axis. In addition, two head chips 51 closest to each other among the head chips 51-1 to 51-7 are disposed such that the nozzle rows La and Lb of one head chip 51 and the nozzle rows La and Lb of the other head chip 51 partially overlap when viewed in the direction along the X axis.

The flow path structure 52 is a structure in which is provided a flow path Pa for supplying the ink from the liquid storage portion 10 to the head chips 51-1 to 51-7. The flow path structure 52 is made of, for example, a resin material or a metal material.

In the present embodiment, the flow path Pa is divided into a flow path commonly provided in the head chips 51-1, 51-3, 51-5, and 51-7 and a flow path commonly provided in the head chips 51-2, 51-4, and 51-6. The flow path Pa may be configured of one flow path commonly provided for all the head chips 51, a plurality of flow paths each of which is commonly provided for groups of any two or more head chips 51, or a plurality of flow paths each of which is commonly provided for groups of any two or more nozzle rows.

As illustrated in FIG. 4, the flow path Pa has a common flow path Pa1, a plurality of branch flow paths Pa2-1, a plurality of branch flow paths Pa2-2, and a plurality of openings HL.

The common flow path Pa1 is a flow path that is commonly provided in the plurality of head chips 51. The common flow path Pa1 extends in a direction intersecting the direction along the Z axis that is the stacking direction, and specifically, extends in the direction along the Y axis. Both ends of the common flow path Pa1 communicate with the openings HL facing the Z1 direction. The ink from the liquid storage portion 10 is introduced into the opening HL.

The plurality of branch flow paths Pa2-1 are respectively provided for the inlets IH of each of the plurality of head chips 51 and are coupled to the common flow path Pa1. Here, the inlet IH and the common flow path Pa1 communicate with each other via the branch flow path Pa2-1. Each branch flow path Pa2-1 extends in a direction different from the direction in which the common flow path Pa1 extends, and specifically, extends in the direction along the Z axis, which is the stacking direction. When the liquid ejecting head 50 is regenerated as described below, the branch flow path Pa2-1 is closed by adhesion in a state where a protrusion 51*k* of a head chip 51-X described below, which is compatible with the head chip 51, is inserted. Regarding the head chip 51, the term "compatible" means having a property of being replaceable and being operatable in the substantially same manner even when replaced, and includes, in addition to a case in which the head chip 51 has the same configuration, a case in which the head chip 51 is substantially configured in the same manner so as to operate with a performance within a predetermined reference range even when the head chip has a different configuration. Specifically, when the head chip 51-X is compatible with the head chip 51, for example, an outer shape of the head chip 51-X and an outer shape of the head chip 51 are substantially the same as each other, so that the head chip 51-X can be disposed in an accommodation space S of the flow path structure 52, and the inlet IH of the head chip 51-*x* and the flow path Pa of the flow path structure 52 need only be able to be coupled to each other, in other words, an ink need only be able to be ejected from the nozzle N of the head chip 51-X mounted on the flow path structure 52.

On the other hand, the plurality of branch flow paths Pa2-2 are respectively provided for the protrusions 51*k* of each of the plurality of head chips 51 and communicate with the common flow path Pa1. Each branch flow path Pa2-2 extends in a direction different from the direction in which the common flow path Pa1 extends, and specifically, extends in the direction along the Z axis, which is the stacking direction. Here, the branch flow path Pa2-2 is a preliminary flow path, and is closed by adhesion in a state where the protrusion 51*k* is inserted. In addition, when the liquid ejecting head 50 is regenerated as described below, the inlet IH and the common flow path Pa1 communicate with each other via the branch flow path Pa2-2.

In FIG. 4, for the sake of clarity, a coupling state of the head chip 51 and the flow path structure 52 is schematically illustrated. Details of this coupling state will be described below with reference to FIGS. 6 to 8.

The flow path structure 52 of the present embodiment is a holder having a plurality of recesses 52*a* that accommodate the plurality of head chips 51-1 to 51-7. Each of the plurality of recesses 52*a* is a depression provided on a surface of the flow path structure 52 facing the Z2 direction. The head chip 51 accommodated in the accommodation space S defined between such a recess 52*a* and the fixed plate 53 overlaps the flow path structure 52 in the direction along the Z axis. The plurality of recesses 52*a* may be respectively provided for the head chips 51 or may be respectively provided for groups of two or more head chips 51. Therefore, the number of the recesses 52*a* does not need to be equal to the number of the head chips 51, the number is not limited to the plural, and may be the singular.

Here, the flow path structure 52 has a flow path forming portion 52*b*, a wall portion 52*c*, and a plurality of pipe portions 52*d*. The flow path Pa is provided in the flow path forming portion 52*b*. The wall portion 52*c* protrudes from the flow path forming portion 52*b* in the Z2 direction so as to form the plurality of recesses 52*a* using a surface of the flow path forming portion 52*b* facing the Z2 direction as a bottom surface. When viewed in the Z1 direction, the head chip 51 is surrounded by the wall portion 52*c* all around. Each of the plurality of pipe portions 52*d* protrudes from the flow path forming portion 52*b* in the Z1 direction, and each pipe portion 52*d* is provided with the opening HL and is coupled with a pipe body (not illustrated) for transporting the ink from the liquid storage portion 10.

The fixed plate 53 is a plate-shaped member for fixing the plurality of head chips 51 to the flow path structure 52. The fixed plate 53 is provided with a plurality of exposure opening portions 53*a* that expose the nozzle plate 51*c* of each head chip 51. As illustrated in FIG. 2, the exposure opening portion 53*a* of the present embodiment exposes the entire portion of the nozzle plate 51*c* to the outside. In other words, an outer periphery of the nozzle plate 51*c* is disposed within a peripheral edge of the exposure opening portion 53*a* when viewed in the Z1 direction. Note that the exposure opening portion 53*a* may expose at least a portion of the nozzle plate 51*c* to the outside. In other words, when viewed in the Z1 direction, an outer peripheral portion of the nozzle plate 51*c* may be located outside the exposure opening portion 53*a*. The fixed plate 53 is made of, for example, a metal material such as stainless steel, titanium, and magnesium alloy. In addition, the plurality of head chips 51 adhere to the fixed plate 53 in a state of being aligned with each other. A surface of the fixed plate 53 facing the Z2 direction constitutes a portion of the ejection surface FN together with a portion, which is exposed from the exposure opening portion 53*a*, on a surface of each head chip 51 facing the Z2 direction.

1-4. Coupling Structure Between Head Chip and Flow Path Structure

Figure 6:
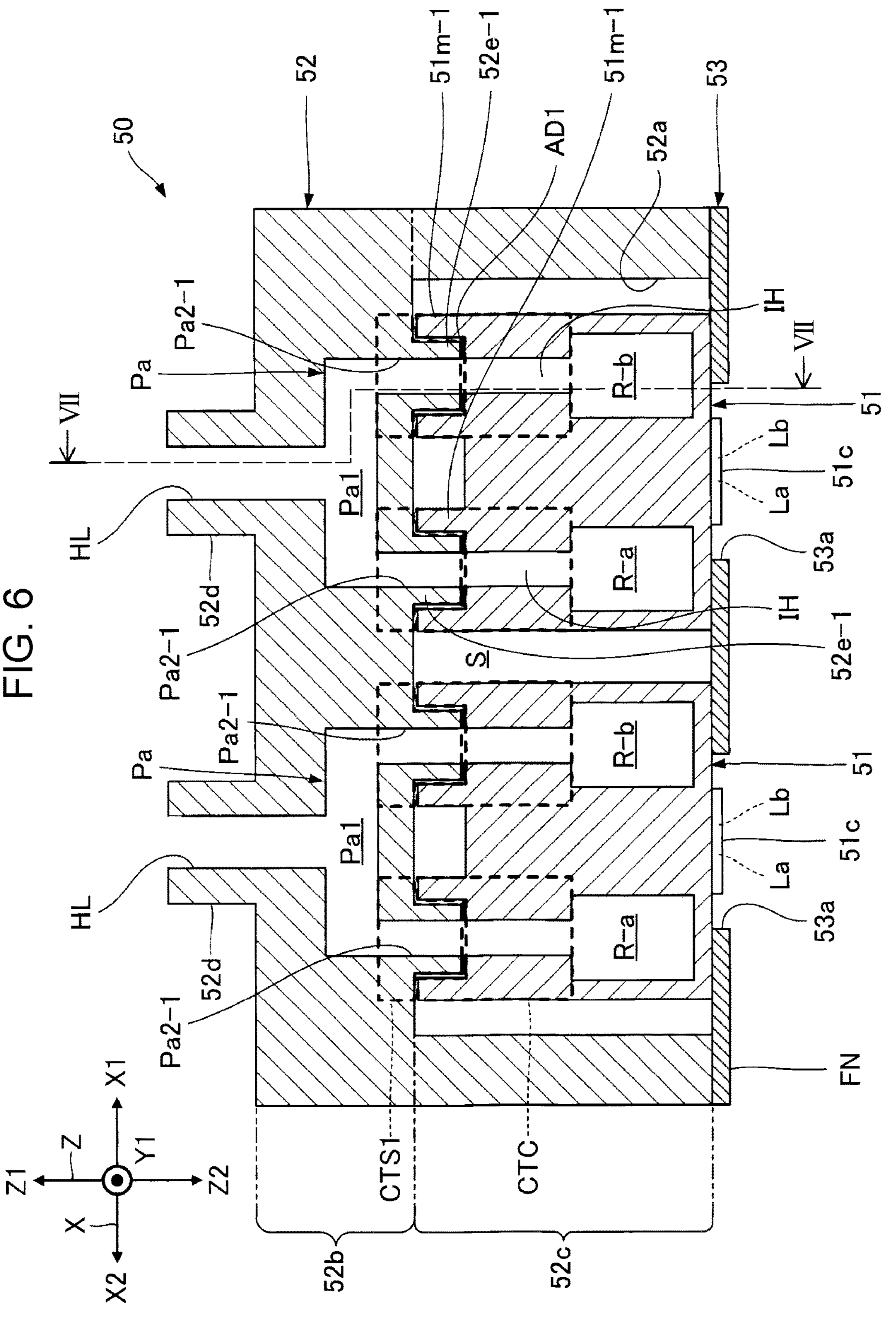
FIG. 6 is a cross-sectional view taken along the line VI-VI in FIG. 3.

FIG. 6 is a cross-sectional view taken along the line VI-VI in FIG. 3. FIG. 7 is a cross-sectional view taken along the line VII-VII in FIG. 6. In FIG. 6, the common liquid chamber R corresponding to the nozzle row La is illustrated as a common liquid chamber R-a, and the common liquid chamber R corresponding to the nozzle row Lb is illustrated as a common liquid chamber R-b. In the following, the common liquid chamber R-a and the common liquid chamber R-b may be referred to as the common liquid chamber R without distinguishing between them.

Figure 7:
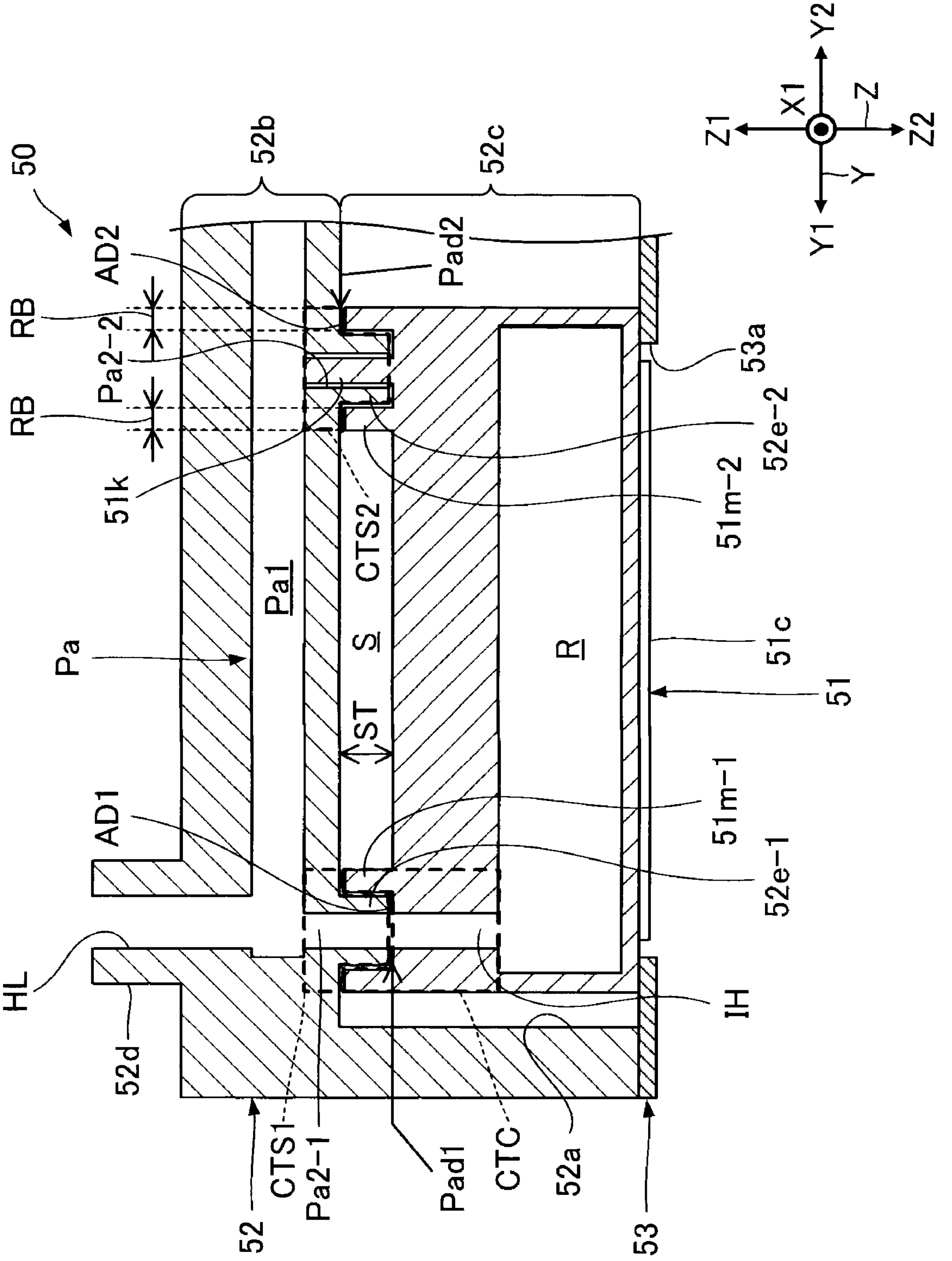
FIG. 7 is a cross-sectional view taken along the line VII-VII in FIG. 6.

As illustrated in FIGS. 6 and 7, the protrusion 51*k*, the protrusion 51*m*-1, and the protrusion 51*m*-2 are provided for each common liquid chamber R on a surface of the head chip 51 facing the Z1 direction.

The protrusion 51*m*-1 is an annular protrusion protruding in the Z1 direction. The inlet IH is open inside the protrusion 51*m*-1. Here, when viewed in the direction along the Z axis, an inner peripheral edge of the protrusion 51*m*-1 surrounds an opening of each of the inlet IH and the branch flow path Pa2-1 at a distance from the opening.

Here, the protrusion 51*m*-1 and the inlet IH form a portion of the chip-side coupling portion CTC indicated as a region surrounded by a broken line in the drawing. The chip-side coupling portion CTC is a portion of the head chip 51 including a portion to which an adhesive AD1 described below for coupling to the branch flow path Pa2-1 is applied, and a portion where the inlet IH is provided. As described above, in the present embodiment, the chip-side coupling portion CTC is a portion including the protrusion 51*m*-1 and the inlet IH, and a recess whose side surface is defined by an inner peripheral surface of the annular protrusion 51*m*-1 is provided on a surface of the chip-side coupling portion CTC facing the Z1 direction. The inlet IH is open to a bottom surface of the recess.

Each of the shapes of an outer peripheral edge and the inner peripheral edge of the protrusion 51*m*-1 when viewed in the direction along the Z axis is not particularly limited, and may be, for example, a circular shape or an elliptical shape, or a polygonal shape such as a quadrangular shape or a hexagonal shape.

The protrusion 51*m*-2 is an annular protrusion protruding in the Z1 direction at a position different from the protrusion 51*m*-1. Unlike the protrusion 51*m*-1, the inlet IH is not open inside the protrusion 51*m*-2, and the protrusion 51*k* is located when viewed in the direction along the Z axis. In other words, an inner peripheral surface of the protrusion 51*m*-2 defines a side surface of a recess that is open in the Z1 direction, and the protrusion 51*k* protrudes from a bottom surface of the recess. Here, when viewed in the direction along the Z axis, an inner peripheral edge of the protrusion 51*m*-2 surrounds an opening of each of the protrusion 51*k* and the branch flow path Pa2-2 at a distance from the opening.

Each of the shapes of an outer peripheral edge and the inner peripheral edge of the protrusion 51*m*-2 when viewed in the direction along the Z axis is not particularly limited, and may be, for example, a circular shape or an elliptical shape, or a polygonal shape such as a quadrangular shape or a hexagonal shape.

Note that, from the viewpoint of suitably regenerating the liquid ejecting head 50 (to be described below), the shape and size of the protrusion 51*m*-2 are the same as the shape and size of the protrusion 51*m*-1, but as long as the inlet IH and the branch flow path Pa2-2 can be liquid-tightly coupled to each other, one of the shape and the size may be different.

From this point of view, in the example illustrated in FIGS. 6 and 7, a tip surface of the protrusion 51*m*-2 and a tip surface of the protrusion 51*m*-1 are at the same position in the direction along the Z axis.

The protrusion 51*k* is a rod-shaped protrusion protruding in the Z1 direction. The protrusion 51*k* is located inside the protrusion 51*m*-2 when viewed in the direction along the Z axis. A tip surface of the protrusion 51*k* is higher than the tip surface of the protrusion 51*m*-2 described above. In the example illustrated in FIG. 7, a length of the protrusion 51*k* along the Z axis is substantially equal to a length of the branch flow path Pa2-2 along the Z axis. Accordingly, a tip of the protrusion 51*k* is located substantially on the same plane as a wall surface of the common flow path Pa1 in a state where the protrusion 51*k* is inserted into the branch flow path Pa2-2. As a result, retention of constituent components of the ink or foreign matter in the branch flow path Pa2-2 is prevented.

A shape of the protrusion 51*k* when viewed in the direction along the Z axis is not particularly limited, but the shape is preferably a shape that matches the shape of the branch flow path Pa2-2 when viewed in the direction along the Z axis. Thereby, retention of constituent components of the ink or foreign matter in the branch flow path Pa2-2 is suitably prevented. The constituent components of the ink include, for example, pigments as coloring materials. The shape of the protrusion 51*k* when viewed in the direction along the Z axis may be different from the shape of the branch flow path Pa2-2 when viewed in the direction along the Z axis.

Here, from the viewpoint of achieving both the insertability of the protrusion 51*k* into the branch flow path Pa2-2 and the prevention of the retention of the foreign matter or the like described above, it is preferable that, when viewed in the direction along the Z axis, an outer edge of the protrusion 51*k* is located slightly inside an outer edge of the branch flow path Pa2-2. For example, when the shape of each of the protrusion 51*k* and the branch flow path Pa2-2 is circular when viewed in the direction along the Z axis, it is preferable that a diameter of the protrusion 51*k* is slightly smaller than a diameter of the branch flow path Pa2-2.

As illustrated in FIGS. 6 and 7, a protrusion 52*e*-1 and a protrusion 52*e*-2 are provided on the surface of the flow path forming portion 52*b* of the flow path structure 52 facing the Z2 direction.

The protrusion 52*e*-1 is a columnar protrusion protruding in the Z1 direction. The branch flow path Pa2-1 is open to a tip surface of the protrusion 52*e*-1. The protrusion 52*e*-1 is inserted inside the protrusion 51*m*-1 described above. Therefore, an outer peripheral edge of the protrusion 52*e*-1 is located slightly inside the inner peripheral edge of the protrusion 51*m*-1 when viewed in the direction along the Z axis.

Here, the protrusion 52*e*-1 and the branch flow path Pa2-1 form a portion of the first selection coupling portion CTS1 indicated as a region surrounded by a broken line in the drawing. The first selection coupling portion CTS1 is a portion of the flow path structure 52 including a portion to which an adhesive AD1 described below for coupling to the inlet IH is applied, a portion to which an adhesive AD1-X for closing the branch flow path Pa2-1 at the time of regeneration of the liquid ejecting head 50 is applied, and a portion where the branch flow path Pa2-1 is provided. As described above, in the present embodiment, the first selection coupling portion CTS1 is a portion including the protrusion 52*e*-1 and the branch flow path Pa2-1, and the branch flow path Pa2-1 is open to a surface of the first selection coupling portion CTS1 facing the Z2 direction.

In the example illustrated in FIGS. 6 and 7, the protrusion amount of the protrusion 52*e*-1 from the surface of the flow path forming portion 52*b* facing the Z2 direction is equal to the protrusion amount of the protrusion 51*m*-1 from the surface of the head chip 51 facing the Z1 direction. Thereby, in a state where the protrusion 52*e*-1 is inserted inside the protrusion 51*m*-1, a distance between the tip end of the protrusion 52*e*-1 and the head chip 51 and a distance between the tip of the protrusion 51*m*-1 and the flow path structure 52 can be made equal to each other. As a result, an adhesion thickness when the tip of the protrusion 52*e*-1 is used for adhesion and an adhesion thickness when the tip of the protrusion 51*m*-1 is used for adhesion can be made equal to each other.

An outer shape of the protrusion 52*e*-1 when viewed in the direction along the Z axis is not particularly limited, and may be, for example, a circular shape or an elliptical shape, or a polygonal shape such as a quadrangular shape or a hexagonal shape. In addition, the outer shape of the protrusion 52*e*-1 when viewed in the direction along the Z axis may be the same as or different from a shape of the inner peripheral edge of the protrusion 51*m*-1 when viewed in the direction along the Z axis.

The protrusion 52*e*-2 is a structure including a columnar protrusion protruding in the Z1 direction at a position different from the protrusion 52*e*-1. The branch flow path Pa2-2 is open to a tip surface of the protrusion 52*e*-2. The protrusion 52*e*-2 is inserted inside the protrusion 51*m*-2 described above. Therefore, an outer peripheral edge of the protrusion 52*e*-2 is located slightly inside the inner peripheral edge of the protrusion 51*m*-2 when viewed in the direction along the Z axis.

Here, the protrusion 52*e*-2 and the branch flow path Pa2-2 form a portion of the second selection coupling portion CTS2 indicated as a region surrounded by a broken line in the drawing. The second selection coupling portion CTS2 is a portion of the flow path structure 52 including a portion to which an adhesive AD2 for closing the branch flow path Pa2-2 is applied, a portion to which an adhesive AD2-X described below for coupling to the inlet IH at the time of regeneration of the liquid ejecting head 50 is applied, and a portion where the branch flow path Pa2-2 is provided. As described above, in the present embodiment, the second selection coupling portion CTS2 is a portion including the protrusion 52*e*-2 and the branch flow path Pa2-2, and the branch flow path Pa2-2 is open to a surface of the second selection coupling portion CTS2 facing the Z2 direction.

The second selection coupling portion CTS2 is compatible with the first selection coupling portion CTS1. Here, the term "compatible" means having a configuration in which either the first selection coupling portion CTS1 or the second selection coupling portion CTS2 can be used for the head chip 51 or the head chip 51-*x* described below, to be coupled to the flow path of the flow path structure 52. In addition, the term "compatible" means that the first selection coupling portion CTS1 and the second selection coupling portion CTS2 are coupled to the common flow path Pa1, so that each of the first selection coupling portion CTS1 and the second selection coupling portion CTS2 has a similar function of supplying the ink from the common flow path Pa1 to the inlet IH even when either the first selection coupling portion CTS1 or the second selection coupling portion CTS2 is coupled to the inlet IH of the head chip 51.

In the example illustrated in FIGS. 6 and 7, the protrusion amount of the protrusion 52*e*-2 from the surface of the flow path forming portion 52*b* facing the Z2 direction is equal to the protrusion amount of the protrusion 51*m*-2 from the surface of the head chip 51 facing the Z1 direction. Thereby, in a state where the protrusion 52*e*-2 is inserted inside the protrusion 51*m*-2, a distance between the tip end of the protrusion 52*e*-2 and the head chip 51 and a distance between the tip of the protrusion 51*m*-2 and the flow path structure 52 can be made equal to each other. As a result, an adhesion thickness when the tip of the protrusion 52*e*-2 is used for adhesion and an adhesion thickness when the tip of the protrusion 51*m*-2 is used for adhesion can be made equal to each other.

An outer shape of the protrusion 52*e*-2 when viewed in the direction along the Z axis is not particularly limited, and may be, for example, a circular shape or an elliptical shape, or a polygonal shape such as a quadrangular shape or a hexagonal shape. In addition, the outer shape of the protrusion 52*e*-2 when viewed in the direction along the Z axis may be the same as or different from a shape of the inner peripheral edge of the protrusion 51*m*-2 when viewed in the direction along the Z axis. In addition, the outer shape of the protrusion 52*e*-2 when viewed in the direction along the Z axis may be the same as or different from the outer shape of the protrusion 52*e*-1 when viewed in the direction along the Z axis.

The tip surface of the protrusion 52*e*-1 of the first selection coupling portion CTS1 of the flow path structure 52 adheres to the bottom surface of the recess of the chip-side coupling portion CTC of the head chip 51 by the adhesive AD1. Thereby, the branch flow path Pa2-1 and the inlet IH are liquid-tightly coupled to each other at an adhesion position Pad1 by the adhesive AD1. Here, the tip surface of the protrusion 51*m*-1 of the chip-side coupling portion CTC of the head chip 51 does not adhere to the flow path structure 52.

On the other hand, the tip surface of the protrusion 52*e*-2 of the second selection coupling portion CTS2 of the flow path structure 52 does not adhere to the head chip 51. Here, the tip surface of the protrusion 51*m*-2 of the head chip 51 adheres to the second selection coupling portion CTS2 of the flow path structure 52 around the protrusion 52*e*-2 by the adhesive AD2. Thereby, the branch flow path Pa2-2 is liquid-tightly closed at an adhesion position Pad2 by the adhesive AD2.

The adhesion position Pad2 and the adhesion position Pad1 are different from each other in the direction along the Z axis. In the present embodiment, the adhesion position Pad2 is located in the Z1 direction from the adhesion position Pad1 in the direction along the Z axis. Therefore, a step ST is provided between the adhesion position Pad1 and the adhesion position Pad2 in the flow path structure 52. The step ST is generated by the provision of the protrusion 51*m*-2 and the protrusion 52*e*-1. Therefore, a height of the step ST is equal to the protrusion amount of the protrusion 51*m*-2 or the protrusion 52*e*-1.

Each of the adhesive AD1 and the adhesive AD2 need only be an adhesive that has resistance to the ink and can liquid-tightly join the head chip 51 and the flow path structure 52 to each other, and is not particularly limited, but is preferably a thermosetting adhesive such as an epoxy-based thermosetting adhesive from the viewpoint of being excellent in both joint strength and liquid resistance.

Figure 8:
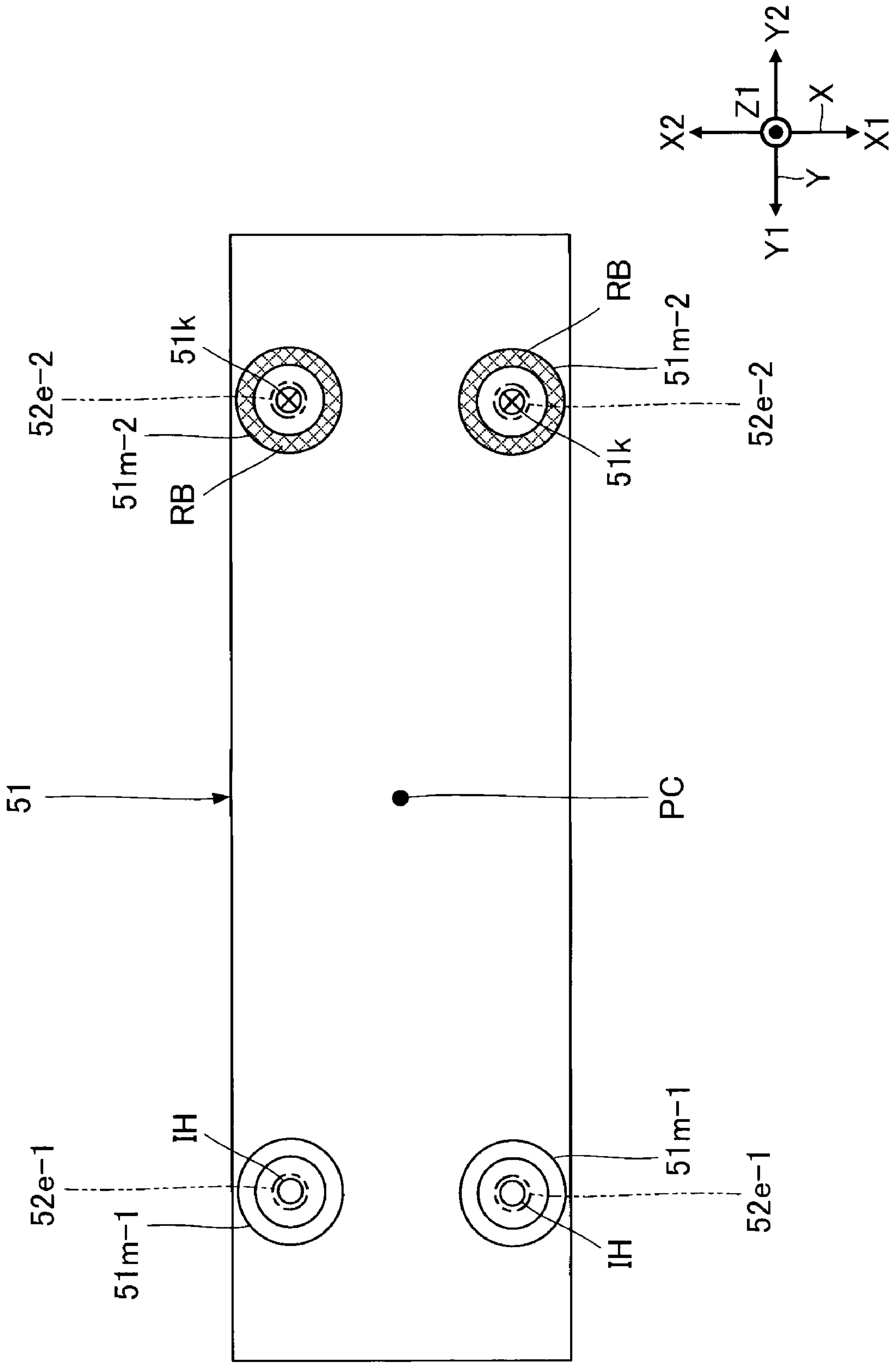
FIG. 8 is a schematic plan view for explaining a coupling position between a head chip and a flow path structure in the first embodiment.

FIG. 8 is a schematic plan view for explaining a coupling position between the head chip 51 and the flow path structure 52 in the first embodiment. FIG. 8 schematically illustrates the head chip 51 when viewed in the Z2 direction.

As illustrated in FIG. 8, when viewed in the direction along the Z axis, one protrusion 51*m*-1 (for example, the protrusion 51*m*-1 disposed at the end in the X1 direction in FIG. 8) of two protrusions 51*m*-1 is disposed to overlap one protrusion 51*m*-2 (for example, the protrusion 51*m*-2 disposed at the end in the X2 direction in FIG. 8) of two protrusions 51*m*-2 when rotated by 180° around a center PC of the head chip 51.

Similarly, when viewed in the direction along the Z axis, the other protrusion 51*m*-1 (for example, the protrusion 51*m*-1 disposed at the end in the X2 direction in FIG. 8) of two protrusions 51*m*-1 is disposed to overlap the other protrusion 51*m*-2 (for example, the protrusion 51*m*-2 disposed at the end in the X1 direction in FIG. 8) of two protrusions 51*m*-2 when rotated by 180° about a center PC of the head chip 51.

Therefore, one of the inlet IH and the protrusion 51*k* is disposed to be two-fold symmetrical about the center PC with respect to the other when viewed in the direction along the Z axis. Therefore, when a posture of the head chip 51 is rotated by 180° about an axis parallel to the Z axis, the protrusion 51*k* can be inserted into the branch flow path Pa2-1 in a state where the branch flow path Pa2-2 and the inlet IH are coupled to each other.

In the present embodiment, when the branch flow path Pa2-2 and the inlet IH are coupled to each other, the protrusion 51*k* is inserted into the branch flow path Pa2-1 corresponding to the common liquid chamber R different from the original common liquid chamber R. The original common liquid chamber R is one of the common liquid chamber R-a and the common liquid chamber R-b, and the common liquid chamber R different from the original common liquid chamber R is the other of the common liquid chamber R-a and the common liquid chamber R-b. When the number of the common liquid chambers R or the number of the inlets IH of the head chip 51 is one and the branch flow path Pa2-2 and the inlet IH are coupled to each other, the protrusion 51*k* is inserted into the branch flow path Pa2-1 corresponding to the original common liquid chamber R.

In FIG. 8, a closed region RB, which is an adhesion region formed by the adhesive AD2 when viewed in the direction along the Z axis, is displayed in a shaded manner. As described above, since the adhesive AD2 adheres to the tip surface of the protrusion 51*m*-2, the closed region RB substantially coincides with a region of the tip surface of the protrusion 51*m*-2 when viewed in the direction along the Z axis. In addition, as described above, since the protrusion 51*m*-2 surrounds the opening of the branch flow path Pa2-2 at a distance from the opening when viewed in the direction along the Z axis, the closed region RB surrounds the opening of the branch flow path Pa2-2 at a distance from the opening when viewed in the direction along the Z axis. The tip surface of the protrusion 52*e*-2, which is a region disposed at a distance from the closed region RB, can be used as an adhesion region at the time of regeneration of the liquid ejecting head 50 as will be described below.

Figure 9:
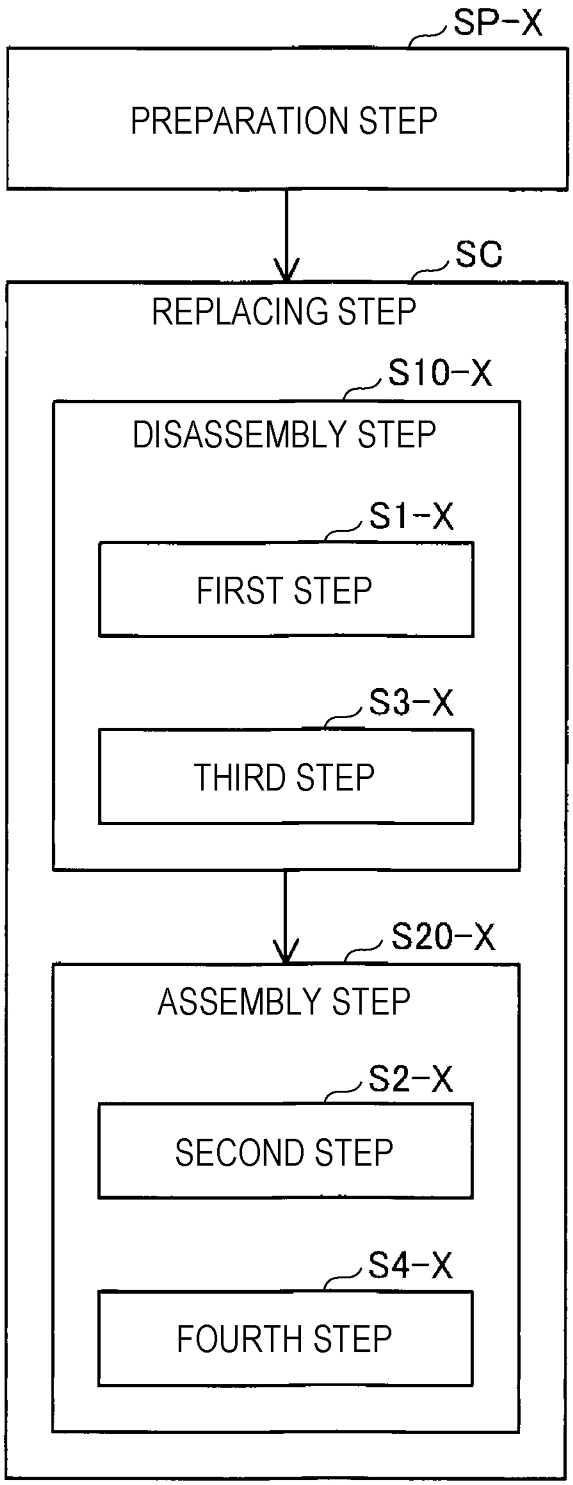
FIG. 9 is a diagram for explaining regeneration of the liquid ejecting head according to the first embodiment.

1-5. Liquid Ejecting Head Manufacturing Method Through Regeneration of Liquid Ejecting Head FIG. 9 is a diagram for explaining regeneration of the liquid ejecting head 50 according to the first embodiment. As illustrated in FIG. 9, a liquid ejecting head manufacturing method for regenerating the liquid ejecting head 50 includes a preparation step SP-X and a replacing step SC in this order.

In the preparation step SP-X, a liquid ejecting head 50 serving as a regeneration target is prepared. For example, the regeneration target is a liquid ejecting head 50 having at least one head chip 51 that needs to be replaced due to failure, shortened lifespan, or the like. In addition, in the preparation step SP-X, a head chip 51-*x* described below, which is compatible with the head chip 51, is prepared. The head chip having a short lifespan refers to, for example, a head chip in which the number of times of ink ejection from the nozzle N exceeds a predetermined threshold value.

In the replacing step SC, at least one of the plurality of head chips 51 included in the liquid ejecting head 50 is replaced with a compatible head chip 51-X for replacement described below. Specifically, the replacing step SC includes a disassembly step S10-X and an assembly step S20-X in this order. Although not illustrated, in the present embodiment, all the head chips 51 included in the liquid ejecting head 50 are replaced with the head chips 51-X. Note that only a portion of the plurality of head chips 51 included in the liquid ejecting head 50 may be replaced with the head chip 51-X. Accordingly, only the failed head chip 51 can be replaced with the head chip 51-*x*.

In the disassembly step S10-X, at least one head chip 51 serving as a replacement target is removed from the liquid ejecting head 50. Specifically, the disassembly step S10-X includes a first step S1-X and a third step S3-X. In the first step S1-X, an adhesion state between the flow path structure 52 and the head chip 51 serving as the replacement target is released. In the third step S3-X, a closed state of the branch flow path Pa2-2 of the head chip 51 serving as the replacement target is released. The execution order of the first step S1-X and the third step S3-X is not particularly limited, and may be simultaneous or may vary without regard to whether one step precedes or follows the other.

In the assembly step S20-X, the head chip 51-X for replacement is incorporated into the liquid ejecting head 50 from which the head chip 51 serving as the replacement target is removed. Specifically, the assembly step S20-*x* includes a second step S2-X and a fourth step S4-X. In the second step S2-X, the flow path structure 52 and the head chip 51-X for replacement adhere to each other. In the fourth step S4-X, the branch flow path Pa2-1 is closed. The execution order of the second step S2-X and the fourth step S4-X is not particularly limited, and may be simultaneous or may vary without regard to whether one step precedes or follows the other.

Hereinafter, each step will be described in detail with reference to FIG. 10.

Figure 10:
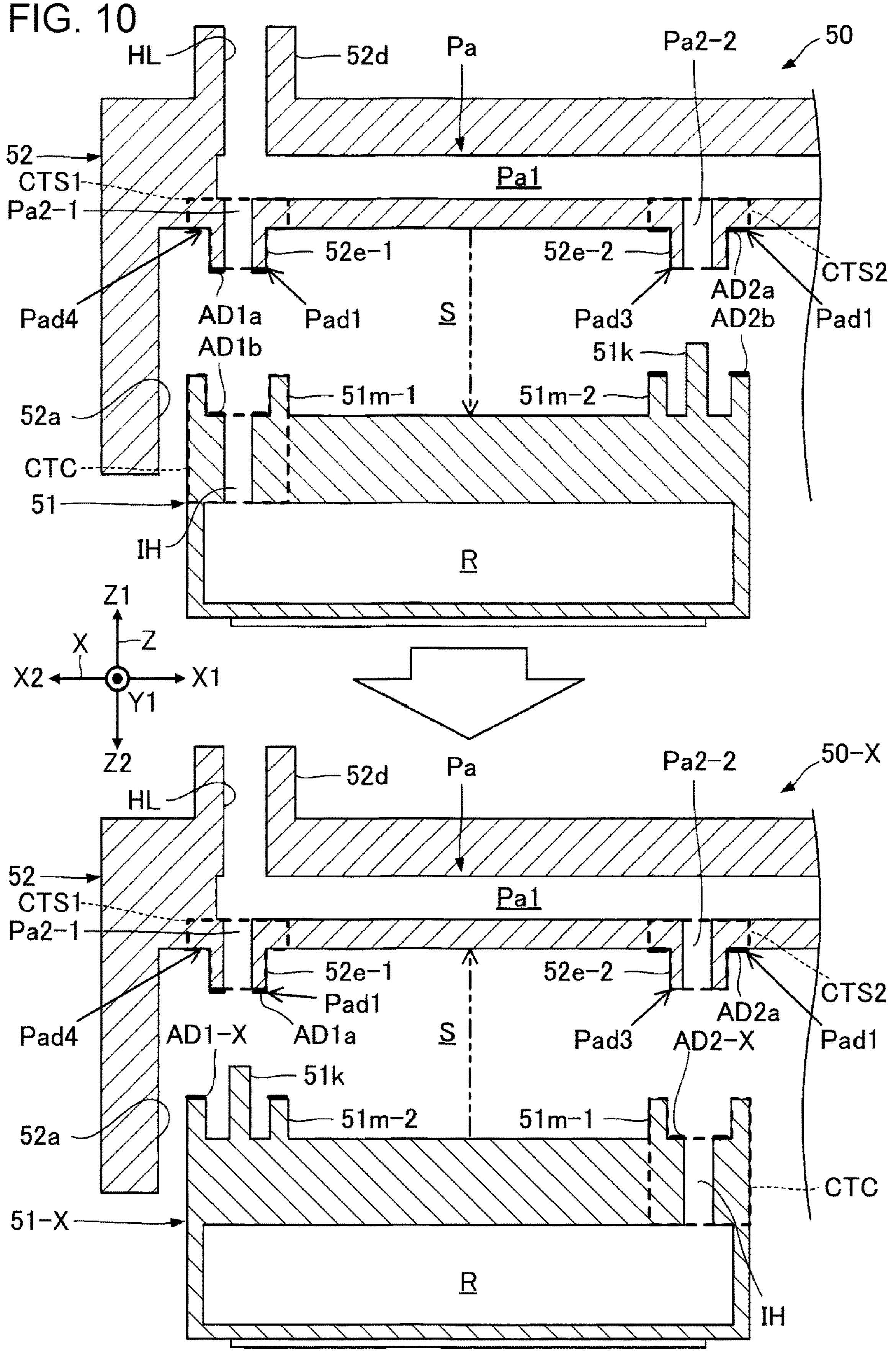
FIG. 10 is a diagram for explaining a replacing step in the first embodiment.

FIG. 10 is a diagram for explaining the replacing step SC in the first embodiment. FIG. 10 illustrates a case in which the head chip 51 of the liquid ejecting head 50 is replaced with another head chip 51-X in the replacing step SC. An upper part of FIG. 10 illustrates the disassembly step S10-X performed on the liquid ejecting head 50 illustrated in FIG. 7, and a lower part of FIG. 10 illustrates the assembly step S20-X.

The head chip 51-X is compatible with the head chip 51, and has the inlet IH, the protrusion 51*k*, and the chip-side coupling portion CTC, as with the head chip 51. In the present embodiment, the head chip 51-X and the head chip 51 have the same structure. The head chip 51-*x* is not limited to the aspect of having the same configuration as the head chip 51, and may have a portion with a different configuration from the head chip 51 as long as the head chip 51-X is compatible with the head chip 51.

As illustrated in the upper part of FIG. 10, in the disassembly step S10-X, an adhesion state between the head chip 51 and the flow path structure 52 by the adhesive AD1 and the adhesive AD2 is released.

In the first step S1-X of the disassembly step S10-X, an adhesion state between the chip-side coupling portion CTC and the first selection coupling portion CTS1 by the adhesive AD1 is released. This release is performed by breaking an adhesive layer of the adhesive AD1 by pulling the head chip 51 in the Z2 direction with respect to the flow path structure 52 as indicated by an arrow of a two-dot chain line in FIG. 10. Through this release, the adhesive AD1 is separated into an adhesive layer AD1*a* remaining on the flow path structure 52 and an adhesive layer AD1*b* remaining on the head chip 51.

In the third step S3-X of the disassembly step S10-X, an adhesion state between the head chip 51 and the second selection coupling portion CTS2 by the adhesive AD2 is released. This release is performed by breaking an adhesive layer of the adhesive AD2 by pulling the head chip 51 in the Z2 direction with respect to the flow path structure 52, as in the first step S1-X. Through this release, the adhesive AD2 is separated into an adhesive layer AD2*a* remaining on the flow path structure 52 and an adhesive layer AD2*b* remaining on the head chip 51.

As described above, in the present embodiment, the first step S1-X and the third step S3-X of the disassembly step S10-X are simultaneously performed.

The fixed plate 53 is removed by an appropriate method before the head chip 51 is removed from the liquid ejecting head 50. The fixed plate 53 is removed, for example, by disassembling or melting an adhesive for allowing the head chip 51 and the fixed plate 53 to adhere to each other by an appropriate method.

As illustrated in the lower part of FIG. 10, in the assembly step S20-X, the head chip 51-X for replacement adheres to the flow path structure 52 by adhesives AD1-X and AD2-X. Here, the head chip 51-X is accommodated in the accommodation space S in a state where the head chip 51 is rotated by 180° about the Z axis. The head chip 51-X of the present embodiment is a new product.

In the second step S2-X of the assembly step S20-*x*, the second selection coupling portion CTS2 and the head chip 51-X are liquid-tightly coupled to each other by the adhesive AD2-X. Here, the adhesive AD2-X allows the second selection coupling portion CTS2 and the head chip 51-X to adhere to each other at an adhesion position Pad3 different from the adhesion position Pad2, which is the adhesion position by the adhesive AD2.

In the example illustrated in FIG. 10, the adhesive AD2-X is applied to the bottom surface of the recess of the chip-side coupling portion CTC of the head chip 51-*x*. Thereby, the second selection coupling portion CTS2 and the head chip 51-X can adhere to each other at the adhesion position Pad3 avoiding the adhesive layer AD2*a* remaining on the flow path structure 52, and the branch flow path Pa2-2 of the head chip 51-X and the inlet IH of the head chip 51-*x* are liquid-tightly coupled to each other.

As the adhesive AD2-X, the same adhesive as the adhesive AD1 or the adhesive AD2 can be used. A type of the adhesive AD2-X may be the same as or different from a type of the adhesive AD1 or the adhesive AD2.

In the fourth step S4-X of the assembly step S20-*x*, the first selection coupling portion CTS1 is closed by the adhesive AD1-X. Here, the adhesive AD1-X allows the first selection coupling portion CTS1 and the head chip 51-X to adhere to each other at an adhesion position Pad4 different from the adhesion position Pad1, which is the adhesion position by the adhesive AD1. In the example illustrated in FIG. 10, the adhesive AD1-X is applied to the tip surface of the protrusion 51*m*-2 of the head chip 51-X. Thereby, the first selection coupling portion CTS1 and the head chip 51-*x* can adhere to each other at the adhesion position Pad4 avoiding the adhesive layer AD1*a* remaining on the flow path structure 52.

As the adhesive AD1-X, the same adhesive as the adhesive AD1 or the adhesive AD2 can be used. A type of the adhesive AD1-X may be the same as or different from a type of the adhesive AD2-X, the adhesive AD1, or the adhesive AD2. In the present embodiment, the adhesive AD1, the adhesive AD2, the adhesive AD1-X, and the adhesive AD2-X are the same type. Thereby, the types of adhesives used can be reduced, and a manufacturing cost of the liquid ejecting head 50 can be reduced.

In the assembly step S20-X, in a state where the adhesive AD1-X is applied to the tip surface of the protrusion 51*m*-2 of the chip-side coupling portion CTC of the head chip 51-X and the adhesive AD2-X is applied to the bottom surface of the recess of the chip-side coupling portion CTC of the head chip 51-*x*, the head chip 51-X is moved in the Z1 direction toward the inside of the recess 52*a* of the flow path structure 52 as indicated by the arrow of the two-dot chain line in FIG. 10. Thereby, each of the first selection coupling portion CTS1 and the second selection coupling portion CTS2 can adhere to the head chip 51-X. That is, in the present embodiment, the second step S2-X and the fourth step S4-X of the assembly step S20-X are simultaneously performed.

Although not illustrated, the assembly step S20-X may be performed in a state where the plurality of head chips 51-X adhere to the fixed plate 53 by being aligned with each other. In this case, adhesion of the fixed plate 53 and the flow path structure 52 is performed collectively with the assembly step S20-X.

As described above, a liquid ejecting head manufacturing method of manufacturing a liquid ejecting head 50-X by regenerating the liquid ejecting head 50 that includes the head chip 51 and the flow path structure 52 having the first selection coupling portion CTS1 and the second selection coupling portion CTS2, which are flow path coupling portions to the head chip 51 includes the replacing step SC. The liquid ejecting head 50 is an example of a "first liquid ejecting head", and the liquid ejecting head 50-X is an example of a "second liquid ejecting head".

In the replacing step SC, the head chip 51 in FIG. 10 is replaced with the head chip 51-X compatible with the head chip 51. The head chip 51 is an example of a "first head chip", and the head chip 51-X is an example of a "second head chip".

The replacing step SC includes a first step S1-*x* and a second step S2-X. In the first step S1-X, an adhesion state where the first selection coupling portion CTS1 and the head chip 51 are liquid-tightly coupled to each other is released. In the second step S2-X, the second selection coupling portion CTS2 compatible with the first selection coupling portion CTS1 and the head chip 51-X are liquid-tightly coupled to each other by the adhesive AD2-X.

In the liquid ejecting head manufacturing method described above, when the head chip 51 fails or the like, the liquid ejecting head 50 can be regenerated as the liquid ejecting head 50-X by replacing the head chip 51 with the head chip 51-X. As a result, the liquid ejecting head 50-*x* can be manufactured as a regenerated product of the liquid ejecting head 50. Here, by preparing the second selection coupling portion CTS2 that can be coupled to the head chip 51-X in the flow path separately from the first selection coupling portion CTS1 in the liquid ejecting head 50 before regeneration, the head chip 51-X can be liquid-tightly coupled to the second selection coupling portion CTS2 by the adhesive AD2-X without being affected by the adhesive layer AD2*a* remaining as the adhesive in the first selection coupling portion CTS1 in the liquid ejecting head 50-X after regeneration.

In the present embodiment, as described above, before the replacing step SC, the head chip 51 and the flow path structure 52 adhere to each other by the adhesive AD2 applied to the adhesion position Pad2 of the flow path structure 52 so that the second selection coupling portion CTS2 is closed. The replacing step SC includes a third step S3-X. In the third step S3-*x*, the adhesion state between the head chip 51 and the flow path structure 52 by the adhesive AD2 applied to the adhesion position Pad2 is released. In the second step S2-X, the second selection coupling portion CTS2 and the head chip 51-X adhere to each other at the adhesion position Pad3 of the flow path structure 52 which is different from the adhesion position Pad2. The adhesion position Pad2 is an example of a "first position", and the adhesion position Pad3 is an example of a "second position".

By making the adhesion position Pad2 and the adhesion position Pad3 different from each other in this manner, the head chip 51-X can be suitably liquid-tightly coupled to the second selection coupling portion CTS2 by the adhesive AD2-X without being affected by the adhesive layer AD2*a* remaining as the adhesive in the second selection coupling portion CTS2 in the liquid ejecting head 50-X after regeneration.

Here, the fact that "the adhesion position Pad2 and the adhesion position Pad3 are different from each other" includes an aspect in which a region of the adhesive AD2 applied to the adhesion position Pad2 and a region of the adhesive AD2-X applied to the adhesion position Pad3 do not overlap each other in plan view, and an aspect in which the regions overlap each other with an overlap ratio of 25% or less. The phrase "aspect in which the regions overlap each other with an overlap ratio of 25% or less" means that a ratio of a region where the region of the adhesive AD2 and the region of the adhesive AD2-X overlap with respect to the region of the adhesive AD2 or the region of the adhesive AD2-X is 25% or less in plan view. Note that it is preferable that the region of the adhesive AD2 and the region of the adhesive AD2-X do not overlap each other.

In addition, as described above, the replacing step SC includes a fourth step S4-X. In the fourth step S4-X, the first selection coupling portion CTS1 is closed by the adhesive AD1-X. Therefore, the used first selection coupling portion CTS1 can be closed by a simple method.

Figure 11:
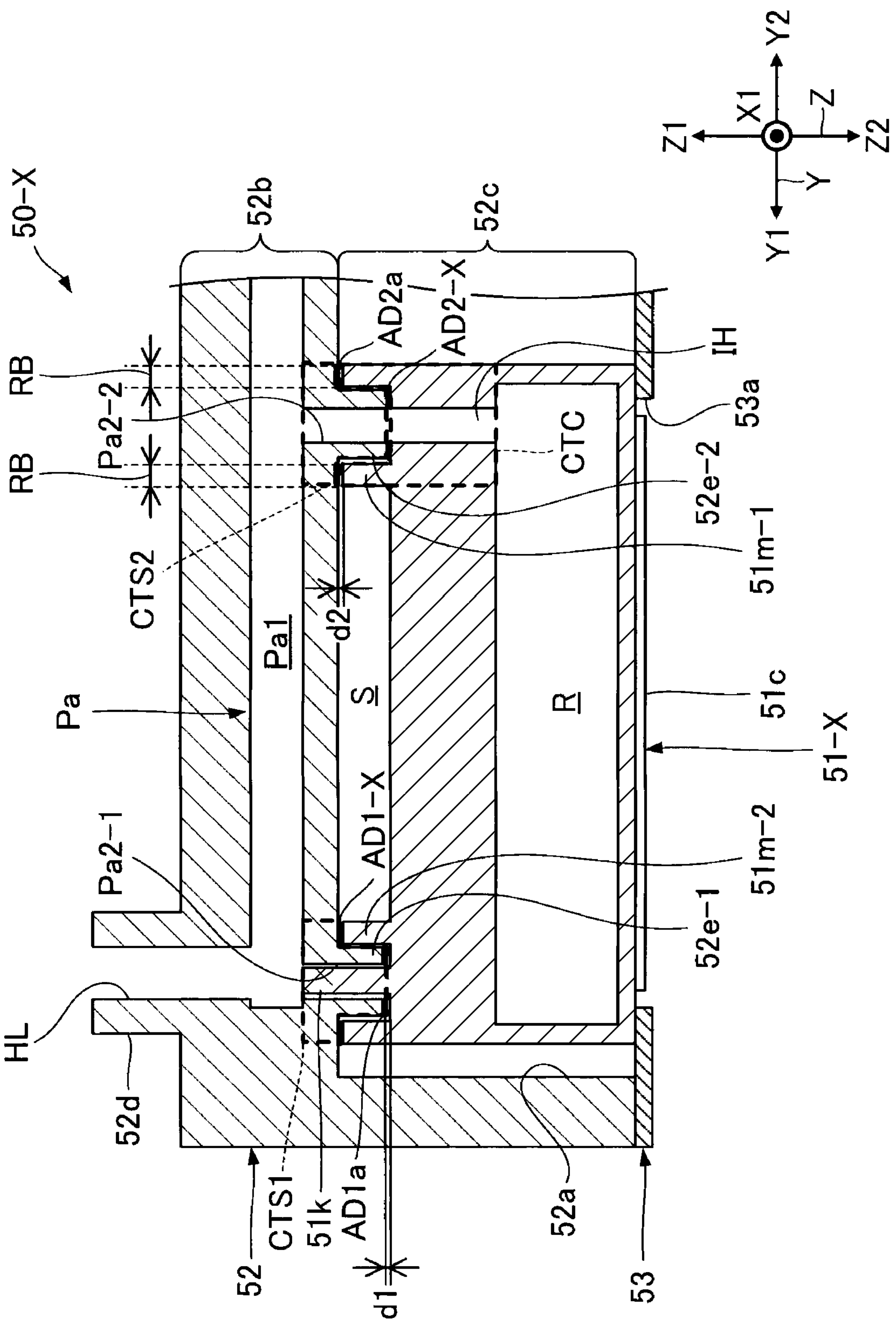
FIG. 11 is a cross-sectional view of a liquid ejecting head obtained by regeneration in the first embodiment.

FIG. 11 is a cross-sectional view of the liquid ejecting head 50-X obtained by regeneration in the first embodiment. The liquid ejecting head 50-*x* is obtained through the replacing step SC illustrated in FIG. 10 described above.

The liquid ejecting head 50-X has the above-described head chip 51-*x*. The head chip 51-X adheres to the flow path structure 52 by the adhesives AD1-X and AD2-X.

Specifically, the chip-side coupling portion CTC of the head chip 51-X liquid-tightly adheres to the second selection coupling portion CTS2 of the flow path structure 52 by the adhesive AD2-X. Thereby, the inlet IH of the head chip 51-X is liquid-tightly coupled to the branch flow path Pa2-2. Here, the adhesion by the adhesive AD2-X is performed in a region different from the adhesion region of the adhesive layer AD2*a*. The adhesive layer AD2*a* adheres to the flow path structure 52 but does not adhere to the head chip 51-X. A thickness of the adhesive layer AD2*a* is thinner than a thickness of the adhesive AD2-X. Therefore, a gap d2 is formed between the adhesive layer AD2*a* and the head chip 51-*x*.

The tip surface of the protrusion 51*m*-2 of the head chip 51-X liquid-tightly adheres to the first selection coupling portion CTS1 of the flow path structure 52 by the adhesive AD1-X. Thereby, the branch flow path Pa2-1 is liquid-tightly closed by the adhesive AD1-X in a state where the protrusion 51*k* of the head chip 51-X is inserted into the branch flow path Pa2-1. Here, the adhesion by the adhesive AD1-X is performed in a region different from the adhesion region of the adhesive layer AD1*a*. The adhesive layer AD1*a* adheres to the flow path structure 52 but does not adhere to the head chip 51-*x*. A thickness of the adhesive layer AD1*a* is thinner than a thickness of the adhesive AD1-X. Therefore, a gap d1 is formed between the adhesive layer AD1*a* and the head chip 51-*x*.

As described above, the liquid ejecting head 50-*x* obtained by the regeneration as described above includes the head chip 51-X that ejects a liquid, the flow path structure 52 having the common flow path Pa1, and the adhesive layer AD1*a* interposed between the head chip 51-X and the flow path structure 52. Here, the flow path structure 52 has the first selection coupling portion CTS1 and the second selection coupling portion CTS2. In the liquid ejecting head 50-X, the first selection coupling portion CTS1 is coupled to the common flow path Pa1 and is closed so as not to be coupled to the flow path in the head chip 51-*x*. In addition, in the liquid ejecting head 50-*x*, the second selection coupling portion CTS2 is coupled to the common flow path Pa1 and is liquid-tightly coupled to the head chip 51-X by the adhesive AD2-X. The adhesive layer AD1*a* adheres to the first selection coupling portion CTS1 without adhering to the head chip 51-*x*. The adhesive layer AD1*a* is an example of a "first adhesive layer".

In addition, as described above, in the liquid ejecting head 50-X, the gap d1 exists between the adhesive layer AD1*a* and the head chip 51-X. Therefore, the adhesion by the adhesive AD2-X is suitably performed.

Furthermore, as described above, the liquid ejecting head 50-X includes the adhesive layer AD2*a* interposed between the head chip 51-X and the flow path structure 52. In the liquid ejecting head 50-X, when viewed in the direction along the Z axis, which is the stacking direction of the head chip 51-X and the flow path structure 52, the flow path structure 52 includes the closed region RB surrounding the opening of the second selection coupling portion CTS2 at a distance from the opening of the second selection coupling portion CTS2. The adhesive layer AD2*a* adheres to the closed region RB without adhering to the head chip 51. The adhesive layer AD2*a* is an example of a "second adhesive layer".

The liquid ejecting head 50 described above includes the head chip 51 and the flow path structure 52 as described above. The head chip 51 has the plurality of nozzles N, the common liquid chamber R, and the inlet IH. Each of the plurality of nozzles N ejects an ink, which is an example of a "liquid". The common liquid chamber R communicates with the plurality of nozzles N. The inlet IH communicates with the common liquid chamber R. The head chip 51 is joined to the flow path structure 52 by the adhesive AD1 and the adhesive AD2. The flow path structure 52 has the common flow path Pa1, the branch flow path Pa2-1, and the branch flow path Pa2-2. The inlet IH is an example of a "chip-side flow path", the branch flow path Pa2-1 is an example of a "first selection flow path", the branch flow path Pa2-2 is an example of a "second selection flow path", the adhesive AD1 is an example of "a first adhesive", and the adhesive AD2 is an example of a "second adhesive".

Here, the branch flow path Pa2-1 is coupled to the common flow path Pa1 and is liquid-tightly coupled to the inlet IH by the adhesive AD1. The branch flow path Pa2-2 is coupled to the common flow path Pa1.

An outer surface of the flow path structure 52 includes the closed region RB. The closed region RB surrounds the opening of the branch flow path Pa2-2 at a distance from the opening of the branch flow path Pa2-2 when viewed in the stacking direction of the head chip 51 and the flow path structure 52. The adhesive AD2 allows the head chip 51 and the flow path structure 52 to adhere to each other in the closed region RB so that the branch flow path Pa2-2 is closed. Here, the outer surface of the flow path structure 52 is a surface different from an inner surface defining the flow path Pa in the flow path structure 52, and includes a surface defining the recess 52*a*, that is, a surface defining the accommodation space S. The closed region RB is disposed on a surface, which defines the accommodation space S, of the outer surface of the flow path structure 52.

In the above liquid ejecting head 50, by closing the branch flow path Pa2-2 while using the branch flow path Pa2-1 as a flow path, the branch flow path Pa2-2 can be prepared as a preliminary flow path without liquid leakage from the branch flow path Pa2-2.

Here, since the closed region RB is a region at a distance from the branch flow path Pa2-2, when the head chip 51 is replaced as in the description of FIGS. 10 and 11, the adhesive layer AD2*a* as the adhesive remaining on the closed region RB can be avoided when the inlet IH of the new head chip 51-X is liquid-tightly coupled to the branch flow path Pa2-2 by the adhesive AD2-X. That is, by using a region without the remaining adhesive layer AD2*a*, the inlet IH of the new head chip 51-X can be liquid-tightly coupled to the branch flow path Pa2-2 by the adhesive AD2-X. Therefore, the remaining adhesive layer AD2*a* does not adversely affect a sealing property of the adhesive AD2-X after replacement.

As described above, the head chip 51 can be suitably replaced. As a result, the liquid ejecting head 50 can be easily regenerated. In the present embodiment, an aspect is exemplified in which the branch flow path Pa2-1 after the replacement of the head chip 51 is closed by the adhesive AD1-X.

In the present embodiment, as described above, the branch flow path Pa2-2 is closed by the adhesive AD2 and the outer surface of the head chip 51. Therefore, the branch flow path Pa2-2 is suitably closed. Here, the outer surface of the head chip 51 is a surface different from the inner surface defining the flow path such as the common liquid chamber R or the inlet IH in the head chip 51.

In addition, as described above, the adhesion position Pad1 by the adhesive AD1 and the adhesion position Pad2 by the adhesive AD2 are different from each other in the stacking direction. Therefore, the step ST exists between these adhesion positions. Therefore, it is possible to prevent the closed region RB from expanding in a direction approaching the opening of the branch flow path Pa2-2. As a result, when the head chip 51 is replaced, the region without the adhesive layer AD2*a* remaining on the closed region RB is stably secured, and the region can be used to allow the inlet IH of the new head chip 51-*x* to easily adhere to the branch flow path Pa2-2 when the branch flow path Pa2-2 is used as a flow path.

Furthermore, as described above, the head chip 51 includes the nozzle plate 51*c* provided with the plurality of nozzles N. The adhesion position Pad1 is disposed between the adhesion position Pad2 and the nozzle plate 51*c* in the stacking direction. Therefore, when the liquid ejecting head 50 is used in a posture of ejecting a liquid in a direction of gravity, even when the air bubbles enter a space between the adhesion position Pad2 and the opening of the branch flow path Pa2-2, the air bubbles can be made to be difficult to flow out from the space into the common flow path Pa1 during printing due to buoyancy. Therefore, the air bubbles are less likely to flow toward the head chip 51 via the branch flow path Pa2-1, and it is possible to prevent printing defects due to the air bubbles. In addition, since the air bubbles are retained in the vicinity of the closed region RB, and the air bubbles make it difficult for the liquid to contact the adhesive AD2 of the closed region RB, the leakage of the liquid from the closed region RB can be suppressed by suppressing the attack of the liquid on the adhesive AD2.

In addition, as described above, the head chip 51 has the protrusion 51*k* to be inserted into the branch flow path Pa2-2. Therefore, it is possible to reduce the precipitation of the constituent components of the liquid or the retention of the air bubbles in the branch flow path Pa2-2.

2. Second Embodiment

Hereinafter, a second embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 12:
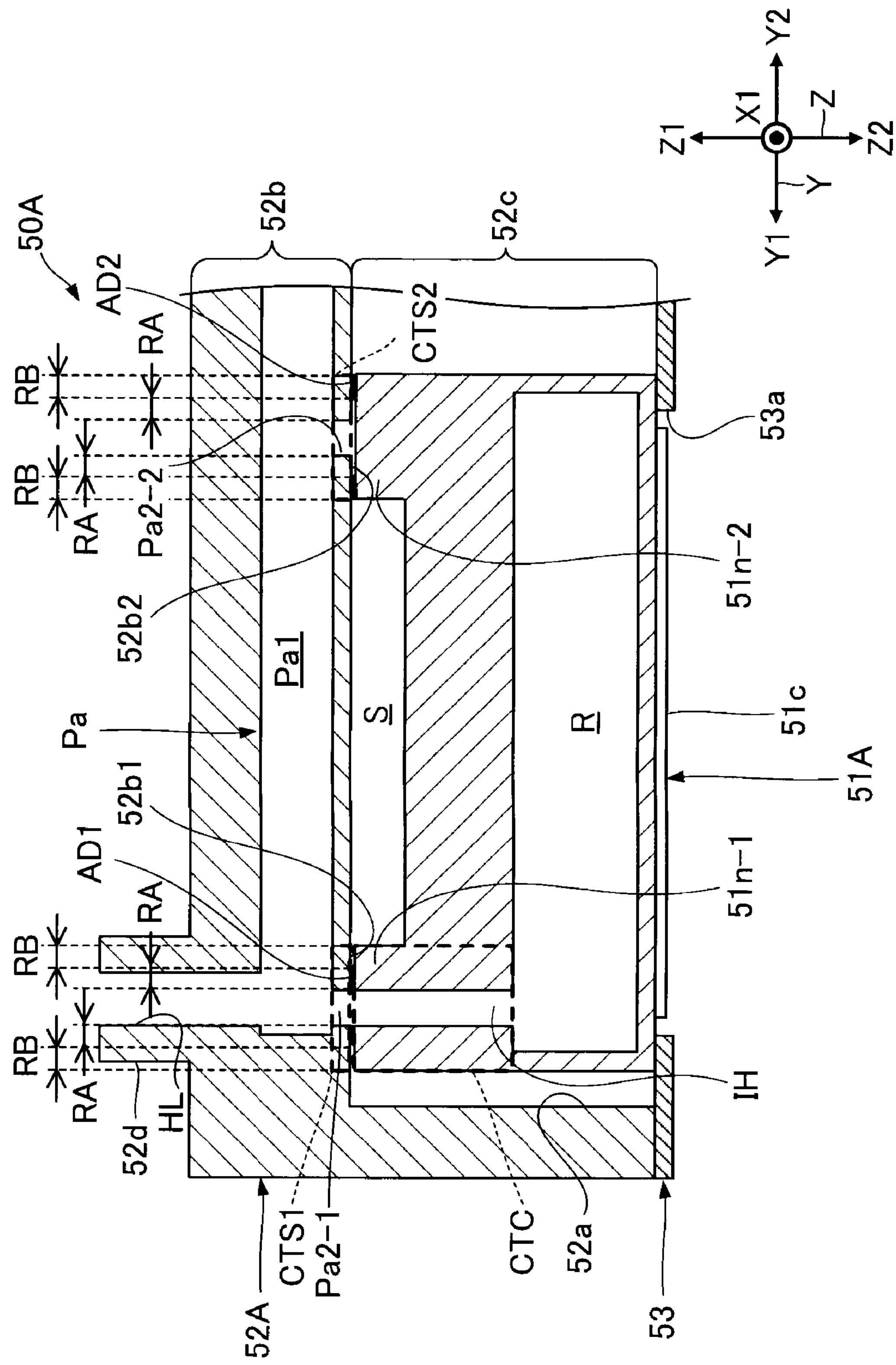
FIG. 12 is a cross-sectional view of a liquid ejecting head according to a second embodiment.

FIG. 12 is a cross-sectional view of a liquid ejecting head 50A according to a second embodiment. The liquid ejecting head 50A has the same configuration as the liquid ejecting head 50 of the first embodiment except that the liquid ejecting head 50A has a head chip 51A instead of the head chip 51 and has a flow path structure 52A instead of the flow path structure 52.

As illustrated in FIG. 12, the head chip 51A has the same configuration as the head chip 51 of the first embodiment except that the head chip 51A has a protrusion 51*n*-1 instead of the protrusion 51*m*-1 and has a protrusion 51*n*-2 instead of the protrusion 51*m*-2.

The protrusion 51*n*-1 and the protrusion 51*n*-2 are provided for each common liquid chamber R on a surface of the head chip 51A facing the Z1 direction.

The protrusion 51*n*-1 is a protrusion protruding in the Z1 direction. The inlet IH is open to a tip surface of the protrusion 51*n*-1. An outer shape of the protrusion 51*n*-1 when viewed in the direction along the Z axis is not particularly limited, and may be, for example, a circular shape or an elliptical shape, or a polygonal shape such as a quadrangular shape or a hexagonal shape.

Here, the protrusion 51*n*-1 and the inlet IH form the chip-side coupling portion CTC. In the present embodiment, the chip-side coupling portion CTC is a portion including the protrusion 51*n*-1 and the inlet IH, and the surface of the chip-side coupling portion CTC facing the Z1 direction is the tip surface of the protrusion 51*n*-1. Therefore, the inlet IH is open to the tip surface of the chip-side coupling portion CTC of the present embodiment.

The protrusion 51*n*-2 is a protrusion protruding in the Z1 direction at a position different from the protrusion 51*n*-1. Unlike the protrusion 51*n*-1, the inlet IH is not open to a tip surface of the protrusion 51*n*-2, and the tip surface is a flat surface extending in the direction orthogonal to the Z axis. An outer shape of the protrusion 51*n*-2 when viewed in the direction along the Z axis is not particularly limited, and may be, for example, a circular shape or an elliptical shape, or a polygonal shape such as a quadrangular shape or a hexagonal shape.

Note that, from the viewpoint of suitably regenerating the liquid ejecting head 50A, the shape and size of the protrusion 51*n*-2 are the same as the shape and size of the protrusion 51*n*-1, but as long as the inlet IH and the branch flow path Pa2-2 can be liquid-tightly coupled to each other, one of the shape and the size may be different.

From this point of view, in the example illustrated in FIG. 12, the tip surface of the protrusion 51*n*-2 and the tip surface of the protrusion 51*n*-1 are at the same position in the direction along the Z axis. It is equal to a protrusion height.

As illustrated in FIG. 12, the flow path structure 52A has the same configuration as the flow path structure 52 of the first embodiment except that the protrusion 52*e*-1 and the protrusion 52*e*-2 are omitted.

In the flow path structure 52A, the surface of the flow path forming portion 52*b* facing the Z2 direction is a flat surface. The first selection coupling portion CTS1 of the present embodiment is the same as the first selection coupling portion CTS1 of the first embodiment except that the first selection coupling portion CTS1 includes a portion 52*b*1, which is a portion of the flat surface, instead of the protrusion 52*e*-1. The portion 52*b*1 faces the above-described protrusion 51*n*-1, and the branch flow path Pa2-1 is open to the portion 52*b*1.

Similarly, the second selection coupling portion CTS2 of the present embodiment is the same as the second selection coupling portion CTS2 of the first embodiment except that the second selection coupling portion CTS2 includes a portion 52*b*2, which is a portion of the flat surface, instead of the protrusion 52*e*-2. The portion 52*b*2 faces the above-described protrusion 51*n*-2, and the branch flow path Pa2-2 is open to the portion 52*b*2.

A surface of the portion 52*b*1 of the first selection coupling portion CTS1 of the flow path structure 52A facing the Z2 direction adheres to the tip surface of the protrusion 51*n*-1 of the head chip 51A by the adhesive AD1. Thereby, the branch flow path Pa2-1 and the inlet IH are liquid-tightly coupled to each other by the adhesive AD1. Here, the portion 52*b*1 is divided into two regions: a peripheral region RA adjacent to an opening of the branch flow path Pa2-1 in plan view and a closed region RB farther from the opening than the peripheral region RA. Of the two regions, the adhesive AD1 adheres to the peripheral region RA but does not adhere to the closed region RB. As in the first embodiment, the closed region RB to which the adhesive AD1 is not applied is used as an adhesion region to the protrusion 51*n*-2 of the new head chip 51A in order to close the branch flow path Pa2-1 of the flow path structure 52A at the time of regeneration of the liquid ejecting head 50A.

On the other hand, a surface of the portion 52*b*2 of the second selection coupling portion CTS2 of the flow path structure 52A facing the Z2 direction adheres to the tip surface of the protrusion 51*n*-2 of the head chip 51A by the adhesive AD2. Thereby, the branch flow path Pa2-2 is liquid-tightly closed by the adhesive AD2. Here, the portion 52*b*2 is divided into two regions: a peripheral region RA adjacent to the opening of the branch flow path Pa2-2 in plan view and a closed region RB farther from the opening than the peripheral region RA. Of the two regions, the adhesive AD2 adheres to the closed region RB but does not adhere to the peripheral region RA. As in the first embodiment, the peripheral region RA to which the adhesive AD2 is not applied is used as an adhesion region for liquid-tightly coupling the inlet IH of the new head chip 51A and the branch flow path Pa2-2 of the flow path structure 52A to each other at the time of regeneration of the liquid ejecting head 50A.

In the present embodiment, the adhesion position by the adhesive AD2 in the direction along the Z axis coincides with the adhesion position by the adhesive AD1 in the direction along the Z axis. Also in such a case, as described above, the adhesion region formed by the adhesive AD2 surrounds the opening of the branch flow path Pa2-2 at a distance from the opening as described above, whereby, as in the first embodiment, the liquid ejecting head 50A can be regenerated through the replacing step SC. In the present embodiment, as in the first embodiment, the inlet IH is an example of a "chip-side flow path", the branch flow path Pa2-1 is an example of a "first selection flow path", the branch flow path Pa2-2 is an example of a "second selection flow path", the adhesive AD1 is an example of "a first adhesive", and the adhesive AD2 is an example of a "second adhesive".

Figure 13:
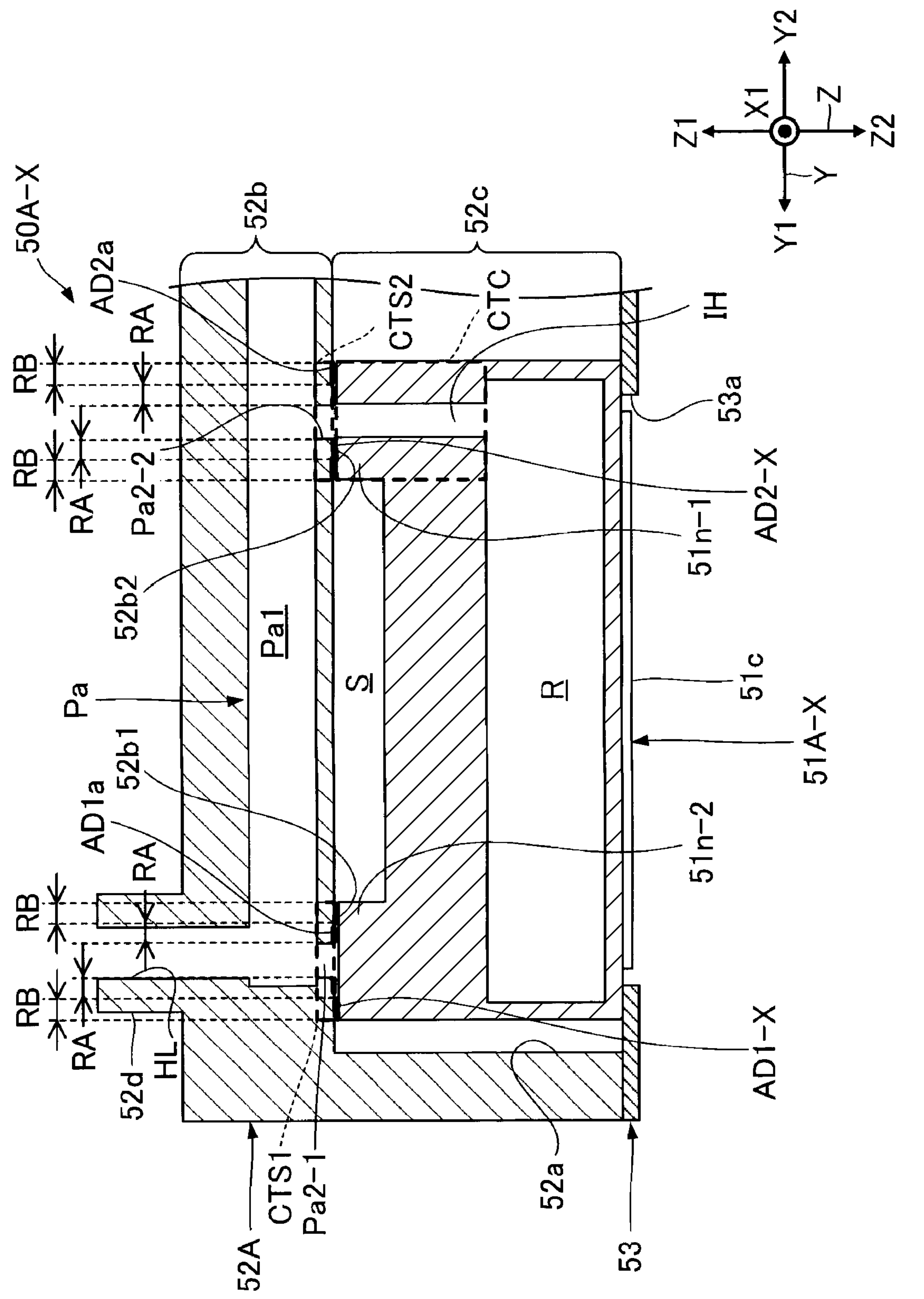
FIG. 13 is a cross-sectional view of a liquid ejecting head obtained by regeneration in the second embodiment.

FIG. 13 is a cross-sectional view of a liquid ejecting head 50A-X obtained by regeneration in the second embodiment. The liquid ejecting head 50A-X is manufactured by replacing the head chip 51A of the liquid ejecting head 50A in FIG. 12 with a head chip 51A-X compatible with the head chip 51A.

As illustrated in FIG. 13, the surface of the portion 52*b*2 of the second selection coupling portion CTS2 of the flow path structure 52A facing the Z2 direction adheres to the tip surface of the protrusion 51*n*-1 of the head chip 51A-X by the adhesive AD2-X. Thereby, the branch flow path Pa2-2 and the inlet IH are liquid-tightly coupled to each other by the adhesive AD2-X. The adhesive AD2-X adheres to the peripheral region RA of the portion 52*b*2 but does not adhere to the closed region RB of the portion 52*b*2. As in the first embodiment, the adhesive layer AD2*a*, which is a portion of the adhesive AD2, remains in the closed region RB of the portion 52*b*2. The adhesive layer AD2*a* adheres to the closed region RB of the portion 52*b*2 but does not adhere to the head chip 51A-X. The adhesive layer AD2*a* of the present embodiment is in contact with the protrusion 51*n*-1 of the head chip 51A-X, but does not adhere thereto. Of course, as in the first embodiment, the adhesive layer AD2*a* may have a gap with the head chip 51A-X.

On the other hand, the surface of the portion 52*b*1 of the first selection coupling portion CTS1 of the flow path structure 52A facing the Z2 direction adheres to the tip surface of the protrusion 51*n*-1 of the head chip 51A-x by the adhesive AD1-X. Thereby, the branch flow path Pa2-1 is liquid-tightly closed by the adhesive AD1-X. The adhesive AD2-X adheres to the closed region RB of the portion 52*b*1 but does not adhere to the peripheral region RA. As in the first embodiment, the adhesive layer AD1*a*, which is a portion of the adhesive AD1, remains in the peripheral region RA of the portion 52*b*1. The adhesive layer AD1*a* adheres to the peripheral region RA of the portion 52*b*1 but does not adhere to the head chip 51A-X. The adhesive layer AD1*a* of the present embodiment is in contact with the protrusion 51*n*-2 of the head chip 51A-X, but does not adhere thereto. Of course, as in the first embodiment, the adhesive layer AD2*a* may have a gap with the head chip 51A-X.

As described above, according to the second embodiment, the liquid ejecting head 50A can also be regenerated. In the present embodiment, the liquid ejecting head 50A is an example of a "first liquid ejecting head", and the liquid ejecting head 50A-X is an example of a "second liquid ejecting head". The head chip 51A is an example of a "first head chip", and the head chip 51A-X is an example of a "second head chip". The adhesive layer AD1*a* is an example of a "first adhesive layer". The adhesive layer AD2*a* is an example of a "second adhesive layer".

In addition, as illustrated in FIG. 12, the length of the branch flow path Pa2-2 of the present embodiment in the stacking direction is preferably shorter than the maximum diameter of a cross section of the branch flow path Pa2-2 perpendicular to the stacking direction. Accordingly, it is possible to prevent the components of the ink from precipitating or to prevent the air bubbles from retaining in the branch flow path Pa2-2. From the same viewpoint, the length of the branch flow path Pa2-2 of the present embodiment in the stacking direction is preferably shorter than the length of the common flow path Pa1 in the stacking direction. The length of the branch flow path Pa2-2 of the present embodiment in the stacking direction corresponds to a length from a bottom surface, on which an opening, which is an end of the branch flow path Pa2-2 in the Z1 direction, is formed, of the common flow path Pa1 to an outer surface, on which an opening, which is an end of the branch flow path Pa2-2 in the Z2 direction is formed, of the flow path structure 52A. These points also apply to the branch flow path Pa2-1.

3. Third Embodiment

Hereinafter, a third embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 14:
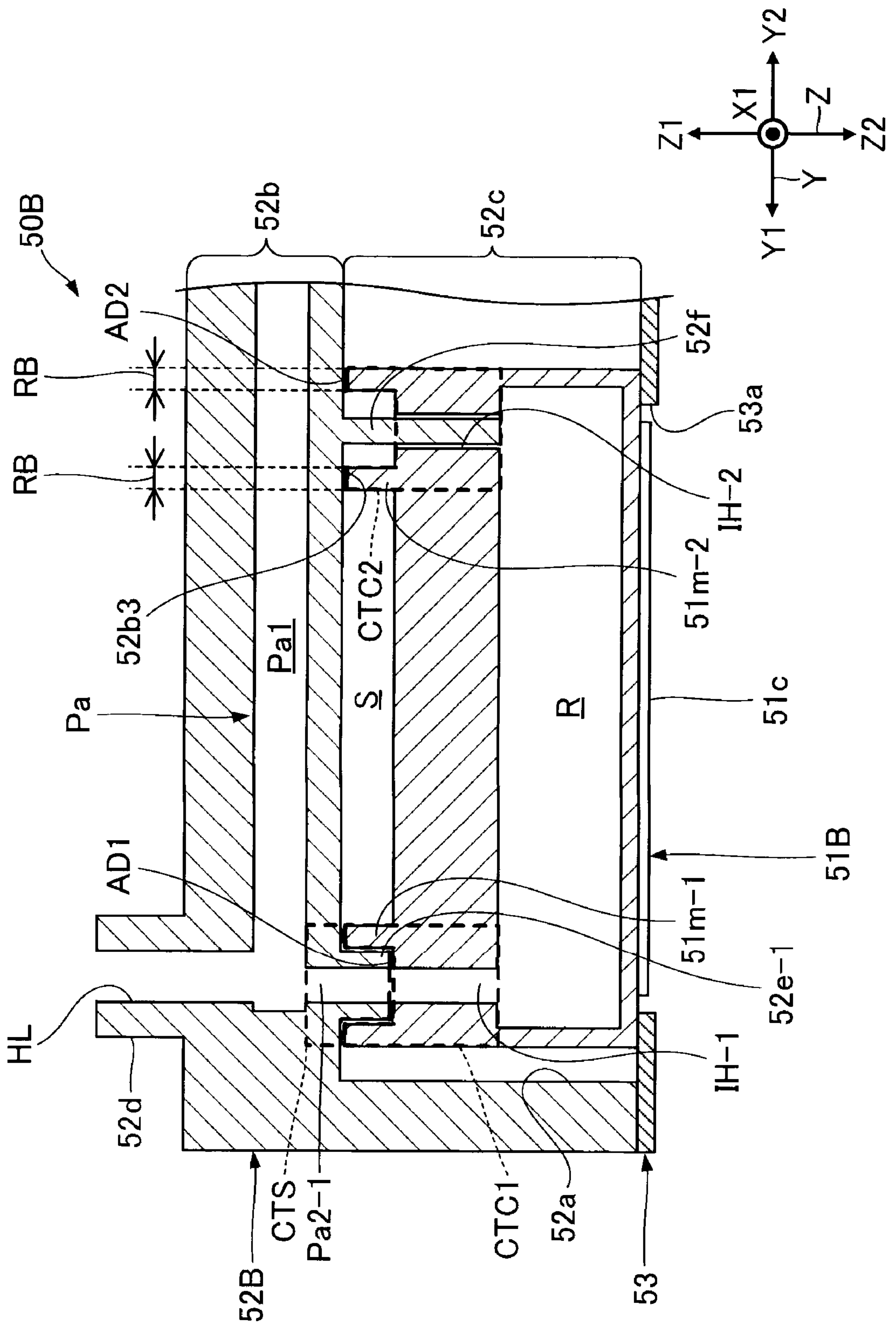
FIG. 14 is a cross-sectional view of a liquid ejecting head according to a third embodiment.

FIG. 14 is a cross-sectional view of a liquid ejecting head 50B according to a third embodiment. The liquid ejecting head 50B has the same configuration as the liquid ejecting head 50 of the first embodiment except that the liquid ejecting head 50B has a head chip 51B instead of the head chip 51 and has a flow path structure 52B instead of the flow path structure 52.

As illustrated in FIG. 14, the head chip 51B has the same configuration as the head chip 51 of the first embodiment except that the protrusion 51*k* is omitted and the head chip 51B has inlets IH-1 and IH-2 to be coupled to the same common liquid chamber R. Each of the inlets IH-1 and IH-2 has the same configuration as the inlet IH of the first embodiment.

Here, the protrusion 51*m*-1 and the inlet IH-1 form a first chip-side coupling portion CTC1. The first chip-side coupling portion CTC1 is a portion of the head chip 51B including a portion to which an adhesive AD1 for coupling to the branch flow path Pa2-1 is applied, a portion to which an adhesive AD1-Y for closing the inlet IH-1 at the time of reuse of the head chip 51B is applied, and a portion where the inlet IH-1 is provided. As described above, in the present embodiment, the first chip-side coupling portion CTC1 is a portion including the protrusion 51*m*-1 and the inlet IH-1, and the inlet IH-1 is open to a surface of the first chip-side coupling portion CTC1 facing the Z1 direction.

The inlet IH-2 is open inside the protrusion 51*m*-2. Therefore, when viewed in the direction along the Z axis, the inner peripheral edge of the protrusion 51*m*-2 surrounds an opening of the inlet IH-2 at a distance from the opening.

Here, the protrusion 51*m*-2 and the inlet IH-2 form a second chip-side coupling portion CTC2. The second chip-side coupling portion CTC2 is a portion of the head chip 51B including a portion to which an adhesive AD2 for closing the inlet IH-2 of the head chip 51B is applied, a portion to which an adhesive AD2-Y for coupling to the branch flow path Pa2-1 at the time of reuse of the head chip 51B is applied, and a portion where the inlet IH-2 is provided. As described above, in the present embodiment, the second chip-side coupling portion CTC2 is a portion including the protrusion 51*m*-2 and the inlet IH-2, and the inlet IH-2 is open to a surface of the second chip-side coupling portion CTC2 facing the Z1 direction.

The second chip-side coupling portion CTC2 is compatible with the first chip-side coupling portion CTC1. Here, the term "compatible" means having a configuration in which either the first chip-side coupling portion CTC1 or the second chip-side coupling portion CTC2 can be used for the flow path structure 52B or a flow path structure 52B-X described below, to be coupled to the flow path of the head chip 51B. In addition, the term "compatible" means that the first chip-side coupling portion CTC1 and the second chip-side coupling portion CTC2 are coupled to the common liquid chamber R, which is a common flow path, so that each of the first chip-side coupling portion CTC1 and the second chip-side coupling portion CTC2 has a similar function of introducing the ink from the flow path Pa of the flow path structure 52B into the common liquid chamber R even when either the first chip-side coupling portion CTC1 or the second chip-side coupling portion CTC2 is coupled to the branch flow path Pa2-1 of the flow path structure 52B.

The flow path structure 52B has the same configuration as the flow path structure 52 of the first embodiment except that the branch flow path Pa2-2 and the protrusion 52*e*-2 are omitted and a protrusion 52*f* is added. In the present embodiment, the branch flow path Pa2-1 and the protrusion 52*e*-1 form a portion of the coupling portion CTS.

The coupling portion CTS is a portion of the flow path structure 52B including a portion to which an adhesive AD1 described below for coupling to the inlet IH-1 is applied, and a portion where the branch flow path Pa2 is provided. As described above, in the present embodiment, the coupling portion CTS is a portion including the branch flow path Pa2-1 and the protrusion 52*e*-1, and the branch flow path Pa2-1 is open to a surface of the coupling portion CTS facing the Z2 direction.

A surface of the portion 52*b*3, which is a portion of the flow path forming portion 52*b* of the present embodiment, facing the Z2 direction adheres to the tip surface of the protrusion 51*m*-2 of the second chip-side coupling portion CTC2 of the head chip 51B by the adhesive AD2. Thereby, the inlet IH-2 is liquid-tightly closed by the adhesive AD2. Here, the tip surface of the protrusion 51*m*-2 corresponds to the closed region RB when viewed in the direction along the Z axis. As in the first embodiment, the closed region RB is used as an adhesion region when the head chip 51B is reused by being inverted by 180°.

The protrusion 52*f* is a rod-shaped protrusion protruding in the Z2 direction from the flow path forming portion 52*b*. The protrusion 52*f* is located inside the portion 52*b*3 when viewed in the direction along the Z axis. A length of the protrusion 52*f* along the Z axis is set such that a tip of the protrusion 52*f* is located substantially on the same plane as the wall surface of the common liquid chamber R. The length of the protrusion 52*f* along the Z axis is not limited to the example illustrated in FIG. 14, and is set in any desired way.

A shape of the protrusion 52*f* when viewed in the direction along the Z axis is not particularly limited, but the shape is preferably a shape that matches the shape of the inlet IH-2 when viewed in the direction along the Z axis. Thereby, the contact, with the adhesive AD2, of the liquid flowing out from the common liquid chamber R via the inlet IH-2 is reduced. The shape of the protrusion 52*f* when viewed in the direction along the Z axis may be different from the shape of the inlet IH-2 when viewed in the direction along the Z axis.

Here, from the viewpoint of achieving both the insertability of the protrusion 52*f* into the inlet IH-2 and the contact reduction of the liquid with the adhesive AD2 described above, it is preferable that, when viewed in the direction along the Z axis, an outer edge of the protrusion 52*f* is located slightly inside an outer edge of the inlet IH-2. For example, when the shape of each of the protrusion 52*f* and the inlet IH-2 is circular when viewed in the direction along the Z axis, it is preferable that a diameter of the protrusion 52*f* is slightly smaller than a diameter of the inlet IH-2.

As described above, the liquid ejecting head 50B includes the head chip 51B and the flow path structure 52B. The head chip 51B has the plurality of nozzles N ejecting a liquid and the common liquid chamber R communicating with the plurality of nozzles N. The flow path structure 52B has the branch flow path Pa2-1 communicating with the common liquid chamber R, and is joined to the head chip 51B by the adhesive AD1 and the adhesive AD2. The head chip 51B has the common liquid chamber R, the inlet IH-1, and the inlet IH-2. The inlet IH-1 is coupled to the common liquid chamber R and is liquid-tightly coupled to the branch flow path Pa2-1 by the adhesive AD1. The inlet IH-2 is coupled to the common liquid chamber R. The branch flow path Pa2-1 is an example of a "coupling flow path", the inlet IH-1 is an example of a "first chip-side flow path", the inlet IH-2 is an example of a "second chip-side flow path", the adhesive AD1 is an example of a "first adhesive", and the adhesive AD2 is an example of a "second adhesive".

An outer surface of the head chip 51B includes the closed region RB. The closed region RB surrounds the opening of the inlet IH-2 at a distance from the opening of the inlet IH-2 when viewed in the Z1 direction or in the Z2 direction, which is a stacking direction of the head chip 51B and the flow path structure 52B. The adhesive AD2 allows the head chip 51B and the flow path structure 52B to adhere to each other in the closed region RB so that the inlet IH-2 is closed. Therefore, when there is a liquid ejecting head 50B including a broken head chip 51B and an unbroken head chip 51B, by incorporating the unbroken head chip 51B as a portion of another liquid ejecting head 50B, the head chip 51B can be reused.

Figure 15:
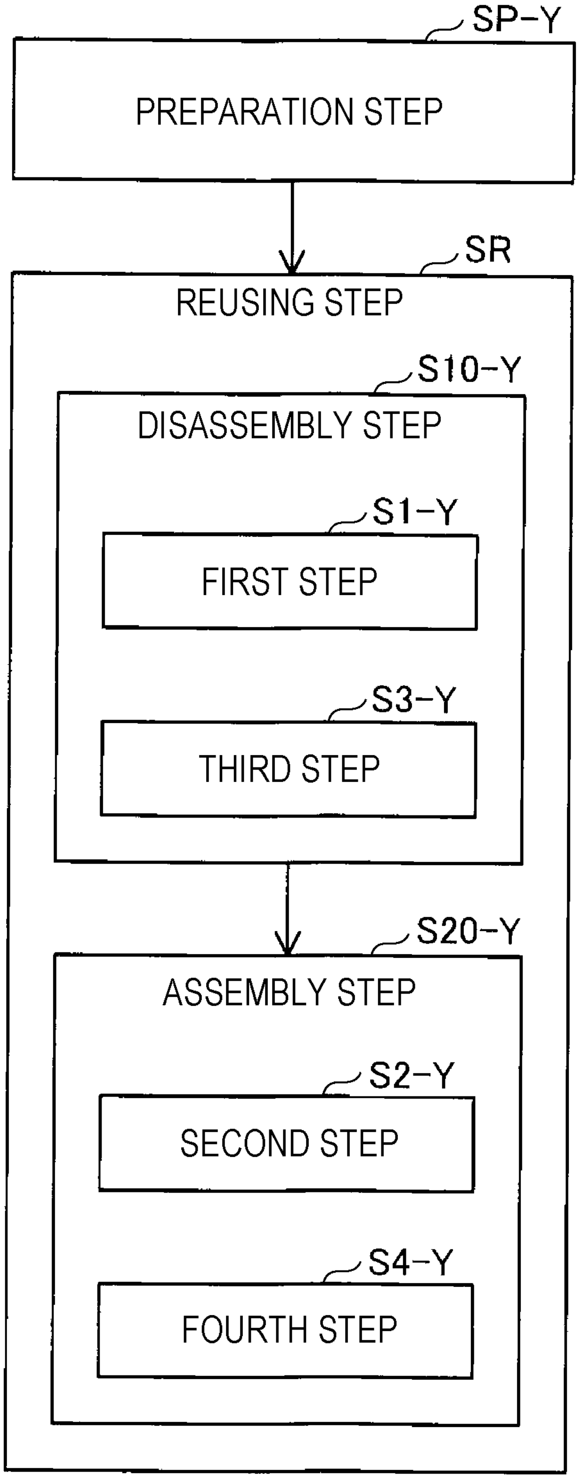
FIG. 15 is a diagram for explaining reuse of a head chip of the liquid ejecting head according to the third embodiment.

FIG. 15 is a diagram for explaining reuse of the head chip 51B of the liquid ejecting head 50B according to the third embodiment. As illustrated in FIG. 15, a liquid ejecting head manufacturing method for reusing the head chip 51B includes a preparation step SP-Y and a reusing step SR in this order.

In the preparation step SP-Y, a liquid ejecting head 50B having the head chip 51B serving as a reuse target is prepared. In addition, in the preparation step SP-Y, a flow path structure 52B-Y described below, which is compatible with the flow path structure 52B, is prepared.

In the reusing step SR, the head chip 51B serving as the reuse target is reused for a liquid ejecting head 50B-Y described below, which is another liquid ejecting head 50B. Specifically, the reusing step SR includes a disassembly step S10-Y and an assembly step S20-Y in this order.

In the disassembly step S10-Y, at least one head chip 51B serving as the reuse target is removed from the liquid ejecting head 50B. Specifically, the disassembly step S10-Y includes a first step S1-Y and a third step S3-Y. In the first step S1-Y, an adhesion state where the branch flow path Pa2-1 of the flow path structure 52B and the inlet IH-1 of the head chip 51B serving as the reuse target are liquid-tightly coupled to each other is released. In the third step S3-Y, a closed state of the inlet IH-2 of the head chip 51B serving as the reuse target is released. The execution order of the first step S1-Y and the third step S3-Y is not particularly limited, and may be simultaneous or may vary without regard to whether one step precedes or follows the other.

In the assembly step S20-Y, the removed head chip 51B serving as the reuse target is incorporated into another liquid ejecting head 50B-Y. Specifically, the assembly step S20-Y includes a second step S2-Y and a fourth step S4-Y. In the second step S2-Y, the branch flow path Pa2-1 of the flow path structure 52B-Y of the other liquid ejecting head 50B-Y and the inlet IH-2 of the head chip 51B serving as the reuse target are liquid-tightly coupled to each other. In the fourth step S4-Y, the inlet IH-1 of the head chip 51B serving as the reuse target is closed. The execution order of the second step S2-Y and the fourth step S4-Y is not particularly limited, and may be simultaneous or may vary without regard to whether one step precedes or follows the other.

Hereinafter, each step will be described in detail with reference to FIG. 16.

Figure 16:
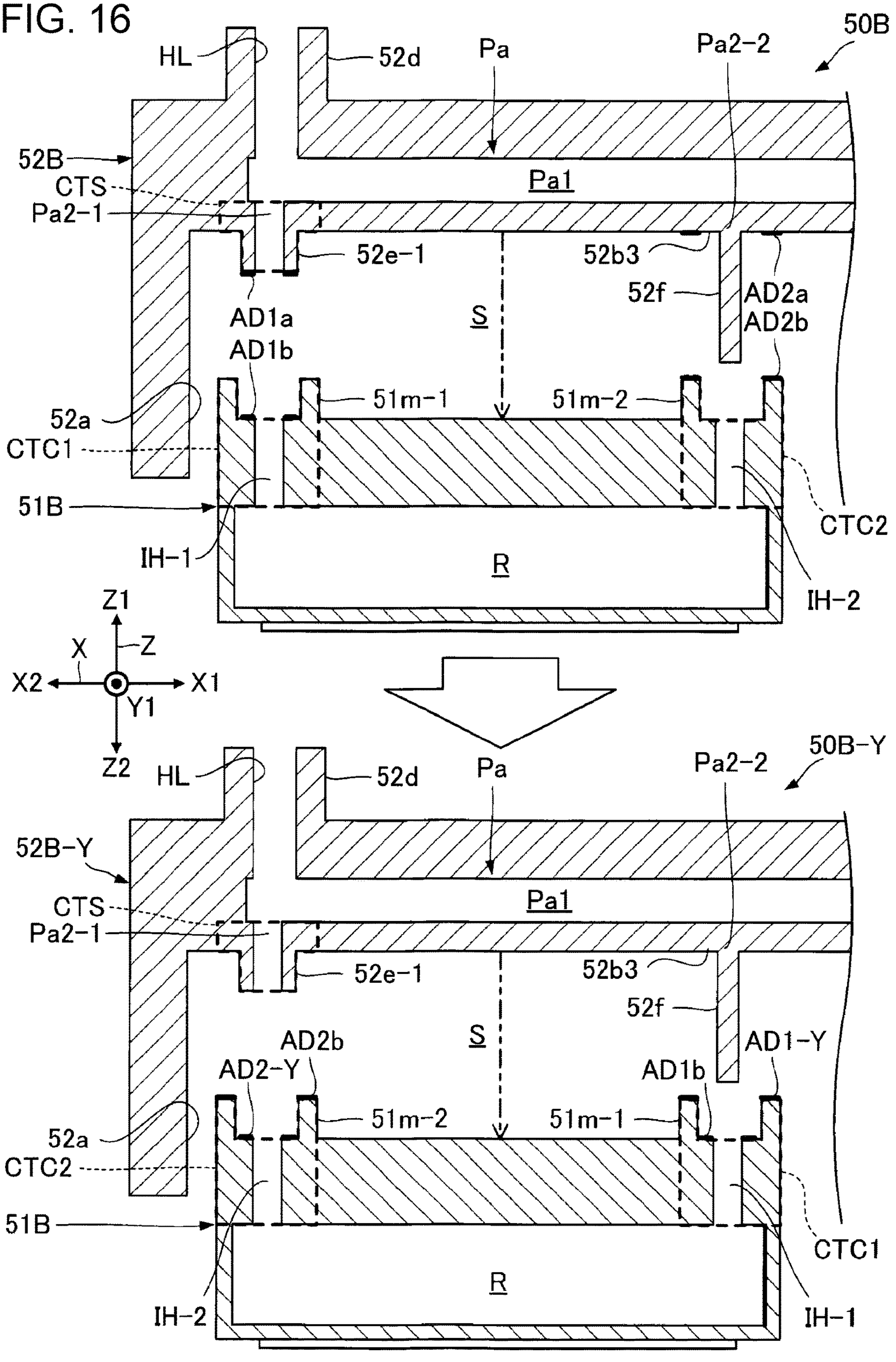
FIG. 16 is a diagram for explaining a reusing step in the third embodiment.

FIG. 16 is a diagram for explaining the reusing step SR in the third embodiment. FIG. 16 illustrates a case in which the head chip 51B of the liquid ejecting head 50B is reused for another liquid ejecting head 50B-Y in the reusing step SR. An upper part in FIG. 16 illustrates the disassembly step S10-Y, and a lower part in FIG. 16 illustrates the assembly step S20-Y.

The liquid ejecting head 50B-Y includes the flow path structure 52B-Y. The flow path structure 52B-Y is compatible with the flow path structure 52B, and has the branch flow path Pa2-1, the protrusion 52*f*, and the coupling portion CTS, as with the flow path structure 52B. The flow path structure 52B-Y is not limited to the aspect of having the same configuration as the flow path structure 52B, and may have a portion with a different configuration from the flow path structure 52B. The fact that the flow path structure 52B and the flow path structure 52B-Y are compatible with each other means that, for example, each of the flow path structure 52B and the flow path structure 52B-Y accommodates the same head chip 51B, and in any case in which the flow path structure 52B is liquid-tightly coupled to either the inlet IH-1 or the inlet IH-2 of the same head chip 51B, or in which the flow path structure 52B-Y is liquid-tightly coupled to either the inlet IH-1 or the inlet IH-2 of the same head chip 51B, each of the flow path structure 52B and the flow path structure 52B-Y has a similar function of supplying the ink to the flow path inside the head chip 51.

As illustrated in the upper part of FIG. 16, in the disassembly step S10-Y, an adhesion state between the head chip 51B and the flow path structure 52B by the adhesive AD1 and the adhesive AD2 is released.

In the first step S1-Y of the disassembly step S10-Y, an adhesion state between the first chip-side coupling portion CTC1 and the coupling portion CTS by the adhesive AD1 is released. This release is performed in the same manner as the first step S1-X of the first embodiment. Through this release, the adhesive AD1 is separated into an adhesive layer AD1*a* remaining on the flow path structure 52B and an adhesive layer AD1*b* remaining on the head chip 51B.

In the third step S3-Y of the disassembly step S10-Y, an adhesion state between the second chip-side coupling portion CTC2 and the flow path structure 52B by the adhesive AD2 is released. This release is performed in the same manner as the third step S3-X of the first embodiment.

Through this release, the adhesive AD2 is separated into an adhesive layer AD2*a* remaining on the flow path structure 52B and an adhesive layer AD2*b* remaining on the head chip 51B.

The fixed plate 53 is removed by an appropriate method before the head chip 51B is removed from the liquid ejecting head 50B. The fixed plate 53 is removed, for example, by disassembling or melting an adhesive for allowing the head chip 51B and the fixed plate 53 to adhere to each other by an appropriate method.

As illustrated in the lower part of FIG. 16, in the assembly step S20-Y, in a posture in which the head chip 51B serving as the reuse target is rotated by 180° about the Z axis, the head chip 51B adheres to the flow path structure 52B-Y by the adhesives AD1-Y and AD2-Y.

In the second step S2-Y of the assembly step S20-Y, the inlet IH-2 of the second chip-side coupling portion CTC2 and the branch flow path Pa2-1 of the flow path structure 52B-Y are liquid-tightly coupled to each other by the adhesive AD2-Y. The adhesive AD2-Y allows the second chip-side coupling portion CTC2 and the flow path structure 52B-Y to adhere to each other at a position different from the adhesive layer AD2*b*. In the example illustrated in FIG. 16, the adhesive AD2-Y is applied to a bottom surface of a recess of the second chip-side coupling portion CTC2. Thereby, the second chip-side coupling portion CTC2 and the tip surface of the protrusion 52*e*-1 of the flow path structure 52B-Y can adhere to each other while avoiding the adhesive layer AD2*b* remaining on the head chip 51B.

In the fourth step S4-Y of the assembly step S20-Y, the flow path structure 52B-Y adheres to the first chip-side coupling portion CTC1 by the adhesive AD1-Y. Thereby, the first chip-side coupling portion CTC1 is closed by the adhesive AD1-Y. Here, the adhesive AD1-Y allows the first chip-side coupling portion CTC1 and the flow path structure 52B-Y to adhere to each other at a position different from the adhesive layer AD1*b*. In the example illustrated in FIG. 16, the adhesive AD1-Y is applied to a tip surface of the first chip-side coupling portion CTC1. Thereby, the first chip-side coupling portion CTC1 and the flow path structure 52B-Y can adhere to each other while avoiding the adhesive layer AD1*b* remaining on the head chip 51B.

A type of the adhesive AD1-Y may be the same as or different from a type of the adhesive AD2-Y, the adhesive AD1, or the adhesive AD2.

Although not illustrated, the assembly step S20-Y may be performed in a state where the plurality of head chips 51B adhere to the fixed plate 53 by being aligned with each other. In this case, adhesion of the fixed plate 53 and the flow path structure 52B is performed collectively with the assembly step S20-Y.

As described above, when the head chip 51B is reused as a portion of the liquid ejecting head 50B, the liquid ejecting head 50B is an example of a “first liquid ejecting head”. The flow path structure 52B included in the liquid ejecting head 50B is an example of a “first flow path structure”. As described above, a liquid ejecting head manufacturing method for manufacturing the liquid ejecting head 50B-Y, which is an example of a “second liquid ejecting head”, through this reusing includes the reusing step SR.

In the reusing step SR, the head chip 51B is reused for the liquid ejecting head 50B-Y. Here, the head chip 51B has the first chip-side coupling portion CTC1 and the second chip-side coupling portion CTC2, which are flow path coupling portions to the flow path structure 52B.

The reusing step SR includes a first step S1-Y and a second step S2-Y. In the first step S1-Y, an adhesion state where the first chip-side coupling portion CTC1 and the flow path structure 52B are liquid-tightly coupled to each other is released. In the second step S2-Y, the second chip-side coupling portion CTC2 compatible with the first chip-side coupling portion CTC1 and the flow path structure 52B-Y compatible with the flow path structure 52B are liquid-tightly coupled to each other by the adhesive AD2-Y.

In the liquid ejecting head manufacturing method described above, the head chip 51B, which is not broken and has a history of use in the past, can be reused for another liquid ejecting head 50B-Y.

Figure 17:
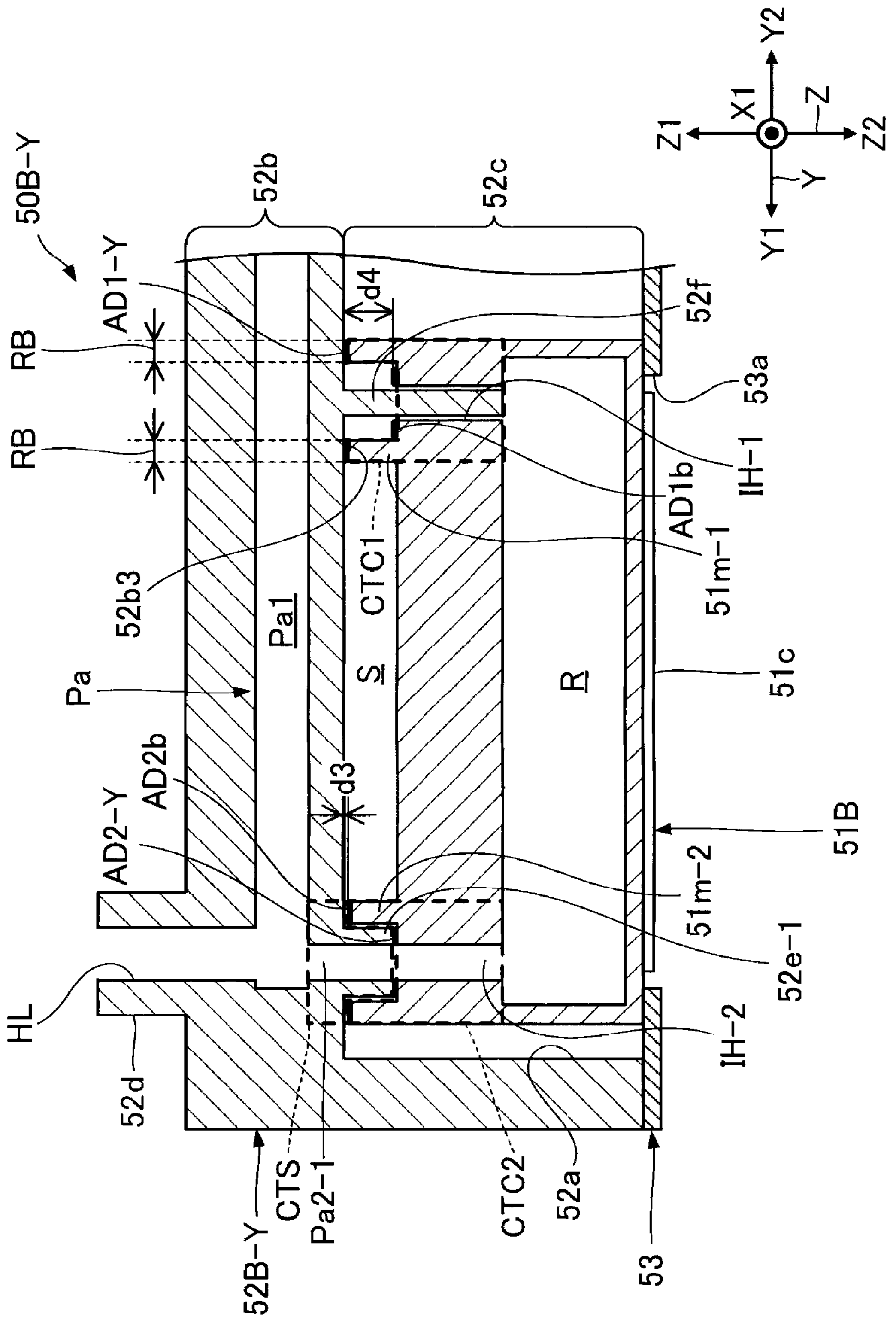
FIG. 17 is a cross-sectional view of a liquid ejecting head obtained by reusing the head chip in the third embodiment.

FIG. 17 is a cross-sectional view of the liquid ejecting head 50B-Y obtained by reusing the head chip 51B in the third embodiment. The liquid ejecting head 50B-Y is obtained through the reusing step SR illustrated in FIG. 16 described above.

The liquid ejecting head 50B-Y includes the flow path structure 52B-Y described above. The flow path structure 52B-Y adheres to the head chip 51B by the adhesives AD1-Y and AD2-Y.

Specifically, the first chip-side coupling portion CTC1 liquid-tightly adheres to the portion 52*b*3 of the flow path structure 52B-Y by the adhesive AD1-Y. Thereby, in a state where the protrusion 52*f* of the flow path structure 52B-Y is inserted into the inlet IH-1, the inlet IH-1 is liquid-tightly closed by the adhesive AD1-Y. Here, the adhesion by the adhesive AD1-Y is performed in a region different from the adhesive layer AD1*b* remaining on the head chip 51.

The second chip-side coupling portion CTC2 liquid-tightly adheres to the coupling portion CTS of the flow path structure 52B-Y by the adhesive AD2-Y. Thereby, the inlet IH-2 and the branch flow path Pa2-1 are liquid-tightly coupled to each other. Here, the adhesion by the adhesive AD1-Y is performed in a region different from the adhesive layer AD2*b* remaining on the head chip 51B.

The liquid ejecting head 50B-Y obtained by reusing the head chip 51B as described above includes the head chip 51B, the flow path structure 52B-Y, and the adhesive layer AD1*b*, as described above. The head chip 51B has the plurality of nozzles N ejecting a liquid and the common liquid chamber R communicating with the plurality of nozzles N. The adhesive layer AD1*b* is interposed between the head chip 51B and the flow path structure 52B-Y. Here, the head chip 51B has the first chip-side coupling portion CTC1 and the second chip-side coupling portion CTC2. In the liquid ejecting head 50B-Y, the first chip-side coupling portion CTC1 is coupled to the common liquid chamber R and is closed so as not to be coupled to the flow path in the flow path structure 52B-Y. The second chip-side coupling portion CTC2 is coupled to the common liquid chamber R and is liquid-tightly coupled to the flow path structure 52B-Y by the adhesive AD2-Y. The adhesive layer AD1*b* adheres to the first chip-side coupling portion CTC1 without adhering to the flow path structure 52B-Y.

The adhesive layer AD2*b* remaining on the head chip 51B has a gap d3 with the flow path structure 52B-Y. The adhesive layer AD1*b* remaining on the head chip 51B has a gap d4 with the flow path structure 52B-Y. That is, each of the adhesive layers AD1*b* and AD2*b* adheres to the head chip 51B, but does not adhere to the flow path structure 52B-Y.

4. Fourth Embodiment

A fourth embodiment will be described below. In the embodiment exemplified below, elements whose actions and functions are similar to those of the first embodiment will be denoted by the same reference numerals used in the description of the first embodiment, and detailed description thereof will be omitted as appropriate.

Figure 18:
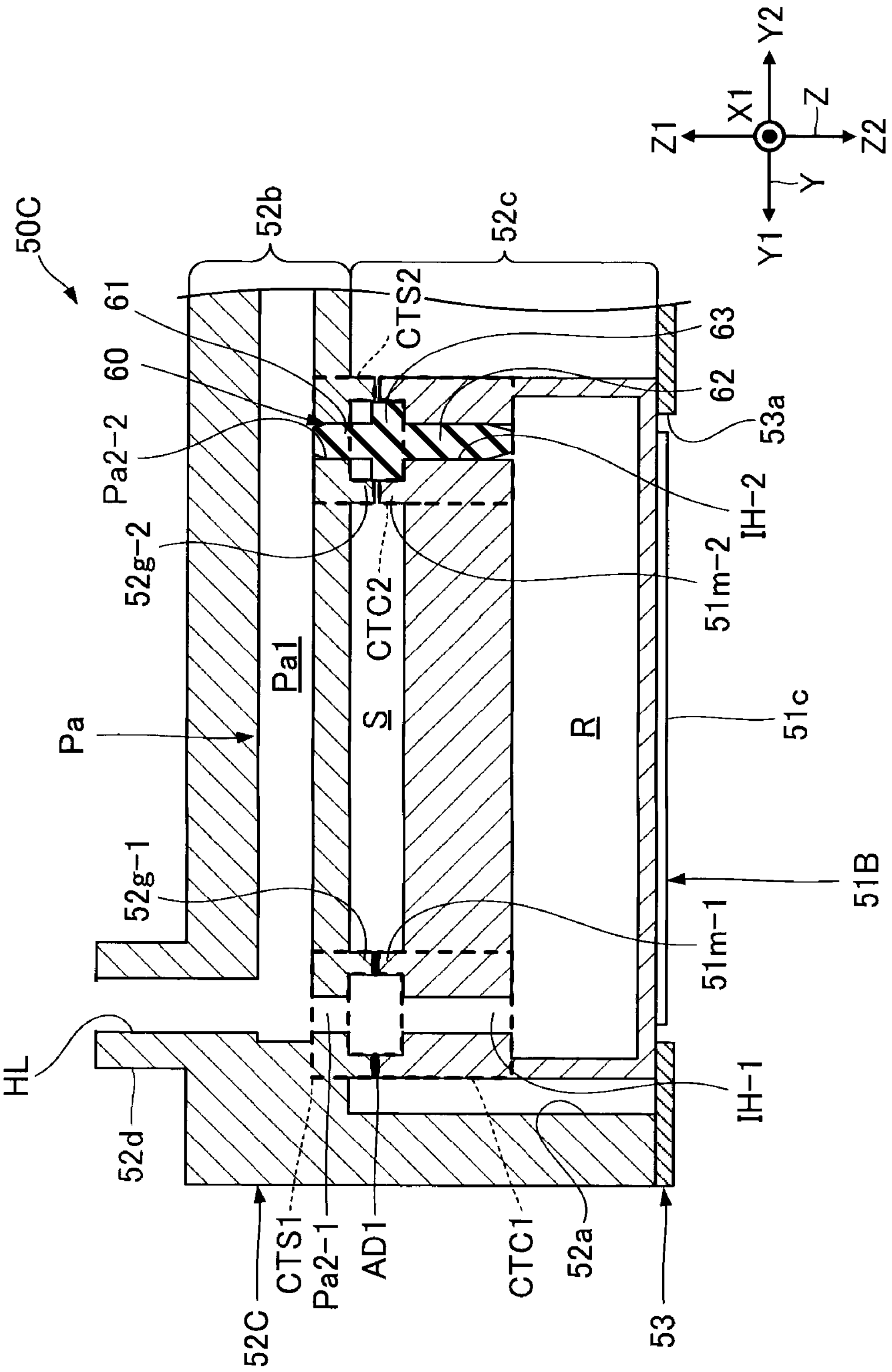
FIG. 18 is a cross-sectional view of a liquid ejecting head according to a fourth embodiment.

FIG. 18 is a cross-sectional view of a liquid ejecting head 50C according to a fourth embodiment. The liquid ejecting head 50C has the same configuration as the liquid ejecting head 50 of the first embodiment except that the liquid ejecting head 50C has the head chip 51B instead of the head chip 51 and has the flow path structure 52C instead of the flow path structure 52, and a closing member 60 is added. The head chip 51B has the same configuration as the head chip 51B of the third embodiment.

As illustrated in FIG. 18, the flow path structure 52C has the same configuration as the flow path structure 52 of the first embodiment except that the flow path structure 52C has a protrusion 52*g*-1 instead of the protrusion 52*e*-1 and has a protrusion 52*g*-2 instead of the protrusion 52*e*-2.

The protrusion 52*g*-1 is an annular protrusion protruding in the Z2 direction. The branch flow path Pa2-1 is open to a tip surface of the protrusion 52*g*-1. The opening of the branch flow path Pa2-1 overlaps the inlet IH-1 when viewed in the direction along the Z axis. In the present embodiment, the inlet IH-1 is open to the tip surface of the protrusion 51*m*-1. That is, an inner portion of the protrusion 51*m*-1 in plan view forms a portion of the inlet IH-1.

Here, the protrusion 52*g*-1 and the branch flow path Pa2-1 form a portion of the first selection coupling portion CTS1 indicated as a region surrounded by a broken line in the drawing. The first selection coupling portion CTS1 of the present embodiment is a portion of the flow path structure 52C including a portion to which an adhesive AD1 described below for coupling to the inlet IH-1 is applied, a portion to be closed by the closing member 60 at the time of regeneration of the liquid ejecting head 50C, and a portion where the branch flow path Pa2-1 is provided. As described above, in the present embodiment, the first selection coupling portion CTS1 is a portion including the protrusion 52*g*-1 and the branch flow path Pa2-1, and the branch flow path Pa2-1 is open to a surface of the first selection coupling portion CTS1 facing the Z2 direction.

Each of the shapes of an outer peripheral edge and the inner peripheral edge of the protrusion 52*g*-1 when viewed in the direction along the Z axis is not particularly limited, and may be, for example, a circular shape or an elliptical shape, or a polygonal shape such as a quadrangular shape or a hexagonal shape. Note that, when viewed in the direction along the Z axis, the tip surface of the protrusion 52*g*-1 has a portion that overlaps the tip surface of the protrusion 51*m*-1 of the head chip 51B over the entire circumference.

The protrusion 52*g*-2 is an annular protrusion protruding in the Z2 direction. The branch flow path Pa2-2 is open to a tip surface of the protrusion 52*g*-2. The opening of the branch flow path Pa2-2 overlaps the inlet IH-2 when viewed in the direction along the Z axis. As described above, the inlet IH-2 is open to the tip surface of the protrusion 51*m*-2 of the present embodiment.

Here, the protrusion 52*g*-2 and the branch flow path Pa2-2 form a portion of the second selection coupling portion CTS2 indicated as a region surrounded by a broken line in the drawing. The second selection coupling portion CTS2 of the present embodiment is a portion of the flow path structure 52C including a portion to be closed the closing member 60 for closing the branch flow path Pa2-2, a portion to which an adhesive AD2-X described below for coupling to the inlet IH at the time of regeneration of the liquid ejecting head 50C is applied, and a portion where the branch flow path Pa2-2 is provided. As described above, in the present embodiment, the second selection coupling portion CTS2 is a portion including the protrusion 52*g*-2 and the branch flow path Pa2-2, and the branch flow path Pa2-2 is open to a surface of the second selection coupling portion CTS2 facing the Z2 direction.

Each of the shapes of an outer peripheral edge and the inner peripheral edge of the protrusion 52*g*-2 when viewed in the direction along the Z axis is not particularly limited, and may be, for example, a circular shape or an elliptical shape, or a polygonal shape such as a quadrangular shape or a hexagonal shape. Note that, when viewed in the direction along the Z axis, the tip surface of the protrusion 52*g*-2 has a portion that overlaps the tip surface of the protrusion 51*m*-2 of the head chip 51B over the entire circumference.

The tip surface of the protrusion 52*g*-1 of the flow path structure 52C described above adheres to the tip surface of the protrusion 51*m*-1 of the head chip 51B by the adhesive AD1. Thereby, the branch flow path Pa2-1 and the inlet IH-1 are liquid-tightly coupled to each other by the adhesive AD1.

On the other hand, the tip surface of the protrusion 52*g*-2 faces the tip surface of the protrusion 51*m*-2 of the head chip 51B without adhesion. Here, the branch flow path Pa2-2 and the inlet IH-2 are liquid-tightly closed by the closing member 60.

The closing member 60 is an elastic lid member that closes the branch flow path Pa2-2 and the inlet IH-2 by being inserted into the branch flow path Pa2-2 and the inlet IH-2. The term "elastic" refers to a property of being elastically deformable. The closing member 60 is made of, for example, an elastic material such as an elastomer. Examples of the elastomer include a thermosetting elastomer and a thermoplastic elastomer. Examples of the thermosetting elastomer include vulcanized rubber and a thermosetting resin-based elastomer such as silicone rubber or fluororubber. The closing member 60 has a first portion 61, a second portion 62, and a flange portion 63. The closing member 60 may have a configuration in which a substantially rigid body made of metal or the like is used as a base material and an elastic sealing member made of an elastic material such as an elastomer is provided on a surface of the base material.

The first portion 61 is a rod-shaped portion of the closing member 60 that is detachably press-fitted into the branch flow path Pa2-2. The first portion 61 is press-fitted into the branch flow path Pa2-2, thereby tightly adhering to a wall surface of the branch flow path Pa2-2 over the entire circumference in a state of being elastically deformed in a radial direction of the branch flow path Pa2-2. As a result, the branch flow path Pa2-2 can be liquid-tightly closed by the first portion 61.

In the example illustrated in FIG. 18, a tip portion of the first portion 61 in the Z1 direction is tapered. Thereby, the branch flow path Pa2-2 can be liquid-tightly closed by the first portion 61 while improving the insertability of the first portion 61 into the branch flow path Pa2-2. In addition, a length of the first portion 61 is set such that an end of the first portion 61 in the Z1 direction is located on the same plane as the wall surface of the common flow path Pa1. Thereby, retention of constituent components of the liquid or foreign matter in the branch flow path Pa2-2 can be reduced. A shape of the first portion 61 is not limited to the example illustrated in FIG. 18, and may be, for example, a shape having a constant width. A tip of the first portion 61 need not be located on the same plane as the wall surface of the common flow path Pa1.

The second portion 62 is a rod-shaped portion of the closing member 60 that is detachably press-fitted into the inlet IH-2. The second portion 62 is press-fitted into the inlet IH-2, thereby tightly adhering to a wall surface of the inlet IH-2 over the entire circumference in a state of being elastically deformed in a radial direction of the inlet IH-2. As a result, the inlet IH-2 can be liquid-tightly closed by the second portion 62.

In the example illustrated in FIG. 18, a tip portion of the second portion 62 in the Z2 direction is tapered. Thereby, the inlet IH-2 can be liquid-tightly closed by the second portion 62 while improving the insertability of the second portion 62 into the inlet IH-2. In addition, a length of the second portion 62 is set such that an end of the second portion 62 in the Z2 direction is located on the same plane as the wall surface of the common liquid chamber R. Thereby, formation of a place where air bubbles are retained in the common liquid chamber R is prevented. A shape of the second portion 62 is not limited to the example illustrated in FIG. 18, and may be, for example, a shape having a constant width. A tip of the second portion 62 need not be located on the same plane as the wall surface of the common liquid chamber R.

The flange portion 63 is a plate-shaped portion of the closing member 60 that is wider than each of the first portion 61 and the second portion 62 and is provided between the first portion 61 and the second portion 62. The flange portion 63 is disposed such that the direction along the Z axis is a plate thickness direction, and the first portion 61 protrudes on a surface of the flange portion 63 facing the Z1 direction, while the second portion 62 protrudes on a surface of the flange portion 63 facing the Z2 direction.

In the example illustrated in FIG. 18, a thickness of the flange portion 63 is smaller than a sum of a length of the protrusion 51*m*-2 along the Z axis and a length of the protrusion 52*g*-2 along the Z axis. The flange portion 63 is disposed inside the protrusion 51*m*-2 and contacts the head chip 51B, but does not contact the flow path structure 52C. When the flange portion 63 contacts the head chip 51B, the flange portion 63 regulates the pushing amount of the second portion 62 into the inlet IH-2. In addition, since the flange portion 63 does not contact the flow path structure 52C, reaction force in the direction along the Z axis due to deformation of the flange portion 63 is difficult to be transmitted to the head chip 51B.

An outer shape of the flange portion 63 when viewed in the direction along the Z axis is not particularly limited, and is set in any desired way, but is preferably substantially the same size and shape as the inner circumference of the protrusion 51*m*-2 when viewed in the Z axis direction. Thereby, the flange portion 63 is guided by the inner peripheral surface of the protrusion 51*m*-2, so that a posture of the closing member 60 is stabilized.

Figure 19:
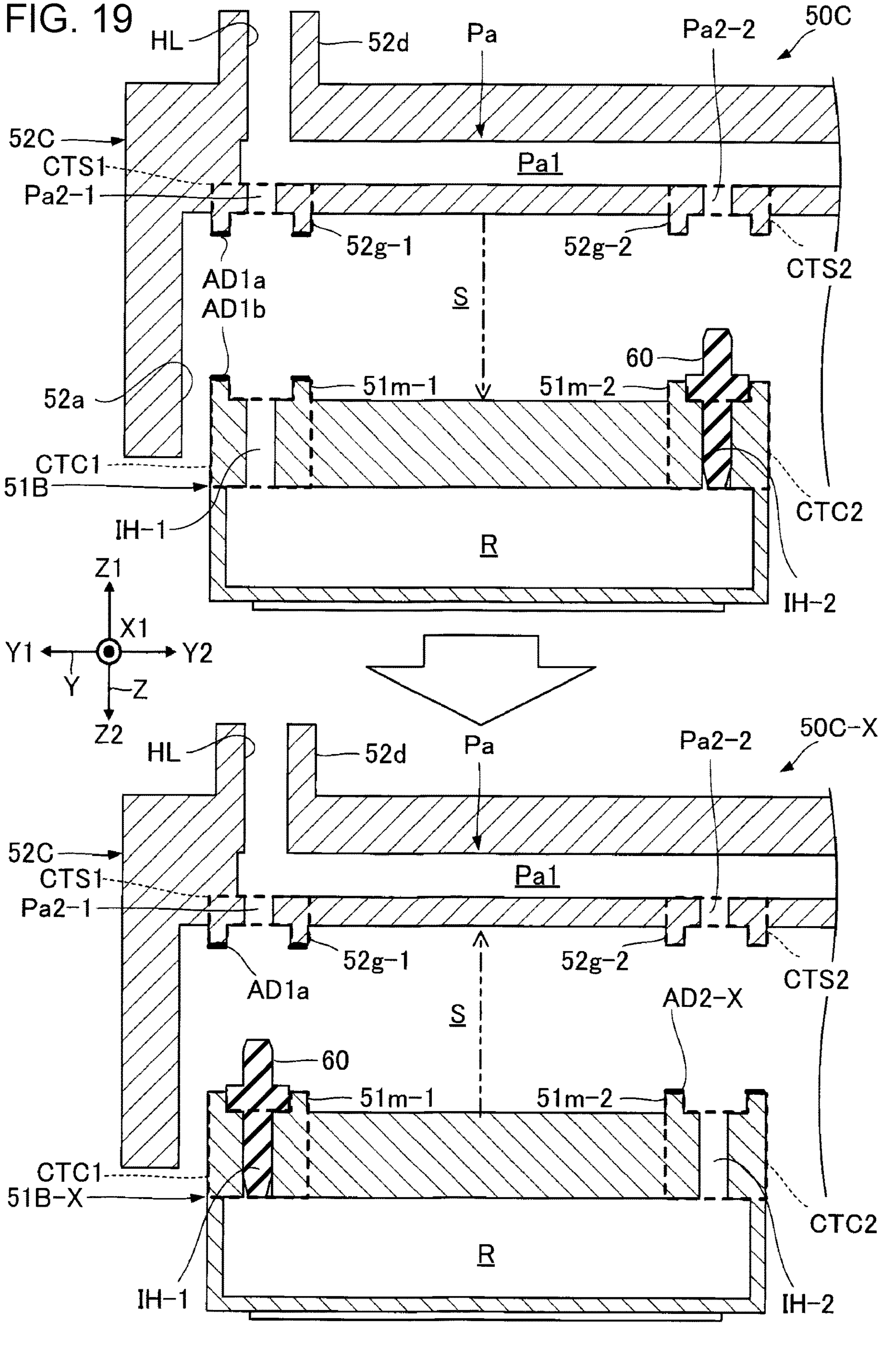
FIG. 19 is a diagram for explaining a replacing step in the fourth embodiment.

FIG. 19 is a diagram for explaining the replacing step SC in the fourth embodiment. FIG. 19 illustrates a case in which the head chip 51B of the liquid ejecting head 50C is replaced with another head chip 51B-X in the replacing step SC. An upper part in FIG. 19 illustrates the disassembly step S10-X of the present embodiment, and a lower part in FIG. 19 illustrates the assembly step S20-X of the present embodiment.

The head chip 51B-X is compatible with the head chip 51B, and has the inlets IH-1 and IH-2, the first chip-side coupling portion CTC1, and the second chip-side coupling portion CTC2, as with the head chip 51B. The head chip 51B-X is not limited to the aspect of having the same configuration as the head chip 51B, and may have a portion with a different configuration from the head chip 51B.

As illustrated in the upper part of FIG. 19, in the disassembly step S10-X of the present embodiment, an adhesion state between the head chip 51B and the flow path structure 52C by the adhesive AD1 and a coupling state thereof by the closing member 60 are released.

In the first step S1-X included in the disassembly step S10-X of the present embodiment, a state where the inlet IH-1 of the first chip-side coupling portion CTC1 and the branch flow path Pa2-1 of the first selection coupling portion CTS1 are liquid-tightly coupled to each other is released by releasing the adhesion state between the tip surface of the protrusion 51*m*-1 of the first chip-side coupling portion CTC1 and the tip surface of the protrusion 52*g*-1 of the first selection coupling portion CTS1 by the adhesive AD1. This release is performed by breaking an adhesive layer of the adhesive AD1 by pulling the head chip 51 in the Z2 direction with respect to the flow path structure 52 as indicated by an arrow of a two-dot chain line in FIG. 19. Through this release, the adhesive AD1 is separated into an adhesive layer AD1*a* remaining on the flow path structure 52C and an adhesive layer AD1*b* remaining on the head chip 51B.

In the third step S3-X included in the disassembly step S10-X in the present embodiment, the closed state of the second selection coupling portion CTS2 is released by pulling out the elastic closing member 60 press-fitted into the second selection coupling portion CTS2 from the second selection coupling portion CTS2. Thereby, the coupling state of the head chip 51B and the flow path structure 52C by the closing member 60 is released. The third step S3-*x* may be performed simultaneously with the first step S1-X by the same operation.

The fixed plate 53 is removed by an appropriate method before the head chip 51B is removed from the liquid ejecting head 50C. The fixed plate 53 is removed, for example, by disassembling or melting an adhesive for allowing the head chip 51B and the fixed plate 53 to adhere to each other by an appropriate method.

As illustrated in the lower part of FIG. 19, in the assembly step S20-X of the present embodiment, the head chip 51B-X for replacement adheres to the flow path structure 52C by the adhesive AD2-X and is coupled thereto by the closing member 60.

In the second step S2-X included in the assembly step S20-X of the present embodiment, the branch flow path Pa2-2 of the second selection coupling portion CTS2 and the inlet IH-2 of the second chip-side coupling portion CTC2 of the head chip 51B-X are liquid-tightly coupled to each other by the adhesive AD2-X. In the second step S2-*x*, it is preferable that the tip surface of the protrusion 52*g*-2 of the second selection coupling portion CTS2 and the tip surface of the protrusion 51*m*-2 of the second chip-side coupling portion CTC2 adhere to each other by the adhesive AD2-X by moving the head chip 51B-X into the accommodation space S in the Z1 direction in a state where the adhesive AD2-X is applied to the head chip 51B-X. This is because the application of the adhesive AD2-X to the head chip 51B-X is easier than the application of the adhesive AD2-X to the flow path structure 52C.

In the fourth step S4-X included in the assembly step S20-X of the present embodiment, one end of the closing member 60 is press-fitted into the first chip-side coupling portion CTC1, and then the other end of the closing member 60 is press-fitted into the first selection coupling portion CTS1. That is, after the second portion 62 of the closing member 60 is press-fitted into the first chip-side coupling portion CTC1, the first portion 61 of the closing member 60 is press-fitted into the first selection coupling portion CTS1. The press-fitting of the closing member 60 into the first selection coupling portion CTS1 is performed collectively with the adhesion of the second selection coupling portion CTS2 and the head chip 51B-X by the adhesive AD2-X.

Although not illustrated, the assembly step S20-*x* of the present embodiment may be performed in a state where the plurality of head chips 51B-X adhere to the fixed plate 53 by being aligned with each other. In this case, adhesion of the fixed plate 53 and the flow path structure 52C is performed collectively with the assembly step S20-X of the present embodiment.

As described above, when the liquid ejecting head 50C is regenerated, the liquid ejecting head 50C is an example of a "first liquid ejecting head". As described above, in the replacing step SC of a liquid ejecting head manufacturing method for manufacturing the liquid ejecting head 50C-X, which is an example of a "second liquid ejecting head", through this regeneration, the head chip 51B is replaced with the head chip 51B-X compatible with the head chip 51B. The replacing step SC includes a first step S1-X of releasing the adhesion state where the first selection coupling portion CTS1, which is a flow path coupling portion, and the head chip 51B are liquid-tightly coupled to each other, and a second step S2-X of liquid-tightly coupling the second selection coupling portion CTS2, which is compatible with the first selection coupling portion CTS1, and the head chip 51B-X by the adhesive AD2-X. The head chip 51B is an example of a "first head chip", and the head chip 51B-X is an example of a "second head chip".

Figure 20:
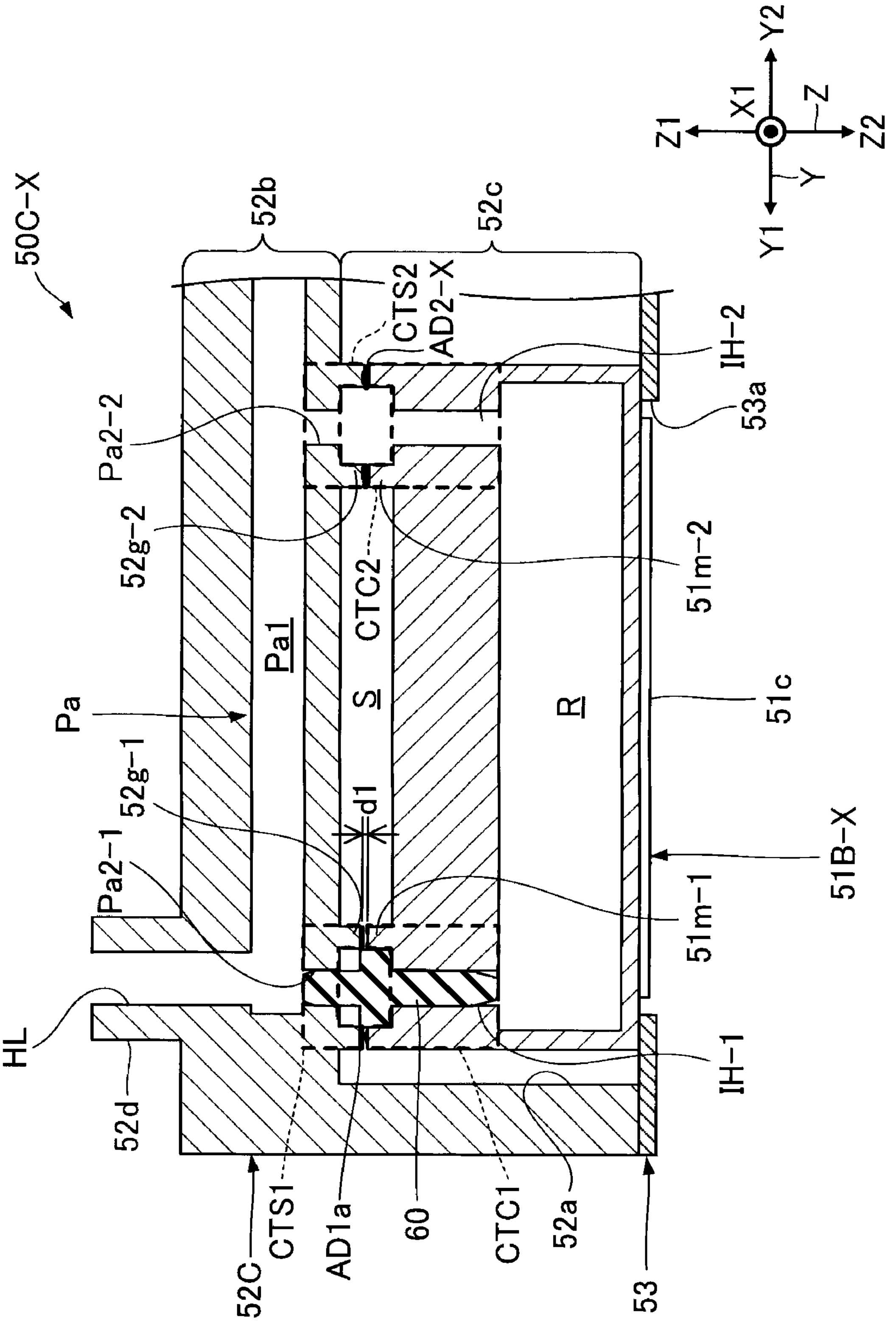
FIG. 20 is a cross-sectional view of a liquid ejecting head obtained by regeneration in the fourth embodiment.

Here, the head chip 51B-X has the first chip-side coupling portion CTC1 facing the first selection coupling portion CTS1 when the second step S2-X is performed. In the third step S3-X included in the replacing step SC in the present embodiment, the closed state of the second selection coupling portion CTS2 is released by pulling out the elastic closing member 60 press-fitted into the second selection coupling portion CTS2 from the second selection coupling portion CTS2. In the fourth step S4-*x* included in the replacing step SC of the present embodiment, one end of the flexible closing member 60 is press-fitted into the first chip-side coupling portion CTC1 of the head chip 51B-X, and then the other end of the closing member 60 is press-fitted into the first selection coupling portion CTS1. The closing member 60 used in the third step S3-X in FIG. 19 is an example of a "first closing member", and the closing member 60 used in the fourth step S4-X in FIG. 20 is an example of a "second closing member". Here, the closing member 60 in FIG. 20 may be a closing member 60 removed from the liquid ejecting head 50C in FIG. 19, or may be a closing member 60 different from the closing member 60 removed from the liquid ejecting head 50C. That is, the "first closing member" and the "second closing member" may be the same closing member 60.

Therefore, one end of the flexible closing member 60 is press-fitted into the first chip-side coupling portion CTC1, and then the head chip 51B-X is brought closer toward the flow path structure 52C, whereby the other end of the closing member 60 can be press-fitted into the first selection coupling portion CTS1. Therefore, the number of steps constituting the replacing step SC can be reduced compared to an aspect in which the closing member is individually press-fitted into the first chip-side coupling portion CTC1 and the first selection coupling portion CTS1. In addition, compared to an aspect in which, before one end of the closing member 60 is press-fitted into the first chip-side coupling portion CTC1, the other end of the closing member 60 is press-fitted into the first selection coupling portion CTS1, the closing member 60 can be easily press-fitted into each of the first chip-side coupling portion CTC1 and the first selection coupling portion CTS1.

FIG. 20 is a cross-sectional view of the liquid ejecting head 50C-X obtained by regeneration in the fourth embodiment. The liquid ejecting head 50C-X is obtained through the replacing step SC illustrated in FIG. 19 described above.

The liquid ejecting head 50C-X has the above-described head chip 51B-X. The head chip 51B-X adheres to the flow path structure 52C by the adhesive AD2-X and is coupled thereto via the closing member 60.

Specifically, the second chip-side coupling portion CTC2 of the head chip 51B-X liquid-tightly adheres to the second selection coupling portion CTS2 of the flow path structure 52C by the adhesive AD2-X. Thereby, the inlet IH-2 of the head chip 51B-X is liquid-tightly coupled to the branch flow path Pa2-2.

One end of the closing member 60 is press-fitted into the first chip-side coupling portion CTC1 of the head chip 51B-X. Thereby, the inlet IH-1 is liquid-tightly closed by the closing member 60. In addition, the other end of the closing member 60 is press-fitted into the first selection coupling portion CTS1 of the flow path structure 52C. Thereby, the branch flow path Pa2-1 is liquid-tightly closed by the closing member 60. Here, the adhesive layer AD1*a* adheres to the flow path structure 52C but does not adhere to the head chip 51B-X. The adhesive layer AD1*a* is an example of a "first adhesive layer". In addition, a gap d1 exists between the tip surface of the protrusion 51*m*-1 and the adhesive layer AD1*a*.

As described above, the liquid ejecting head 50C is regenerated.

Also in the above fourth embodiment, the liquid ejecting head 50C can be easily regenerated. The liquid ejecting head 50C of the present embodiment includes the head chip 51B and the flow path structure 52C as described above. The head chip 51B has the plurality of nozzles N ejecting a liquid, the common liquid chamber R communicating with the plurality of nozzles N, and the inlet IH-1, which is an example of a "first chip-side flow path", communicating with the common liquid chamber R. The flow path structure 52C is joined to the head chip 51 by the adhesive AD1. The flow path structure 52C has the common flow path Pa1, the branch flow path Pa2-1 which is an example of a "first selection flow path", and the branch flow path Pa2-2 which is an example of a "second selection flow path".

Here, the branch flow path Pa2-1 is coupled to the common flow path Pa1 and is liquid-tightly coupled to the inlet IH-1 by the adhesive AD1. The branch flow path Pa2-2 is coupled to the common flow path Pa1 and is closed by the closing member 60 detachably fixed to the flow path structure 52C.

As described above, by closing the branch flow path Pa2-2 by the closing member 60, the branch flow path Pa2-2 can be prepared as a preliminary flow path of the branch flow path Pa2-1 without liquid leakage from the branch flow path Pa2-2. In addition, by using the closing member 60 that is attachable to and detachable from the flow path structure 52C, when the head chip 51B is replaced, there is no remaining adhesive around the opening of the branch flow path Pa2-2, so that the flow path of the new head chip 51B-X can be liquid-tightly coupled to the branch flow path Pa2-2 by the adhesive AD2-X. In this way, the remaining adhesive does not affect the sealing property of the adhesive AD2-X after replacement. As described above, the head chip 51B can be suitably replaced. Here, the term "detachably fixed" means that a positional relationship between two target members is not changed without using adhesion or welding.

In addition, as described above, the closing member 60 is a lid member that has elasticity and is to be inserted into the branch flow path Pa2-2. Therefore, the branch flow path Pa2-2 can be closed with a simple configuration.

Furthermore, as described above, the head chip 51B has the inlet IH-2, which is an example of a "second chip-side flow path", communicating with the inlet IH-1 via the common flow path Pa1. When viewed in the Z1 direction or in the Z2 direction, the opening of the branch flow path Pa2-2 and the opening of the inlet IH-2 overlap each other. The closing member 60 has the first portion 61 to be inserted into the branch flow path Pa2-2 and the second portion 62 to be inserted into the inlet IH-2. Therefore, the number of components can be reduced by using the closing member 60 for closing both the branch flow path Pa2-2 and the inlet IH-2, compared to an aspect in which an individual closing member is used for closing the branch flow path Pa2-2 and the inlet IH-2.

In addition, as described above, the closing member 60 has the flange portion 63 disposed between the first portion 61 and the second portion 62. A cross-sectional area of the flange portion 63 perpendicular to the Z1 direction or the Z2 direction is larger than that of each of the first portion 61 and the second portion 62. The flange portion 63 contacts the head chip 51B without contacting the flow path structure 52C. Therefore, by simply pushing the closing member 60 deep into the inlet IH-2, the flange portion 63 functions to regulate the pushing amount, so that the closing member 60 can be fixed to the head chip 51B at an appropriate position. In addition, since the reaction force due to the deformation of the flange portion 63 is difficult to act on the head chip 51B because the flange portion 63 does not contact the flow path structure 52C, the misalignment of the head chip 51B can be suppressed compared to an aspect in which the flange portion 63 is interposed between the head chip 51B and the flow path structure 52C in an elastically deformed state in the direction along the Z axis.

In addition, the head chip 51B of the liquid ejecting head 50C of the fourth embodiment further has the inlet IH-2 communicating with the inlet IH-1 via the common liquid chamber R, the opening of the branch flow path Pa2-2 and the opening of the inlet IH-2 overlap each other when viewed in the stacking direction of the head chip 51B and the flow path structure 52C, and the inlet IH-2 is closed by the closing member 60 detachably fixed to the head chip 51B. The inlet IH-2 is an example of a "second chip-side flow path". Therefore, although a detailed description is omitted, by performing the reusing step SR that is substantially the same as that in a fifth embodiment described below, the head chip 51B of the liquid ejecting head 50C can be reused to manufacture another liquid ejecting head 50C.

5. Fifth Embodiment

Hereinafter, a fifth embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 21:
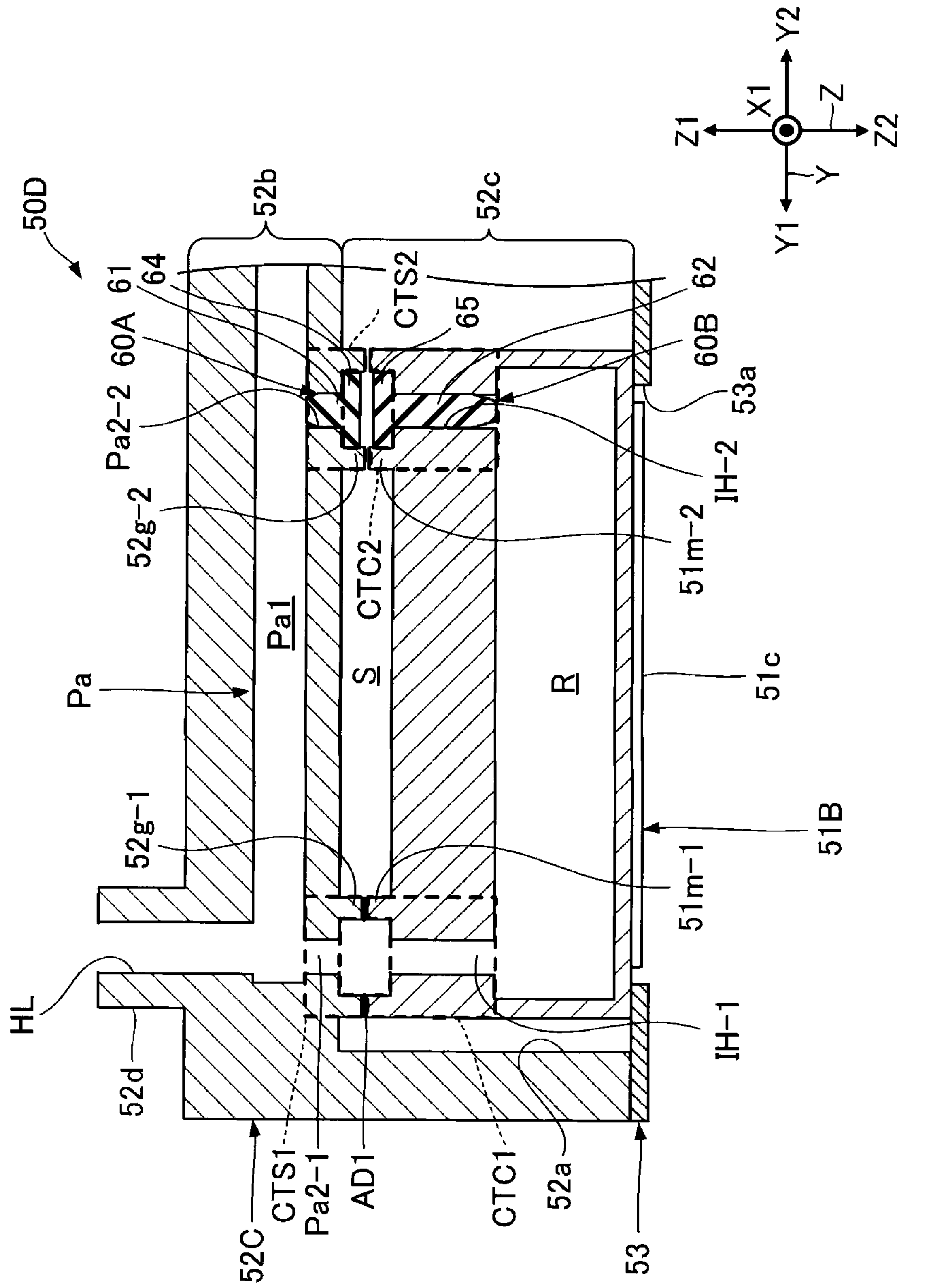
FIG. 21 is a cross-sectional view of a liquid ejecting head according to a fifth embodiment.

FIG. 21 is a cross-sectional view of a liquid ejecting head 50D according to a fifth embodiment. The liquid ejecting head 50D has the same configuration as the liquid ejecting head 50C of the fourth embodiment except that the liquid ejecting head 50D includes closing members 60A and 60B instead of the closing member 60.

In the liquid ejecting head 50D, the inlet IH-2 is liquid-tightly closed by the closing member 60B, and the branch flow path Pa2-2 is liquid-tightly closed by the closing member 60A.

The closing member 60A has the same configuration as the closing member 60 of the fourth embodiment except that the second portion 62 is omitted and a flange portion 64 is provided instead of the flange portion 63. The flange portion 64 is a plate-shaped portion of the closing member 60A that is wider than the first portion 61 and is provided at an end of the first portion 61 in the Z2 direction. The flange portion 64 is disposed such that the direction along the Z axis is a plate thickness direction, and the first portion 61 protrudes on a surface of the flange portion 64 facing the Z1 direction.

In the example illustrated in FIG. 21, a thickness of the flange portion 64 is smaller than a length of the protrusion 52*g*-2 along the Z axis. The flange portion 64 is disposed inside the protrusion 52*g*-2 and contacts the flow path structure 52C, but does not contact the head chip 51B and the closing member 60B. When the flange portion 64 contacts the flow path structure 52C, the flange portion 64 regulates the pushing amount of the first portion 61 into the branch flow path Pa2-2. In addition, since the flange portion 64 does not contact the head chip 51B and the closing member 60B, reaction force due to deformation of the flange portion 64 is difficult to be transmitted to the head chip 51B. An outer shape of the flange portion 64 when viewed in the direction along the Z axis is not particularly limited, and is set in any desired way.

The closing member 60B has the same configuration as the closing member 60 of the fourth embodiment except that the first portion 61 is omitted and a flange portion 65 is provided instead of the flange portion 63. The flange portion 65 is a plate-shaped portion of the closing member 60B that is wider than the second portion 62 and is provided at an end of the second portion 62 in the Z1 direction. The flange portion 65 is disposed such that the direction along the Z axis is a plate thickness direction, and the second portion 62 protrudes on a surface of the flange portion 65 facing the Z2 direction.

In the example illustrated in FIG. 21, a thickness of the flange portion 65 is smaller than a length of the protrusion 51*m*-2 along the Z axis. The flange portion 65 is disposed inside the protrusion 51*m*-2 and contacts the head chip 51B, but does not contact the flow path structure 52C and the closing member 60A. When the flange portion 65 contacts the head chip 51B, the flange portion 65 regulates the pushing amount of the second portion 62 into the inlet IH-2. In addition, since the flange portion 65 does not contact the flow path structure 52C and the closing member 60A, reaction force due to deformation of the flange portion 65 is difficult to be transmitted to the head chip 51B. An outer shape of the flange portion 65 when viewed in the direction along the Z axis is not particularly limited, and is set in any desired way.

The liquid ejecting head 50D of the fifth embodiment includes the head chip 51B and the flow path structure 52C to which the head chip 51B is joined by the adhesive AD1. The head chip 51B has the plurality of nozzles N ejecting a liquid and the common liquid chamber R communicating with the plurality of nozzles N. The flow path structure 52C has the branch flow path Pa2-1 communicating with the common liquid chamber R. The head chip 51B has the inlet IH-1 coupled to the common liquid chamber R and liquid-tightly coupled to the branch flow path Pa2-1 by the adhesive AD1, and the inlet IH-2 coupled to the common liquid chamber R, and the inlet IH-2 is closed by the closing member 60B detachably fixed to the head chip 51B. Accordingly, the head chip 51B can be reused. The branch flow path Pa2-1 is an example of a "coupling flow path", the inlet IH-1 is an example of a "first chip-side flow path", and the inlet IH-2 is an example of a "second chip-side flow path".

Figure 22:
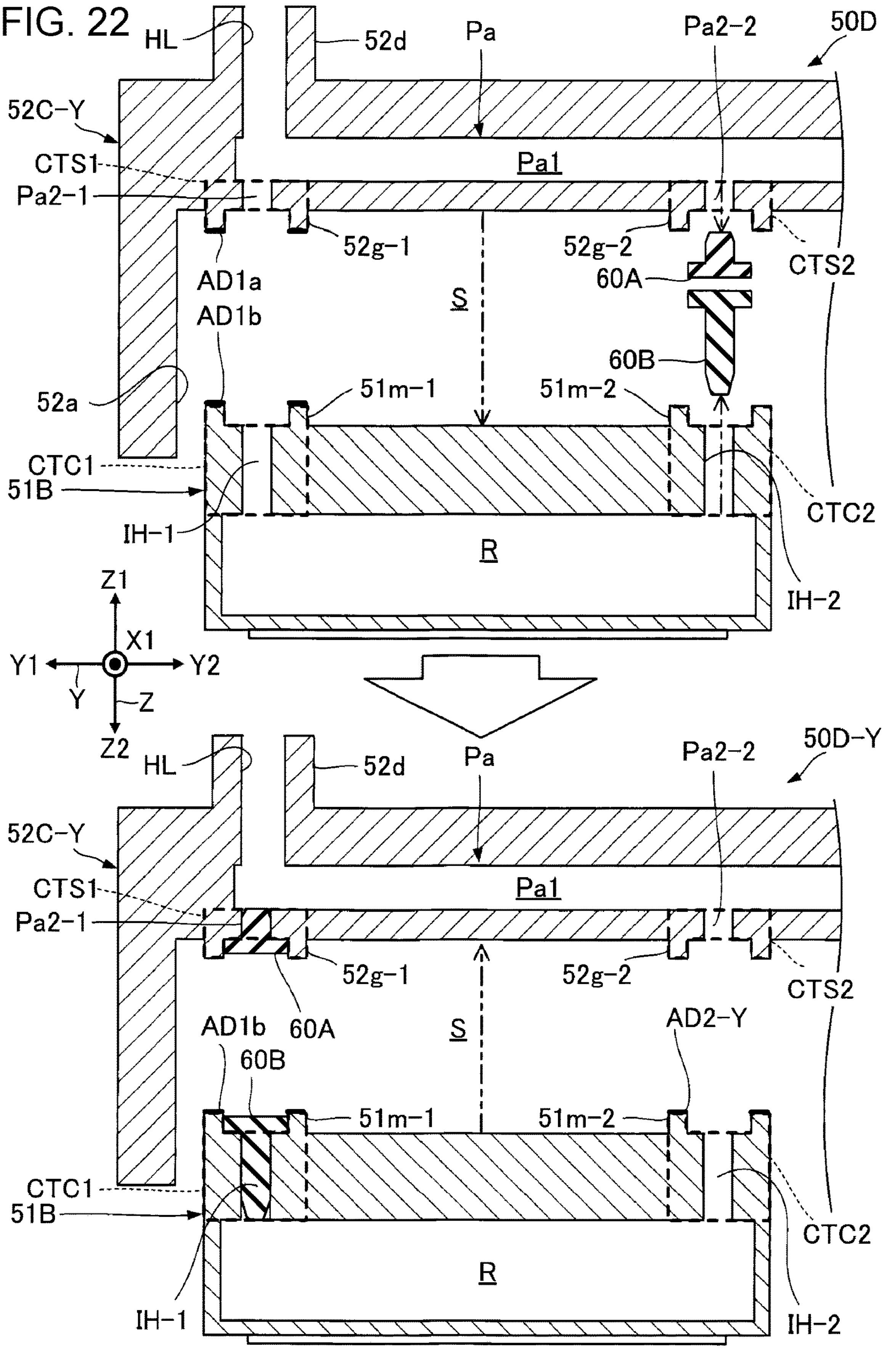
FIG. 22 is a diagram for explaining a reusing step in the fifth embodiment.

FIG. 22 is a diagram for explaining the reusing step SR in the fifth embodiment. FIG. 22 illustrates a case in which the head chip 51B, which serves as a reuse target, of the liquid ejecting head 50D is reused for another liquid ejecting head 50D-Y in the reusing step SR. The reusing step SR includes a disassembly step S10-Y and an assembly step S20-Y in this order. An upper part in FIG. 22 illustrates the disassembly step S10-Y of the present embodiment, and a lower part in FIG. 22 illustrates the assembly step S20-Y of the present embodiment.

As illustrated in the upper part in FIG. 22, in the disassembly step S10-Y, at least one head chip 51B serving as the reuse target is removed from the liquid ejecting head 50D. Specifically, the disassembly step S10-Y includes a first step S1-Y and a third step S3-Y. In the first step S1-Y, an adhesion state where the branch flow path Pa2-1 of the flow path structure 52C and the inlet IH-1 of the head chip 51B serving as the reuse target are liquid-tightly coupled to each other is released. In the third step S3-Y, the closed state of the inlet IH-2 of the head chip 51B serving as the reuse target is released by pulling out the closing member 60B from the second chip-side coupling portion CTC2. The first step S1-Y and the third step S3-Y are executed in this order. In the third step S3-Y, the closed state of the branch flow path Pa2-2 may be released by pulling out the closing member 60A from the second selection coupling portion CTS2, or the closing member 60A may not be pulled out from the second selection coupling portion CTS2.

As illustrated in the lower part in FIG. 22, in the assembly step S20-Y, the removed head chip 51B serving as the reuse target is incorporated into another liquid ejecting head 50D-Y. Specifically, the assembly step S20-Y includes a second step S2-Y and a fourth step S4-Y. In the second step S2-Y, the branch flow path Pa2-1 of the flow path structure 52C-Y of the other liquid ejecting head 50D-Y and the inlet IH-1 of the head chip 51B serving as the reuse target are liquid-tightly coupled to each other by the adhesive AD2-Y. In the fourth step S4-Y, the closing member 60B is press-fitted into the inlet IH-1 of the head chip 51B serving as the reuse target to liquid-tightly close the inlet IH-1, and the closing member 60A is press-fitted into the branch flow path Pa2-1 of the flow path structure 52C-Y to liquid-tightly close the branch flow path Pa2-1. The fourth step S4-Y and the second step S2-Y are executed in this order. Here, the closing members 60A and 60B may be closing members 60A and 60B removed from the liquid ejecting head 50D, or may be closing members 60A and 60B different from the closing members 60A and 60B removed from the liquid ejecting head 50D.

As described above, when the head chip 51B is reused as a portion of the liquid ejecting head 50D, the liquid ejecting head 50D is an example of a "first liquid ejecting head". The flow path structure 52C included in the liquid ejecting head 50D is an example of a "first flow path structure". As described above, a liquid ejecting head manufacturing method for manufacturing the liquid ejecting head 50D-Y, which is an example of a "second liquid ejecting head", through this reusing includes the reusing step SR. In the reusing step SR, the head chip 51B is reused for the liquid ejecting head 50D-Y. Here, the head chip 51B has the first chip-side coupling portion CTC1 and the second chip-side coupling portion CTC2, which are flow path coupling portions to the flow path structure 52C. The reusing step SR includes a first step S1-Y and a second step S2-Y. In the first step S1-Y, an adhesion state where the first chip-side coupling portion CTC1 and the flow path structure 52D are liquid-tightly coupled to each other is released. In the second step S2-Y, the second chip-side coupling portion CTC2 compatible with the first chip-side coupling portion CTC1 and the flow path structure 52C-Y compatible with the flow path structure 52C are liquid-tightly coupled to each other by the adhesive AD2-Y.

In addition, the head chip 51B has the first chip-side coupling portion CTC1 facing the first selection coupling portion CTS1 when the second step S2-Y is performed. In the third step S3-Y included in the reusing step SR, the elastic closing member 60A is pulled out from the second selection coupling portion CTS2 to release the closed state of the second selection coupling portion CTS2, and the elastic closing member 60B is pulled out from the second chip-side coupling portion CTC2 to release the closed state of the second chip-side coupling portion CTC2. In the fourth step S4-Y, the elastic closing member 60B is press-fitted into the first chip-side coupling portion CTC1, and the elastic closing member 60A is press-fitted into the first selection coupling portion CTS1. In the present embodiment, the second step S2-Y is performed after the fourth step S4-Y. Therefore, each of the first chip-side coupling portion CTC1 and the first selection coupling portion CTS1 can be closed in a state where the head chip 51B and the flow path structure 52C-Y are separated from each other. Therefore, the head chip 51B can be easily attached and detached.

In the liquid ejecting head manufacturing method described above, the head chip 51B, which is not broken and has a history of use in the past, can be reused for another liquid ejecting head 50D-Y.

Figure 23:
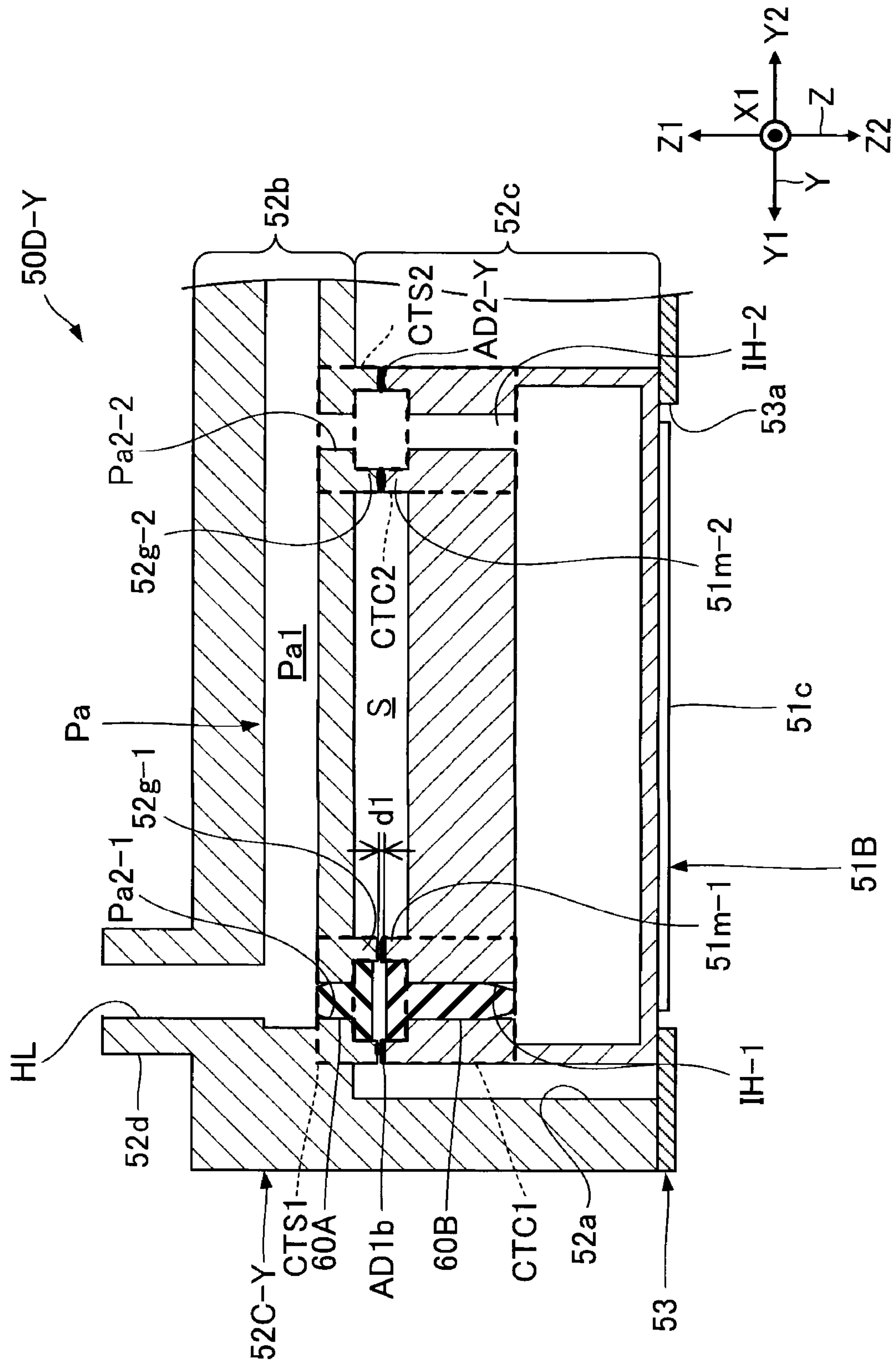
FIG. 23 is a cross-sectional view of a liquid ejecting head obtained by reusing a head chip in the fifth embodiment.

FIG. 23 is a cross-sectional view of the liquid ejecting head 50D-Y obtained by reusing the head chip 51B in the fifth embodiment. The liquid ejecting head 50D-Y is obtained through the reusing step SR illustrated in FIG. 22 described above.

The liquid ejecting head 50D-Y includes the flow path structure 52C-Y described above. The flow path structure 52C-Y adheres to the head chip 51B by the adhesive AD2-Y. Specifically, the second chip-side coupling portion CTC2 liquid-tightly adheres to the second selection coupling portion CTS2 of the flow path structure 52C-Y by the adhesive AD2-Y. Thereby, the inlet IH-2 and the branch flow path Pa2-2 are liquid-tightly coupled to each other. Here, the adhesion by the adhesive AD2-Y is performed in a region different from the adhesive layer AD1*b* remaining on the head chip 51B.

The first chip-side coupling portion CTC1 is liquid-tightly closed by the closing member 60B. Thereby, the inlet IH-1 is liquid-tightly closed by the closing member 60B. In addition, the first selection coupling portion CTS1 of the flow path structure 52C-Y is liquid-tightly closed by the closing member 60A. Thereby, the branch flow path Pa2-1 is liquid-tightly closed by the closing member 60A.

The liquid ejecting head 50D-Y obtained by reusing the head chip 51B as described above includes the head chip 51B, the flow path structure 52C-Y, and the adhesive layer AD1*b*, as described above. The head chip 51B has the plurality of nozzles N ejecting a liquid and the common liquid chamber R communicating with the plurality of nozzles N. The adhesive layer AD1*b* is interposed between the head chip 51B and the flow path structure 52C-Y. Here, the head chip 51B has the first chip-side coupling portion CTC1 and the second chip-side coupling portion CTC2. In the liquid ejecting head 50D-Y, the first chip-side coupling portion CTC1 is coupled to the common liquid chamber R and is closed so as not to be coupled to the flow path in the flow path structure 52C-Y. The second chip-side coupling portion CTC2 is coupled to the common liquid chamber R and is liquid-tightly coupled to the flow path structure 52C-Y by the adhesive AD2-Y. The adhesive layer AD1*b* adheres to the first chip-side coupling portion CTC1 without adhering to the flow path structure 52C-Y.

As described above, the head chip 51B of the liquid ejecting head 50D is reused. In addition, although a detailed description is omitted, the liquid ejecting head 50D can be regenerated in substantially the same manner as the regeneration of the liquid ejecting head 50C described in the fourth embodiment. Specifically, the liquid ejecting head 50D of the present embodiment can be regenerated by performing the replacing step SC that is substantially the same as that in the fourth embodiment. The replacing step SC of the present embodiment and the replacing step SC of the fourth embodiment are different in two steps, that is, the third step S3-X and the fourth step S4-*x*, and the first step S1-X and the second step S2-X are the same. The third step S3-X of the fifth embodiment is different from the third step S3-X of the fourth embodiment in that the closing member 60B is pulled out from the second chip-side coupling portion CTC2 of the head chip 51B and the closing member 60A is pulled out from the second chip-side coupling portion CTC2 of the flow path structure 52C. In addition, the fourth step S4-X of the fifth embodiment is different from the fourth step S4-X of the fourth embodiment in that the closing member 60B is press-fitted into the first chip-side coupling portion CTC1 of the head chip 51B-X (not illustrated) compatible with the head chip 51B and the closing member 60A is press-fitted into the first selection coupling portion CTS1 of the flow path structure 52C.

As described above, when the liquid ejecting head 50D is regenerated, the liquid ejecting head 50D is an example of a "first liquid ejecting head". As described above, in the replacing step SC of a liquid ejecting head manufacturing method for manufacturing the liquid ejecting head (not illustrated), which is an example of a "second liquid ejecting head", through this regeneration, the head chip 51B is replaced with the head chip 51B-X compatible with the head chip 51B by performing the same steps as the first step S1-X and the second step S2-X of the fourth embodiment described above. The head chip 51B is an example of a "first head chip", and the head chip 51B-X (not illustrated) is an example of a "second head chip".

Here, the head chip 51B-X (not illustrated) has the first chip-side coupling portion CTC1 as a "chip-side coupling portion" facing the first selection coupling portion CTS1 when the second step S2-X is performed. In the third step S3-X included in the replacing step SC of the present embodiment, the elastic closing member 60A press-fitted into the second selection coupling portion CTS2 is pulled out from the second selection coupling portion CTS2 to release the closed state of the second selection coupling portion CTS2, and the elastic closing member 60B press-fitted into the second chip-side coupling portion CTC2 is pulled out from the second chip-side coupling portion CTC2 to release the closed state of the second chip-side coupling portion CTC2. In the fourth step S4-X of the present embodiment, the elastic closing member 60B is press-fitted into the first chip-side coupling portion CTC1, and the elastic closing member 60A is press-fitted into the first selection coupling portion CTS1. Here, the second step S2-X of the present embodiment is performed after the fourth step S4-X of the present embodiment. Therefore, each of the first chip-side coupling portion CTC1 and the first selection coupling portion CTS1 can be closed in a state where the head chip 51B-X and the flow path structure 52C are separated from each other. Therefore, the head chip 51B can be easily replaced.

6. Sixth Embodiment

Hereinafter, a sixth embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 24:
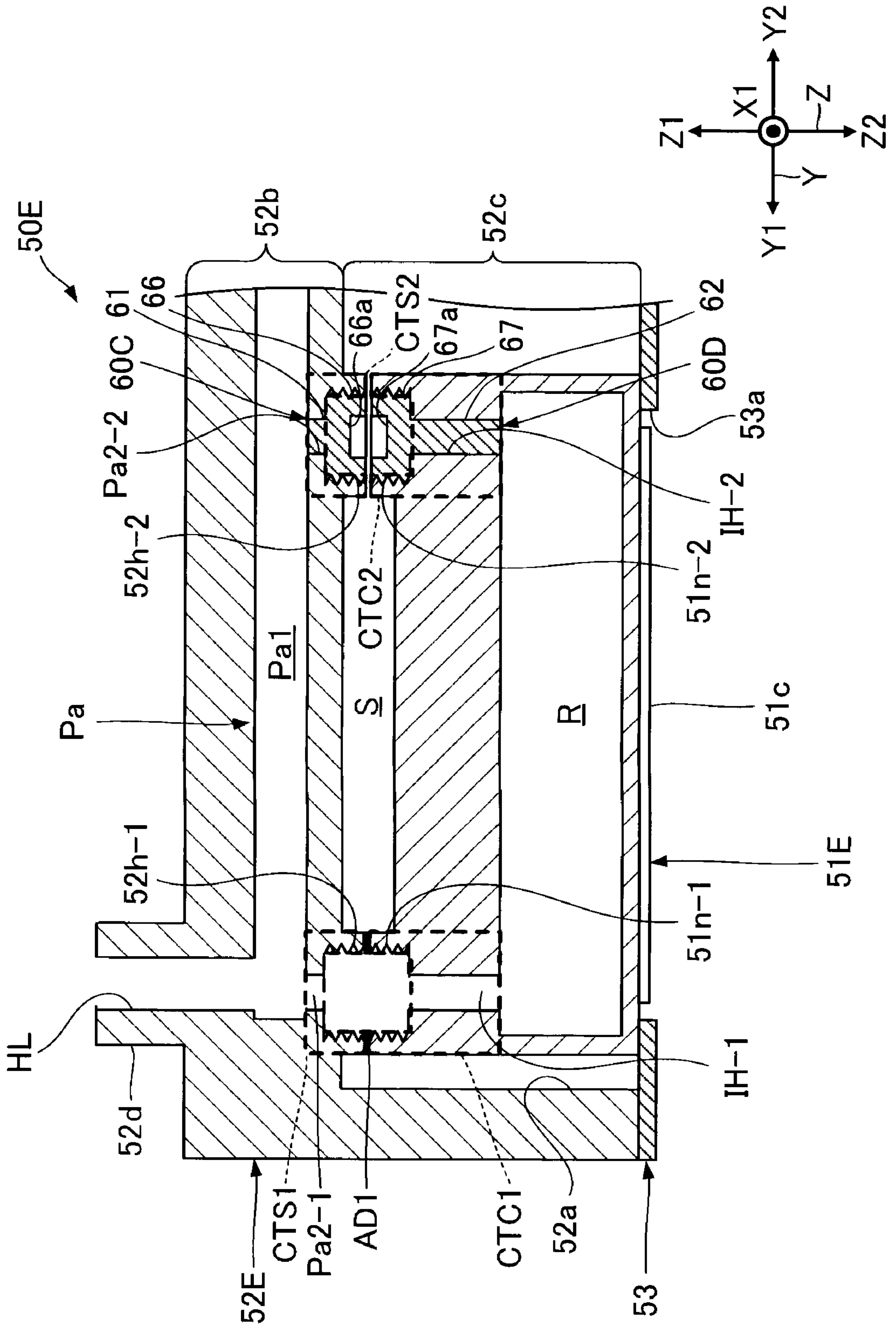
FIG. 24 is a cross-sectional view of a liquid ejecting head according to a sixth embodiment.

FIG. 24 is a cross-sectional view of a liquid ejecting head 50E according to a sixth embodiment. The liquid ejecting head 50E has the same configuration as the liquid ejecting head 50 of the first embodiment except that the liquid ejecting head 50E has a head chip 51E instead of the head chip 51 and has a flow path structure 52E instead of the flow path structure 52, and closing members 60C and 60D are added.

As illustrated in FIG. 24, the head chip 51E has the same configuration as the head chip 51 of the first embodiment except that the head chip 51E has a protrusion 51*n*-1 and a protrusion 51*n*-2 instead of the protrusion 51*m*-1 and the protrusion 51*m*-2 and has inlets IH-1 and IH-2, and the protrusion 51*k* is omitted.

The protrusion 51*n*-1 has the same configuration as the protrusion 51*m*-1 of the first embodiment except that a female screw is provided on an inner peripheral surface.

Here, the protrusion 51*n*-1 and the inlet IH-1 form a portion of the first chip-side coupling portion CTC1 indicated as a region surrounded by a broken line in the drawing. The first chip-side coupling portion CTC1 of the present embodiment is a portion of the head chip 51E including a portion the adhesive AD1 for coupling to the branch flow path Pa2-1 is applied, a portion where the inlet IH-1 is provided, and a portion to be closed by the closing member 60D of the branch flow path Pa2-1 at the time of regeneration of the liquid ejecting head 50E or at the time of reuse of the head chip 51E. As described above, in the present embodiment, the first chip-side coupling portion CTC1 is a portion including the protrusion 51*n*-1 and the inlet IH-1, and the inlet IH-1 is open to the tip surface of the annular protrusion 51*n*-1.

The protrusion 51*n*-2 has the same configuration as the protrusion 51*m*-2 of the first embodiment except that a female screw is provided on an inner peripheral surface. The inlet IH-2 is open inside the protrusion 51*n*-2.

Here, the protrusion 51*n*-2 and the inlet IH-2 form a portion of the second chip-side coupling portion CTC2 indicated as a region surrounded by a broken line in the drawing. The second chip-side coupling portion CTC2 of the present embodiment is a portion of the head chip 51E including a portion to which the adhesive AD2-X or the adhesive AD2-Y for coupling to the branch flow path Pa2-2 is applied at the time of regeneration of the liquid ejecting head 50E or at the time of reuse of the head chip 51E, a portion to be closed by the closing member 60D of the inlet IH-1, and a portion where the inlet IH-2 is provided. As described above, in the present embodiment, the second chip-side coupling portion CTC2 is a portion including the protrusion 51*n*-2 and the inlet IH-2, and a recess whose side surface is defined by an inner peripheral surface of the annular protrusion 51*n*-2 is provided on a surface of the second chip-side coupling portion CTC2 facing the Z1 direction. The inlet IH-2 is open to the tip surface of the protrusion 51*n*-2.

The flow path structure 52E has the same configuration as the flow path structure 52 of the first embodiment except that the flow path structure 52E has a protrusion 52*h*-1 instead of the protrusion 52*e*-1 and has a protrusion 52*h*-2 instead of the protrusion 52*e*-2.

The protrusion 52*h*-1 has the same configuration as the protrusion 52*g*-1 of the fourth embodiment and the fifth embodiment except that a female screw is provided on an inner peripheral surface. The protrusion 52*h*-2 has the same configuration as the protrusion 52*g*-2 of the fourth embodiment and the fifth embodiment except that a female screw is provided on an inner peripheral surface.

Here, the protrusion 52*h*-1 and the branch flow path Pa2-1 form a portion of the first selection coupling portion CTS1 indicated as a region surrounded by a broken line in the drawing. The first selection coupling portion CTS1 of the present embodiment is a portion of the flow path structure 52E including a portion the adhesive AD1 for coupling to the inlet IH-1 is applied, a portion to be closed by the closing member 60C of the branch flow path Pa2-1 at the time of regeneration of the liquid ejecting head 50E or at the time of reuse of the head chip 51E, and a portion where the branch flow path Pa2-1 is provided. As described above, in the present embodiment, the first selection coupling portion CTS1 is a portion including the protrusion 52*h*-1 and the branch flow path Pa2-1, and a recess whose side surface is defined by an inner peripheral surface of the annular protrusion 52*h*-1 is provided on a surface of the first selection coupling portion CTS1 facing the Z2 direction. The branch flow path Pa2-1 is open to a tip surface of the protrusion 52*h*-1.

The protrusion 52*h*-2 and the branch flow path Pa2-2 form a portion of the second selection coupling portion CTS2 indicated as a region surrounded by a broken line in the drawing. The second selection coupling portion CTS2 of the present embodiment is a portion of the flow path structure 52E including a portion to be closed by the closing member 60C of the branch flow path Pa2-2, a portion to which the adhesive AD2-X or the adhesive AD2-Y for coupling to the inlet IH-2 is applied at the time of regeneration of the liquid ejecting head 50E or at the time of reuse of the head chip 51E, and a portion where the branch flow path Pa2-2 is provided. As described above, in the present embodiment, the second selection coupling portion CTS2 is a portion including the protrusion 52*h*-2 and the branch flow path Pa2-2, and a recess whose side surface is defined by an inner peripheral surface of the annular protrusion 52*h*-2 is provided on a surface of the second selection coupling portion CTS2 facing the Z2 direction. The branch flow path Pa2-2 is open to a tip surface of the protrusion 52*h*-2.

The tip surface of the protrusion 52*h*-1 of the flow path structure 52E described above adheres to the tip surface of the protrusion 51*n*-1 of the head chip 51E by the adhesive AD1. Thereby, the branch flow path Pa2-1 and the inlet IH-1 are liquid-tightly coupled to each other by the adhesive AD1.

On the other hand, the tip surface of the protrusion 52*h*-2 faces the tip surface of the protrusion 51*n*-2 of the head chip 51E without adhesion. Here, the inlet IH-2 is liquid-tightly closed by the closing member 60D, and the branch flow path Pa2-2 is liquid-tightly closed by the closing member 60C.

The closing member 60C is a screw cap having a male screw that is fitted into the female screw of the protrusion 52*h*-2. The closing member 60C has the same configuration as the closing member 60A of the fifth embodiment except that the closing member 60C has a head portion 66 instead of the flange portion 64 and does not require elasticity. The constituent material of the closing member 60C may be an elastic material, a metal material, or a ceramic material, as with the closing member 60D.

The head portion 66 has the same configuration as the flange portion 64 of the fifth embodiment except that a male screw that is fitted into the female screw of the protrusion 52*h*-2 is provided on an outer peripheral surface and a tool hole 66*a* is provided. The tool hole 66*a* is a groove or a hole that is provided on a surface of the head portion 66 facing the Z2 direction, into which a tip of a tool such as a screwdriver or a wrench can be fitted. By providing such a tool hole 66*a*, the closing member 60C can be easily attached to and detached from the protrusion 52*h*-2 by using a tool such as a screwdriver or a wrench or a jig.

In the example illustrated in FIG. 24, a thickness of the head portion 66 is equal to or smaller than a length of the protrusion 52*h*-2 along the Z axis. The head portion 66 contacts the flow path structure 52E, but does not contact the head chip 51E and the closing member 60D. When the head portion 66 contacts the flow path structure 52E with a sealing member (not illustrated) such as an O-ring interposed therebetween, the head portion 66 regulates the pushing amount of the first portion 61 into the branch flow path Pa2-2, and the branch flow path Pa2-2 is liquid-tightly closed. In addition, since the head portion 66 does not contact the head chip 51E and the closing member 60D, a thickness required for the adhesive AD1 can be reduced. The sealing member, which is an elastic material such as an elastomer, may be disposed on a surface of the head portion 66 facing the Z1 direction and may be integrally configured with the closing member 60C.

The closing member 60D is a screw cap having a male screw that is fitted into the female screw of the protrusion 51*n*-2. The closing member 60D has the same configuration as the closing member 60B of the fifth embodiment except that the closing member 60D has a head portion 67 instead of the flange portion 65 and does not require elasticity. The constituent material of the closing member 60D may be a resin material, a metal material, or a ceramic material.

The head portion 67 has the same configuration as the flange portion 65 of the fifth embodiment except that a male screw that is fitted into the female screw of the protrusion 51*n*-2 is provided on an outer peripheral surface and a tool hole 67*a* is provided. The tool hole 67*a* is a groove or a hole that is provided on a surface of the head portion 67 facing the Z1 direction, into which a tip of a tool such as a screwdriver or a wrench can be fitted. By providing such a tool hole 67*a*, the closing member 60D can be easily attached to and detached from the protrusion 51*n*-2 by using a tool such as a screwdriver or a wrench or a jig.

In the example illustrated in FIG. 24, a thickness of the head portion 67 is equal to or smaller than a length of the protrusion 51*n*-2 along the Z axis. The head portion 67 contacts the head chip 51E, but does not contact the flow path structure 52E and the closing member 60C. When the head portion 67 contacts the bottom surface of the recess defined by the protrusion 51*n*-2 of the head chip 51E with a sealing member (not illustrated) such as an O-ring interposed therebetween, the head portion 67 regulates the pushing amount of the second portion 62 into the inlet IH-2, and the inlet IH-2 is liquid-tightly closed. In addition, since the head portion 67 does not contact the flow path structure 52E and the closing member 60C, a thickness required for the adhesive AD1 can be reduced. The sealing member, which is an elastic material such as an elastomer, may be disposed on a surface of the head portion 67 facing the Z2 direction and may be integrally configured with the closing member 60D.

The regeneration of the liquid ejecting head 50E and the reuse of the head chip 51E configured as described above are performed in the same manner as in the fifth embodiment except that a tool such as a screwdriver or a wrench or a jig is used for attaching and detaching the closing members 60C and 60D.

For example, when the liquid ejecting head 50E is regenerated, the liquid ejecting head 50E serving as a regeneration target is an example of a "first liquid ejecting head". The liquid ejecting head after regenerating the liquid ejecting head 50E is an example of a "second liquid ejecting head". In the replacing step SC of the liquid ejecting head manufacturing method for performing such regeneration, the head chip 51E is replaced with a head chip compatible with the head chip 51E. The head chip 51E is an example of a "first head chip", and the head chip compatible with the head chip 51E is an example of a "second head chip".

Here, in the third step S3-X included in the replacing step SC in the present embodiment, a fastened state between the closing member 60C, which is an example of a "first screw cap" that closes the second selection coupling portion CTS2 by being fitted into the second selection coupling portion CTS2, and the second selection coupling portion CTS2 is released. In the fourth step S4-*x* included in the replacing step SC in the present embodiment, the closing member 60C, which is an example of a "second screw cap", is fitted into the first selection coupling portion CTS1, thereby closing the first selection coupling portion CTS1.

Therefore, in the third step S3-*x*, the fastened state between the closing member 60C and the second selection coupling portion CTS2 can be easily released by using a tool such as a screwdriver or a wrench or a jig. In the fourth step S4-X, the first selection coupling portion CTS1 of the closing member 60C can be closed by using a tool such as a screwdriver or a wrench or a jig. As the closing member 60C as a "second screw cap", the closing member 60C as a "first screw cap" may be used, and another new screw cap compatible with the closing member 60C as a "first screw cap" may be used.

In the fourth step S4-X of the present embodiment, the male screw provided in the closing member 60C is fitted into the female screw provided in the first selection coupling portion CTS1 by rotating the closing member 60C by using a jig that is fitted into the tool hole 66*a*, which is a groove or a hole provided in the head portion 66 of the closing member 60C. Therefore, the closing member 60C can be pushed deep into the branch flow path Pa2-1 by using a tool such as a screwdriver as a jig, and a thickness required for the adhesive AD2-X (not illustrated) can be reduced.

According to the above sixth embodiment as well, the liquid ejecting head 50E can be easily regenerated and the head chip 51E can be easily reused. In the present embodiment, as described above, the closing member 60C is provided with a male screw around a central axis of the branch flow path Pa2-2. On the other hand, the flow path structure 52E is provided with a female screw to be fastened to the male screw. The closing member 60C is a "screw cap" that closes the branch flow path Pa2-2 by fastening the male screw and the female screw. Therefore, the branch flow path Pa2-2 can be closed with a simple configuration. The closing member 60C is not limited to the configuration in which a male screw is provided, and may have a configuration in which a female screw is provided. In this case, in the flow path structure 52E, a male screw that is fitted into the female screw is provided around the central axis of the branch flow path Pa2-2.

In addition, as described above, the closing member 60C has the head portion 66. The head portion 66 coincides, in a depth direction of the branch flow path Pa2-2, with the tip surface of the protrusion 52*h*-2, which is a surface, on which the opening of the branch flow path Pa2-2 is formed, of the outer surface of the flow path structure 52E around the opening of the branch flow path Pa2-2, or is located deeper than the tip surface of the protrusion 52*h*-2, in the fastened state between the male screw of the closing member 60C and the female screw of the flow path structure 52E. Therefore, the thickness of the adhesive AD1 can be reduced. As a result, the adhesion by the adhesive AD1 becomes easy, and the options for adhesives that can be used as the adhesive AD1 can be increased, for example, using an adhesive having a low viscosity as the adhesive AD1.

7. Modification Examples

The embodiments exemplified above can be modified in various ways. Specific modified aspects that may be applied to the above-described embodiments are exemplified below. Any two or more aspects selected from the following examples can be combined as appropriate as long as there is no contradiction.

7-1. Modification Example 1

In each of the above-described embodiments, an aspect in which the number of compatible coupling portions for coupling the flow path structure and the head chip for one common liquid chamber R is two is exemplified, but the present disclosure is not limited to this aspect, and the number may be three or more. For example, when the number of the branch flow paths Pa2 is three or more for one common liquid chamber R, the flow path structure can be reused two or more times.

Figure 25:
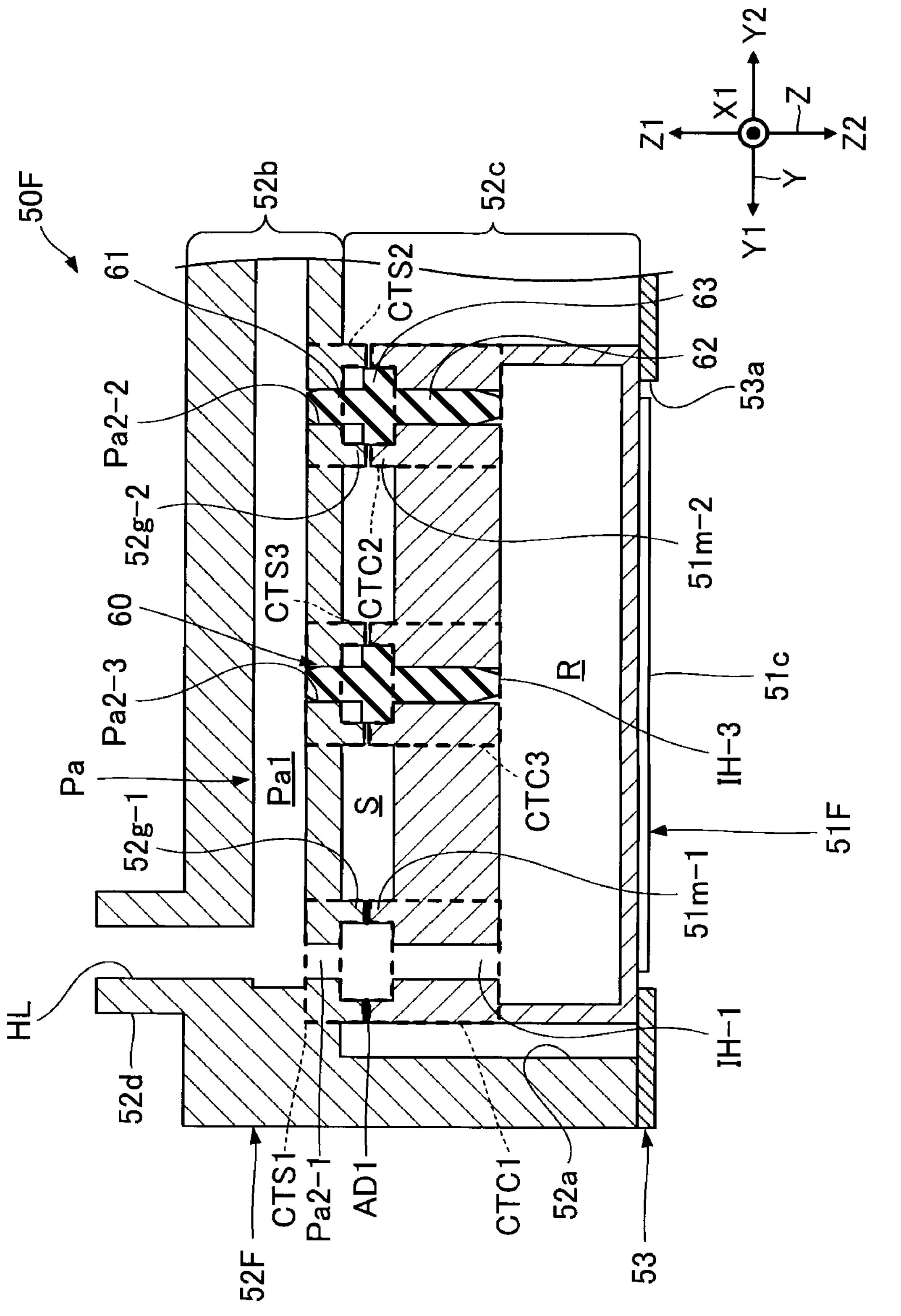
FIG. 25 is a cross-sectional view of a liquid ejecting head according to Modification Example 1.

FIG. 25 is a cross-sectional view of a liquid ejecting head 50F according to Modification Example 1. The liquid ejecting head 50F has the same configuration as the liquid ejecting head 50C of the fourth embodiment except that a third chip-side coupling portion CTC3, a third selection coupling portion CTS3, and a closing member 60 are added. Here, the liquid ejecting head 50F includes a head chip 51F and a flow path structure 52F instead of the head chip 51B and the flow path structure 52C.

The head chip 51F has the same configuration as the head chip 51B of the fourth embodiment except that the third chip-side coupling portion CTC3 is added. The third chip-side coupling portion CTC3 has the same configuration as the first chip-side coupling portion CTC1 or the second chip-side coupling portion CTC2 except that the third chip-side coupling portion CTC3 is located between the first chip-side coupling portion CTC1 and the second chip-side coupling portion CTC2. An inlet IH-3 communicating with the common liquid chamber R is open to a tip surface of the third chip-side coupling portion CTC3.

The flow path structure 52F has the same configuration as the flow path structure 52C of the fourth embodiment except that the third selection coupling portion CTS3 is added. The third selection coupling portion CTS3 has the same configuration as the first selection coupling portion CTS1 or the second selection coupling portion CTS2 except that the third selection coupling portion CTS3 is located between the first selection coupling portion CTS1 and the second selection coupling portion CTS2. A branch flow path Pa2-3 communicating with the common flow path Pa1 is open to a tip surface of the third selection coupling portion CTS3.

The third chip-side coupling portion CTC3 and the third selection coupling portion CTS3 described above are closed by the closing member 60, as with the second chip-side coupling portion CTC2 and the second selection coupling portion CTS2.

In Modification Example 1, in addition to the same coupling configuration as in the fourth embodiment, a configuration may be adopted in which the first chip-side coupling portion CTC1 and the first selection coupling portion CTS1 are closed by the closing member 60, and the third chip-side coupling portion CTC3 and the third selection coupling portion CTS3 adhere to each other in a state where the second chip-side coupling portion CTC2 and the second selection coupling portion CTS2 are closed by the closing member 60, thereby liquid-tightly coupling the inlet port IH-3 and the branch flow path Pa2-3 to each other. That is, there are three coupling patterns between the head chip 51F and the flow path structure 52F. Therefore, the flow path structure 52F can be reused twice.

7-2. Modification Example 2

In the above-described embodiments, an aspect in which the liquid ejecting head is a line type is exemplified, but the present disclosure is not limited to this aspect, and the liquid ejecting head may be a serial type in which the liquid ejecting head reciprocates in a width direction of the medium M.

7-3. Modification Example 3

The liquid ejecting apparatus exemplified in the above-described embodiments can be adopted in various types of apparatuses such as a facsimile apparatus and a copy machine, in addition to an apparatus dedicated to printing. However, the application of the liquid ejecting apparatus is not limited to the printing. For example, a liquid ejecting apparatus that ejects a solution of a coloring material is used as a manufacturing apparatus that forms a color filter of a display apparatus such as a liquid crystal display panel. In addition, a liquid ejecting apparatus that ejects a solution of a conductive material is used as a manufacturing apparatus that forms wirings or electrodes on a wiring substrate. In addition, a liquid ejecting apparatus that ejects a solution of an organic substance related to a living body is used, for example, as a manufacturing apparatus that manufactures a biochip.

What is claimed is:

1. A liquid ejecting head comprising:
a head chip having nozzles configure to eject a liquid, a common liquid chamber communicating with the nozzles, and a chip-side flow path communicating with the common liquid chamber; and
a flow path structure to which the head chip is joined by a first adhesive and a second adhesive, wherein
the flow path structure has
a common flow path,
a first selection flow path coupled to the common flow path and liquid-tightly coupled to the chip-side flow path by the first adhesive, and
a second selection flow path coupled to the common flow path,
an outer surface of the flow path structure includes a closed region surrounding an opening of the second selection flow path at a distance from the opening when viewed in a first direction, which is a stacking direction of the head chip and the flow path structure, and
the head chip adheres to the flow path structure via the second adhesive in the closed region so that the second selection flow path is closed.

2. The liquid ejecting head according to claim 1, wherein
the second selection flow path is closed by the second adhesive and an outer surface of the head chip.

3. The liquid ejecting head according to claim 2, wherein
a first adhesion position by the first adhesive and a second adhesion position by the second adhesive are different regarding the first direction.

4. The liquid ejecting head according to claim 3, wherein
the head chip has a nozzle plate provided with the nozzles, and
the first adhesion position is disposed between the second adhesion position and the nozzle plate in the first direction.

5. The liquid ejecting head according to claim 2, wherein
the head chip has a protrusion to be inserted into the second selection flow path.

6. A liquid ejecting apparatus comprising:
the liquid ejecting head according to claim 1; and
a liquid storage portion that stores a liquid to be supplied to the liquid ejecting head.

7. A liquid ejecting head comprising:
a head chip having nozzles configured to eject a liquid, a common liquid chamber communicating with the nozzles, and a first chip-side flow path communicating with the common liquid chamber; and
a flow path structure to which the head chip is joined by an adhesive, wherein
the flow path structure has
a common flow path,
a first selection flow path coupled to the common flow path and liquid-tightly coupled to the first chip-side flow path by the adhesive, and
a second selection flow path coupled to the common flow path, and
the second selection flow path is closed by a closing member detachably fixed to the flow path structure.

8. The liquid ejecting head according to claim 7, wherein
the closing member is a lid member that has elasticity and is to be inserted into the second selection flow path.

9. The liquid ejecting head according to claim 8, wherein
the head chip further has a second chip-side flow path communicating with the first chip-side flow path via the common flow path,
an opening of the second selection flow path and an opening of the second chip-side flow path overlap when viewed in a first direction, which is a stacking direction of the head chip and the flow path structure, and
the lid member has
a first portion to be inserted into the second selection flow path, and
a second portion to be inserted into the second chip-side flow path.

10. The liquid ejecting head according to claim 9, wherein
the lid member has a flange portion that is disposed between the first portion and the second portion and of which a cross-sectional area perpendicular to the first direction is larger than a cross-sectional area of each of the first portion and the second portion, and
the flange portion contacts the head chip without contacting the flow path structure.

11. The liquid ejecting head according to claim 7, wherein one of the closing member and the flow path structure is provided with a male screw, and the other is provided with a female screw fastened to the male screw, and the closing member is a screw cap that closes the second selection flow path through fastening of the male screw and the female screw.

12. The liquid ejecting head according to claim 11, wherein the female screw is provided inside the second selection flow path of the flow path structure, the male screw is provided in the closing member, and the closing member has a head portion that coincides, in a depth direction of the second selection flow path, with a surface, on which an opening of the second selection flow path is formed, of an outer surface of the flow path structure or that is located deeper than the surface in a fastened state between the male screw and the female screw.

13. The liquid ejecting head according to claim 7, wherein the head chip further has a second chip-side flow path communicating with the first chip-side flow path via the common liquid chamber, an opening of the second selection flow path and an opening of the second chip-side flow path overlap when viewed in a first direction, which is a stacking direction of the head chip and the flow path structure, and the second chip-side flow path is closed by the closing member detachably fixed to the head chip.

14. A liquid ejecting apparatus comprising:

the liquid ejecting head according to claim 7; and a liquid storage portion that stores a liquid to be supplied to the liquid ejecting head.

15. A liquid ejecting head comprising:

a head chip having nozzles configured to eject a liquid and a common liquid chamber communicating with the nozzles; and a flow path structure that has a coupling flow path communicating with the common liquid chamber and to which the head chip is joined by an adhesive, wherein the head chip has a first chip-side flow path coupled to the common liquid chamber and liquid-tightly coupled to the coupling flow path by the adhesive, and a second chip-side flow path coupled to the common liquid chamber, and the second chip-side flow path is closed by a closing member detachably fixed to the head chip.

16. A liquid ejecting apparatus comprising:

the liquid ejecting head according to claim 15; and a liquid storage portion that stores a liquid to be supplied to the liquid ejecting head.

* * * * *